United States Patent
Fleizach et al.

(10) Patent No.: US 10,007,418 B2
(45) Date of Patent: Jun. 26, 2018

(54) DEVICE, METHOD, AND GRAPHICAL USER INTERFACE FOR ENABLING GENERATION OF CONTACT-INTENSITY-DEPENDENT INTERFACE RESPONSES

(71) Applicant: Apple Inc., Cupertino, CA (US)

(72) Inventors: Christopher Brian Fleizach, Gilroy, CA (US); Ryan A. Markle, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 15/256,551

(22) Filed: Sep. 3, 2016

(65) Prior Publication Data

US 2017/0068371 A1     Mar. 9, 2017

Related U.S. Application Data

(60) Provisional application No. 62/215,396, filed on Sep. 8, 2015.

(51) Int. Cl.
*G06F 3/041*     (2006.01)
*G06F 3/0488*     (2013.01)
(Continued)

(52) U.S. Cl.
CPC ........ *G06F 3/0488* (2013.01); *G06F 3/03545* (2013.01); *G06F 3/0486* (2013.01);
(Continued)

(58) Field of Classification Search
CPC .. G06F 3/0414; G06F 3/0488; G06F 3/04842; G06F 2203/04104
See application file for complete search history.

(56) References Cited

U.S. PATENT DOCUMENTS

2013/0141364 A1*   6/2013   Lynn ...................... G06F 3/041
                                                               345/173

* cited by examiner

*Primary Examiner* — Erin M File
(74) *Attorney, Agent, or Firm* — Ronald Fernando

(57) ABSTRACT

In accordance with some embodiments, a method is performed at an electronic device with a display, a touch-sensitive surface, one or more sensors capable of detecting intensity of one or more contacts with the touch-sensitive surface, one or more processors, and a non-transitory memory. The method includes displaying, on the display, an interface object associated with a plurality of contact-intensity-dependent interface responses corresponding to a plurality of contact intensity level values and receiving a sequence of one or more inputs that includes detecting a contact on the touch-sensitive surface associated with a location of the interface object and detecting an intensity of the contact. In response to receiving the sequence of one or more inputs, the method includes, in accordance with a determination that a first mode is enabled, determining a contact intensity level value for the contact based on the detected intensity of the contact and, in accordance with a determination that a second mode is enabled, determining a contact intensity level value for the contact that is independent of the detected intensity of the contact. After determining the contact intensity level value for the contact, the method includes providing the determined contact intensity level value together with information indicative of the detected contact on the touch-sensitive surface in order to enable generation of a respective contact-intensity-dependent interface response of the plurality of contact-intensity-dependent interface responses selected based on the determined contact intensity level value.

30 Claims, 42 Drawing Sheets

(51) Int. Cl.
*G06F 3/0484* (2013.01)
*G06F 3/0486* (2013.01)
*G06F 3/0354* (2013.01)

(52) U.S. Cl.
CPC .................. *G06F 3/04842* (2013.01); *G06F 2203/04806* (2013.01); *G06F 2203/04808* (2013.01)

DEVICE, METHOD, AND GRAPHICAL USER INTERFACE FOR ENABLING GENERATION OF CONTACT-INTENSITY-DEPENDENT INTERFACE RESPONSES

PRIORITY CLAIM

This application claims priority to U.S. provisional patent application No. 62/215,396 filed on Sep. 8, 2015, the whole of the contents of which are hereby incorporated by reference herein.

TECHNICAL FIELD

This relates generally to electronic devices with touch-sensitive surfaces, including but not limited to electronic devices with touch-sensitive surfaces that detect inputs for enabling generation of contact-intensity-dependent user interface responses.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But people with limited motor skills, such as those with certain finger or hand impairments, may find performing certain gestures (e.g., gestures having a particular force or pressure applied at various locations on the surface) difficult, if not impossible.

SUMMARY

Accordingly, there is a need for electronic devices with faster, more efficient methods and interfaces for enabling generation of contact-intensity-dependent interface responses. Such methods and interfaces optionally complement or replace conventional methods for enabling generation of contact-intensity-dependent interface responses. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, one or more sensors to detect intensity of contacts with the touch-sensitive surface, one or more processors, and a non-transitory memory. The method includes displaying, on the display, an interface object associated with a plurality of contact-intensity-dependent interface responses corresponding to a plurality of contact intensity level values and receiving a sequence of one or more inputs that includes detecting a contact on the touch-sensitive surface associated with a location of the interface object and detecting an intensity of the contact. In response to receiving the sequence of one or more inputs, the method includes, in accordance with a determination that a first mode is enabled, determining a contact intensity level value for the contact based on the detected intensity of the contact and, in accordance with a determination that a second mode is enabled, determining a contact intensity level value for the contact that is independent of the detected intensity of the contact. After determining the contact intensity level value for the contact, the method includes providing the determined contact intensity level value together with information indicative of the detected contact on the touch-sensitive surface in order to enable generation of a respective contact-intensity-dependent interface response of the plurality of contact-intensity-dependent interface responses selected based on the determined contact intensity level value.

In accordance with some embodiments, an electronic device includes a display unit configured to display an interface object associated with a plurality of contact-intensity-dependent interface responses corresponding to a plurality of contact intensity level values; a touch-sensitive surface unit configured to detect contacts on the touch-sensitive surface unit; one or more sensor units configured to detect intensity of one or more contacts with the touch-sensitive surface unit; and a processing unit coupled with the display unit, the touch-sensitive surface unit, and the one or more sensor units. The processing unit is configured to:

receive a sequence of one or more inputs that includes detecting a contact on the touch-sensitive surface unit associated with a location of the interface object and detecting an intensity of the contact. In response to receiving the sequence of one or more inputs, the processing unit is configured to, in accordance with a determination that a first mode is enabled, determine a contact intensity level value for the contact based on the detected intensity of the contact and, in accordance with a determination that a second mode is enabled, determine a contact intensity level value for the contact that is independent of the detected intensity of the contact. After determining the contact intensity level value for the contact, the processing unit is configured to provide the determined contact intensity level value together with information indicative of the detected contact on the touch-sensitive surface unit in order to enable generation of a respective contact-intensity-dependent interface response of the plurality of contact-intensity-dependent interface responses selected based on the determined contact intensity level value.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for enabling generation of a contact-intensity-dependent interface response, thereby increasing the effectiveness, efficiency, and user satisfaction with such devices. Such methods and interfaces may complement or replace conventional methods for enabling generation of a contact-intensity-dependent interface response.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The use of electronic devices with touch-based user interfaces (e.g., devices such as the iPhone®, iPod Touch®, and iPad® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. These devices also have contact intensity sensor for determining a force or pressure of contacts with the touch-sensitive surfaces. People with limited motor skills, such as those with certain finger or hand impairments, may find applying force or pressure to the touch-sensitive surface difficult, if not impossible.

Described below are devices and methods that enable users who cannot effectively operate force-sensitive surfaces (e.g., due to motor impairment or other impairments that interfere with the ability of the user to apply pressure to a touch-sensitive surface) to nevertheless operate electronic devices with touch-based user interfaces configured to receive force-sensitive gestures. In some embodiments described below, a device includes a default mode in which an intensity value of a contact with a touch-sensitive screen is based on a detected intensity using one or more contact intensity sensors. The device also includes an accessibility mode in which the intensity value of a contact with the touch-sensitive screen is not based on the detected intensity, but is based on other factors. For example, in some embodiments, the intensity value of the contact is based on sequence of inputs selecting a displayed force touch gesture icon.

Figure 2:
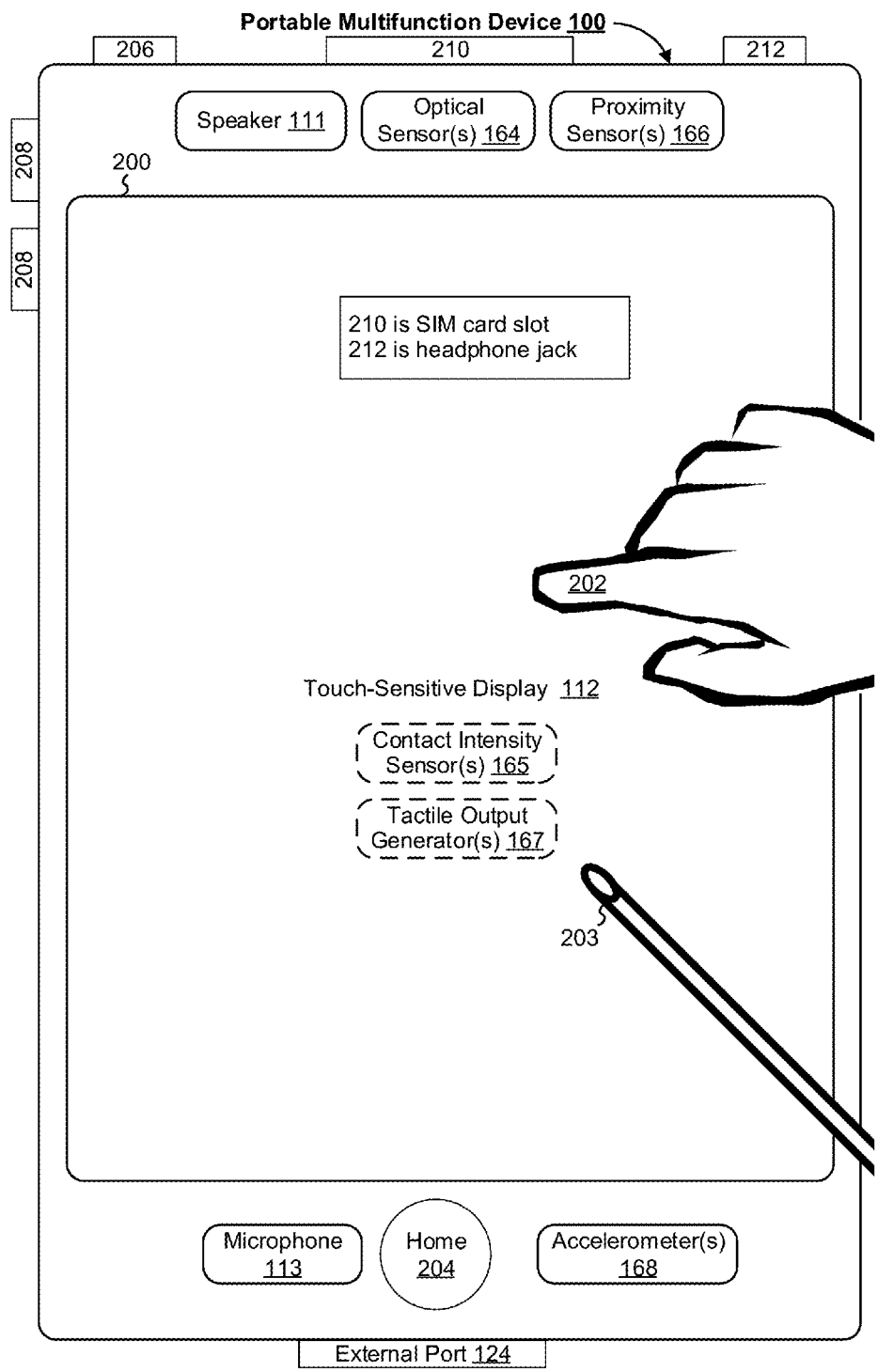
FIG. 2 illustrates a portable multifunction device having a touch screen in accordance with some embodiments.
Figure 3:
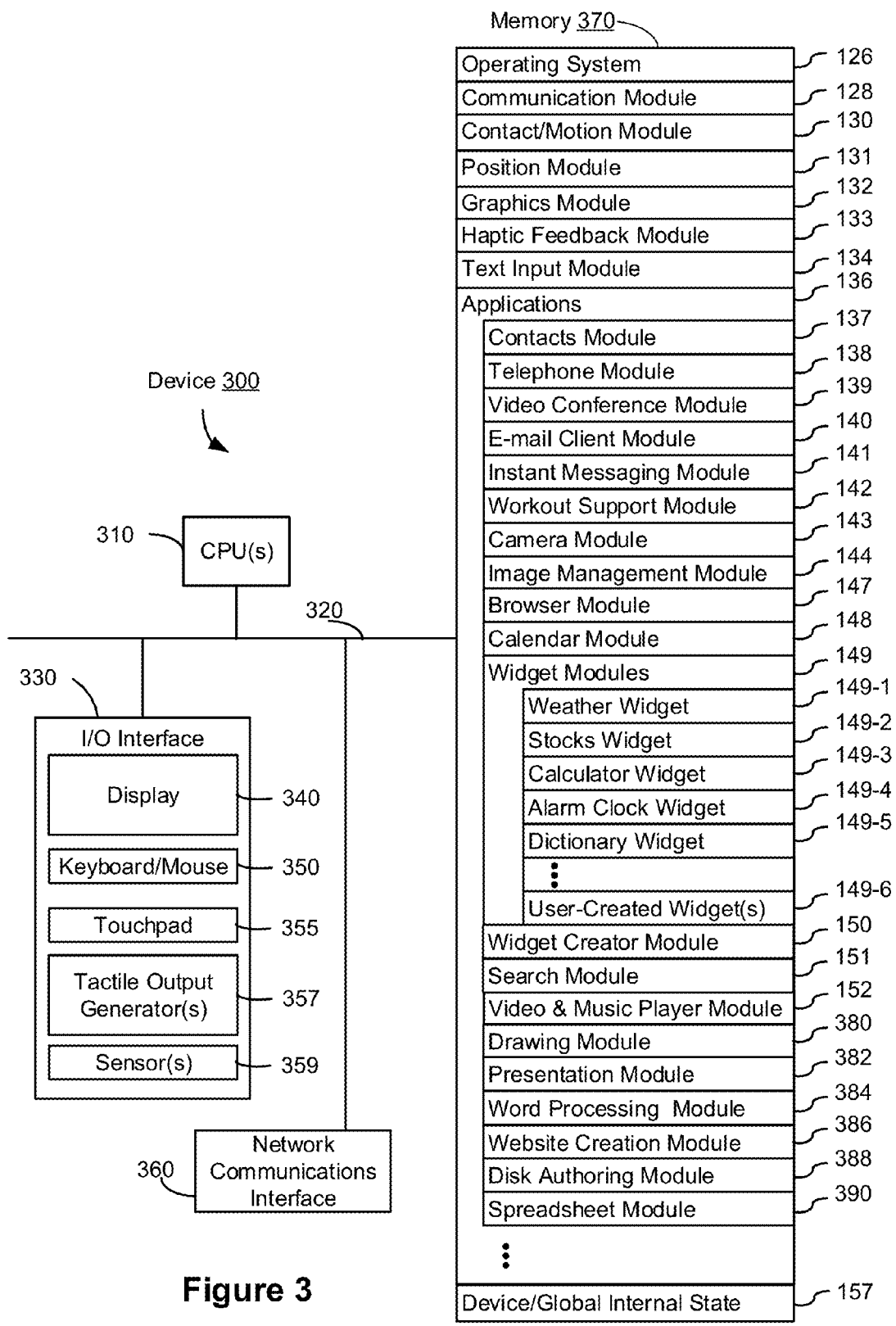
FIG. 3 is a block diagram of an exemplary multifunction device with a display and a touch-sensitive surface in accordance with some embodiments.
Figure 4:
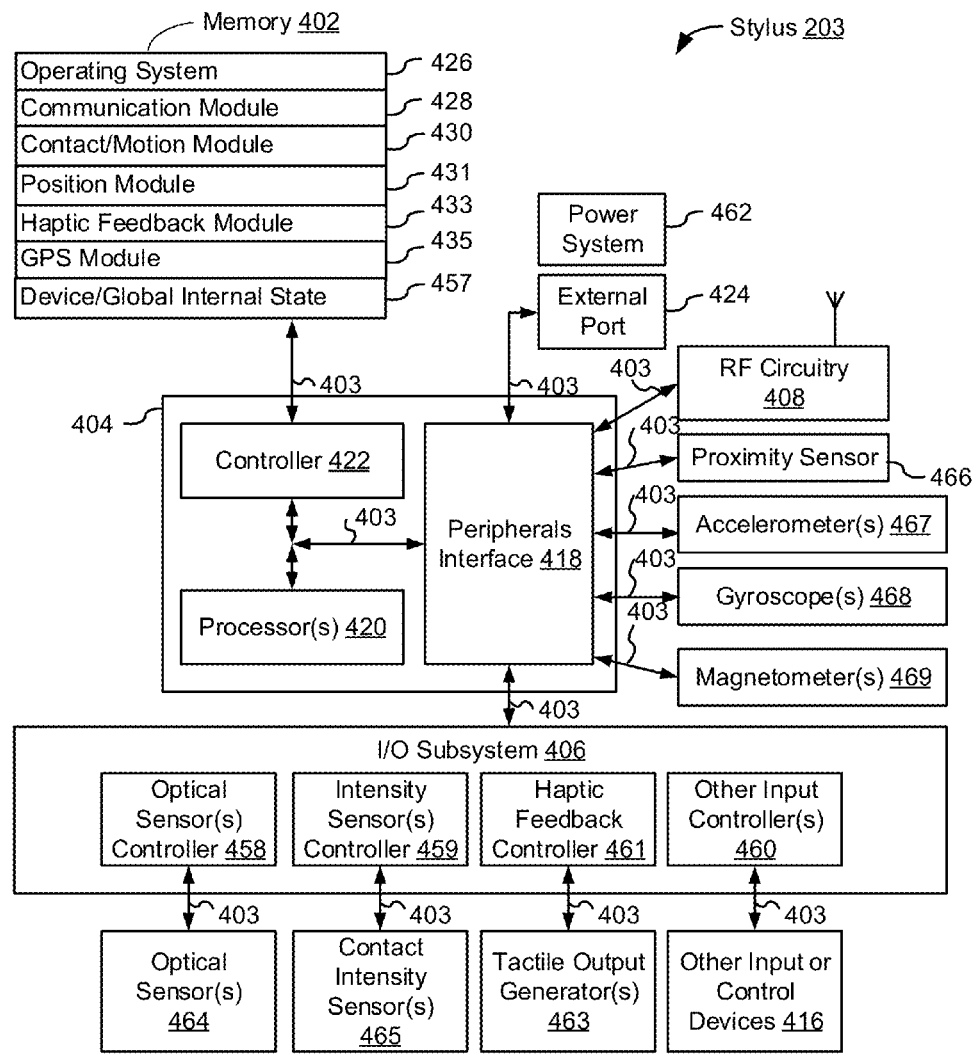
FIG. 4 is a block diagram of an exemplary electronic stylus in accordance with some embodiments.
Figure 5A:
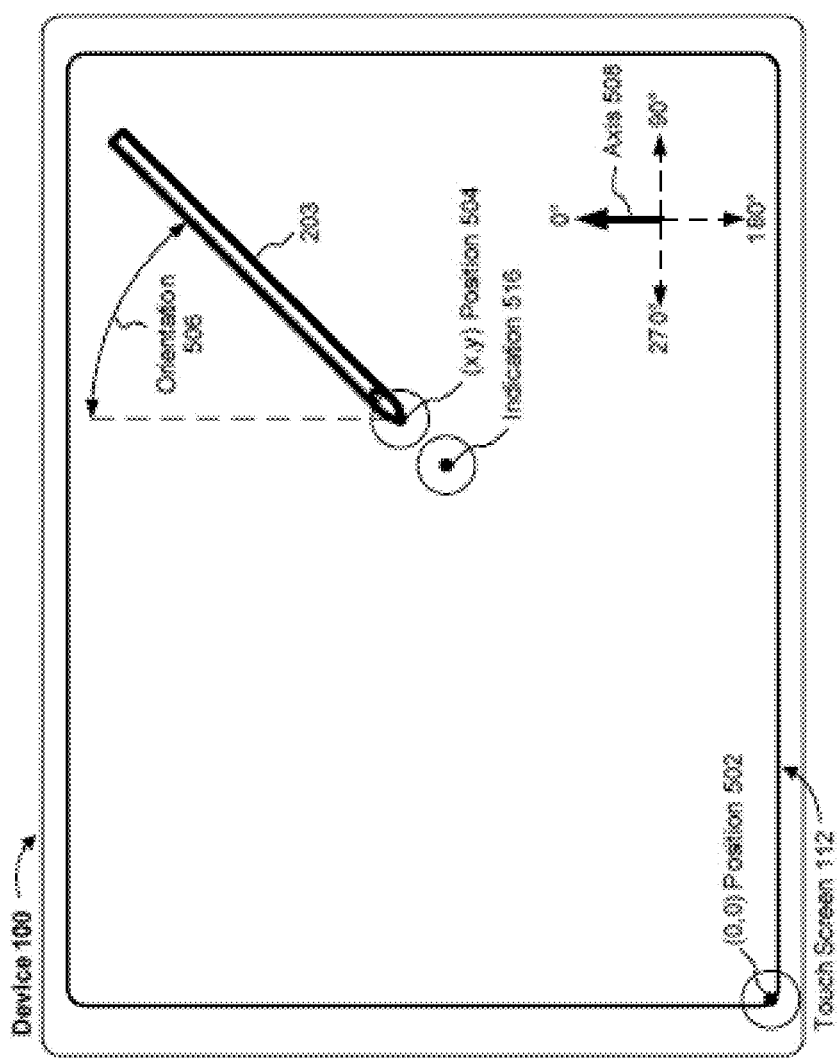
FIGS. 5A-5B illustrate a positional state of a stylus relative to a touch-sensitive surface in accordance with some embodiments
Figure 5A:
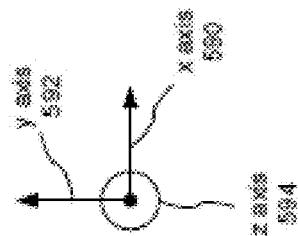
Figure 5B:
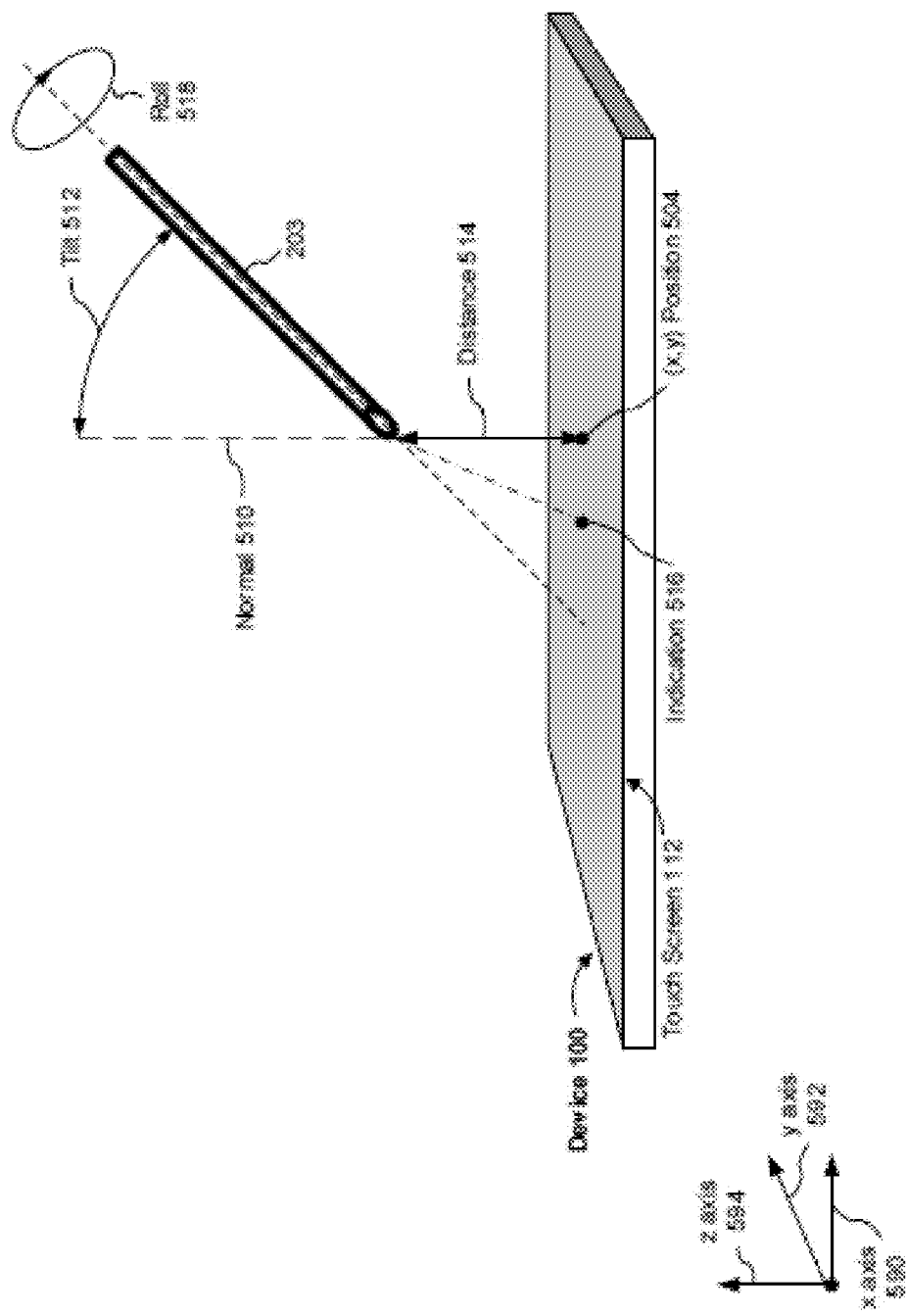

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6B and 7A-7Z illustrate exemplary user interfaces for enabling generation of contact-intensity-dependent interface responses. FIGS. 8A-8E illustrate a flow diagram of a method of enabling generation of contact-intensity-dependent interface responses. The user interfaces in FIGS. 7A-7Z are used to illustrate the processes in FIGS. 8A-8E.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
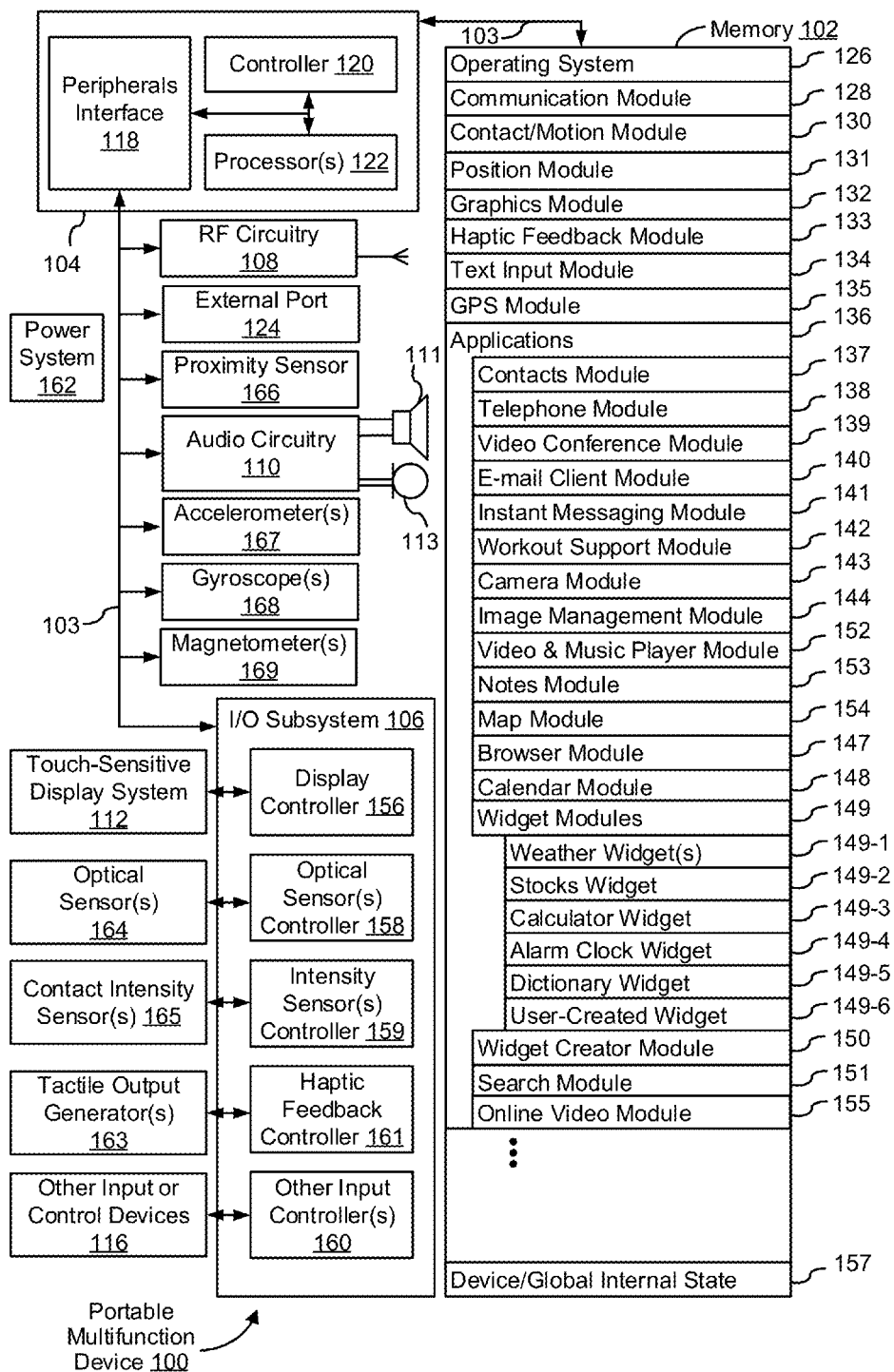
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
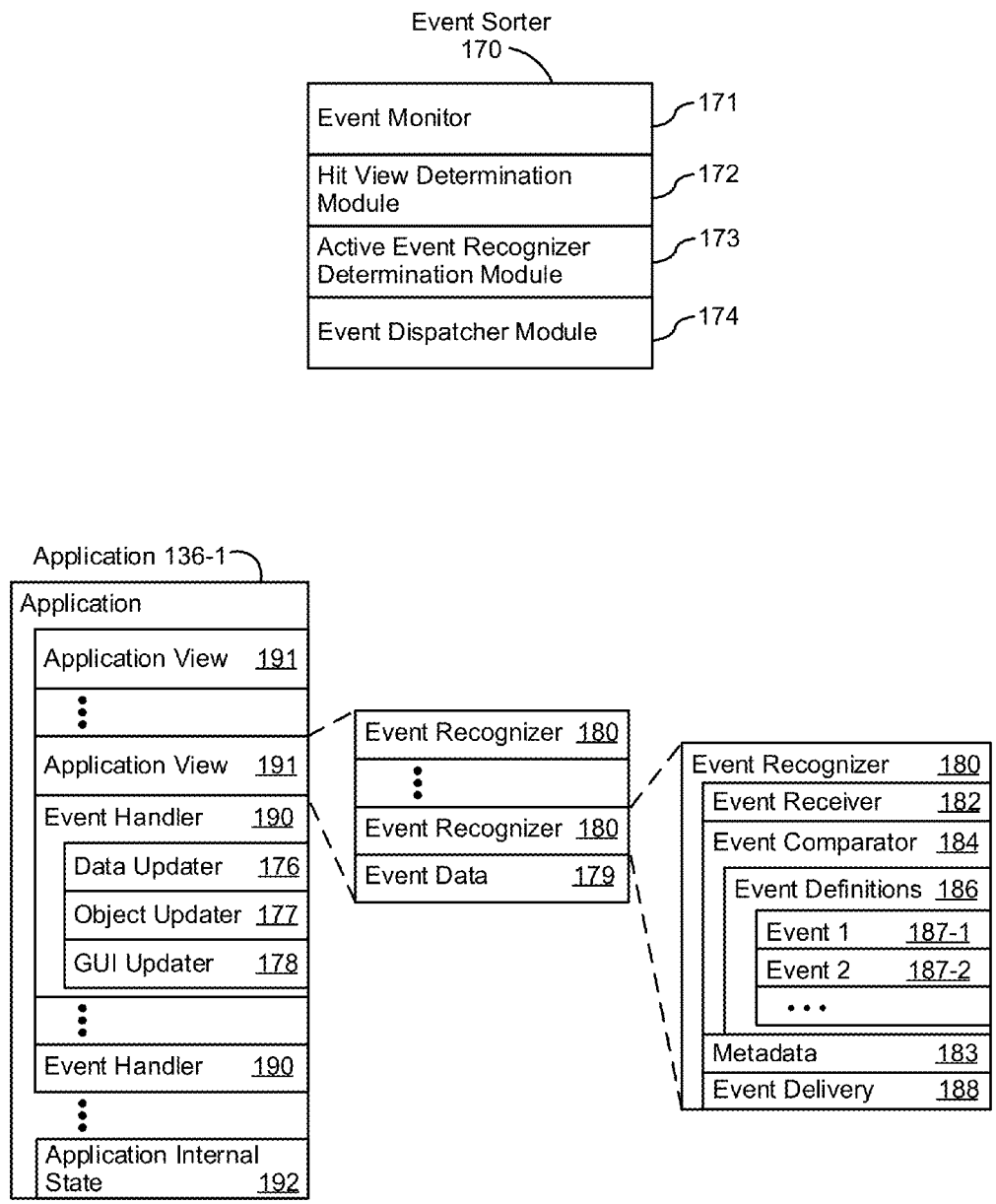
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG.

1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. Alternatively, in some embodiments, the positional state is detected in accordance with raw output, from one or more electrodes in the stylus, that is sensed by a touch-sensitive surface (e.g., touch screen 112 of device 100). For example, the touch-sensitive surface receives raw output from one or more electrodes in the stylus and calculates the tilt and/or the orientation of the stylus based on the raw output.

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points up (i.e., in a direction normal to the plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
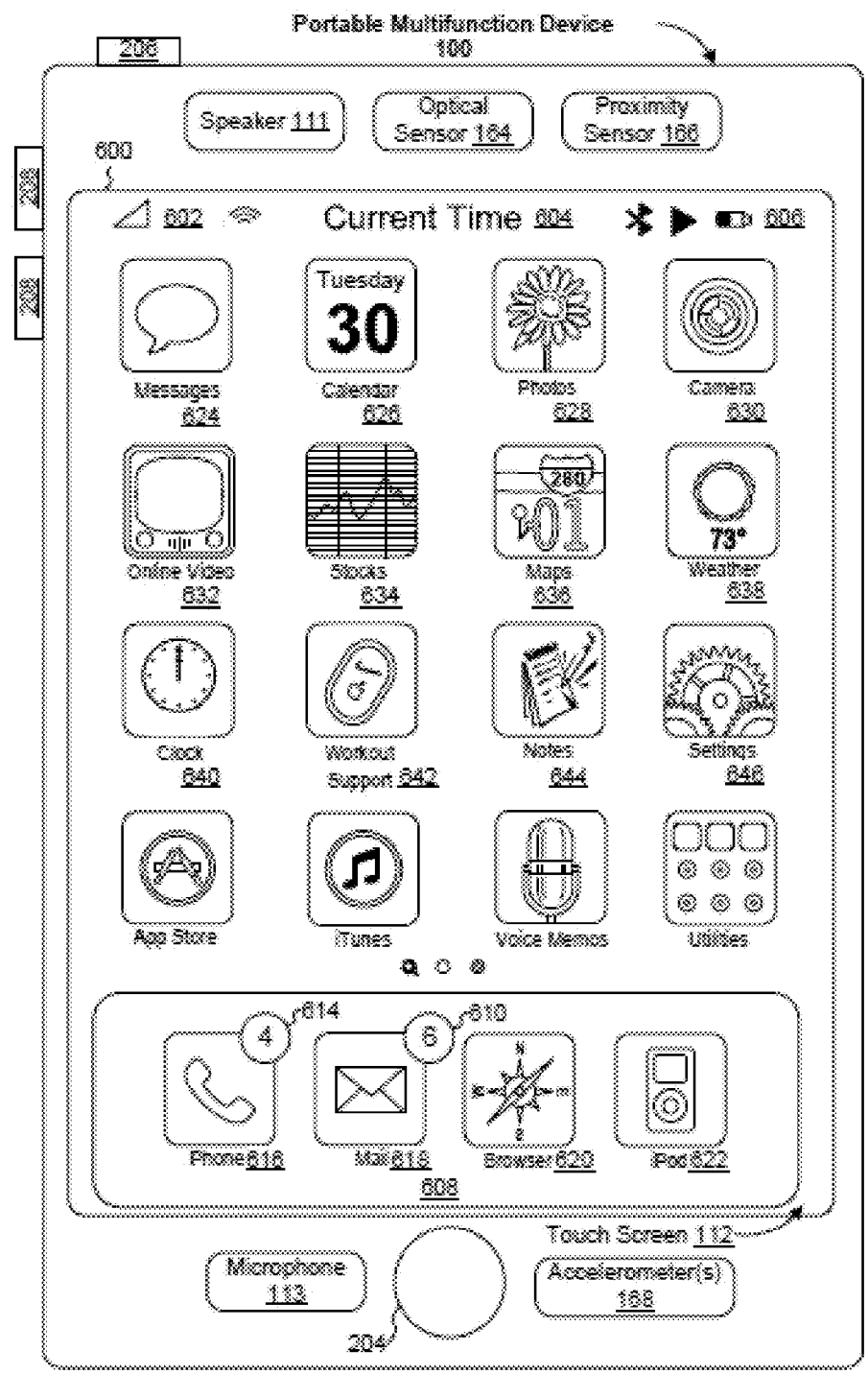
FIG. 6A illustrates an exemplary user interface for a menu of applications on a portable multifunction device in accordance with some embodiments.
Figure 7A:
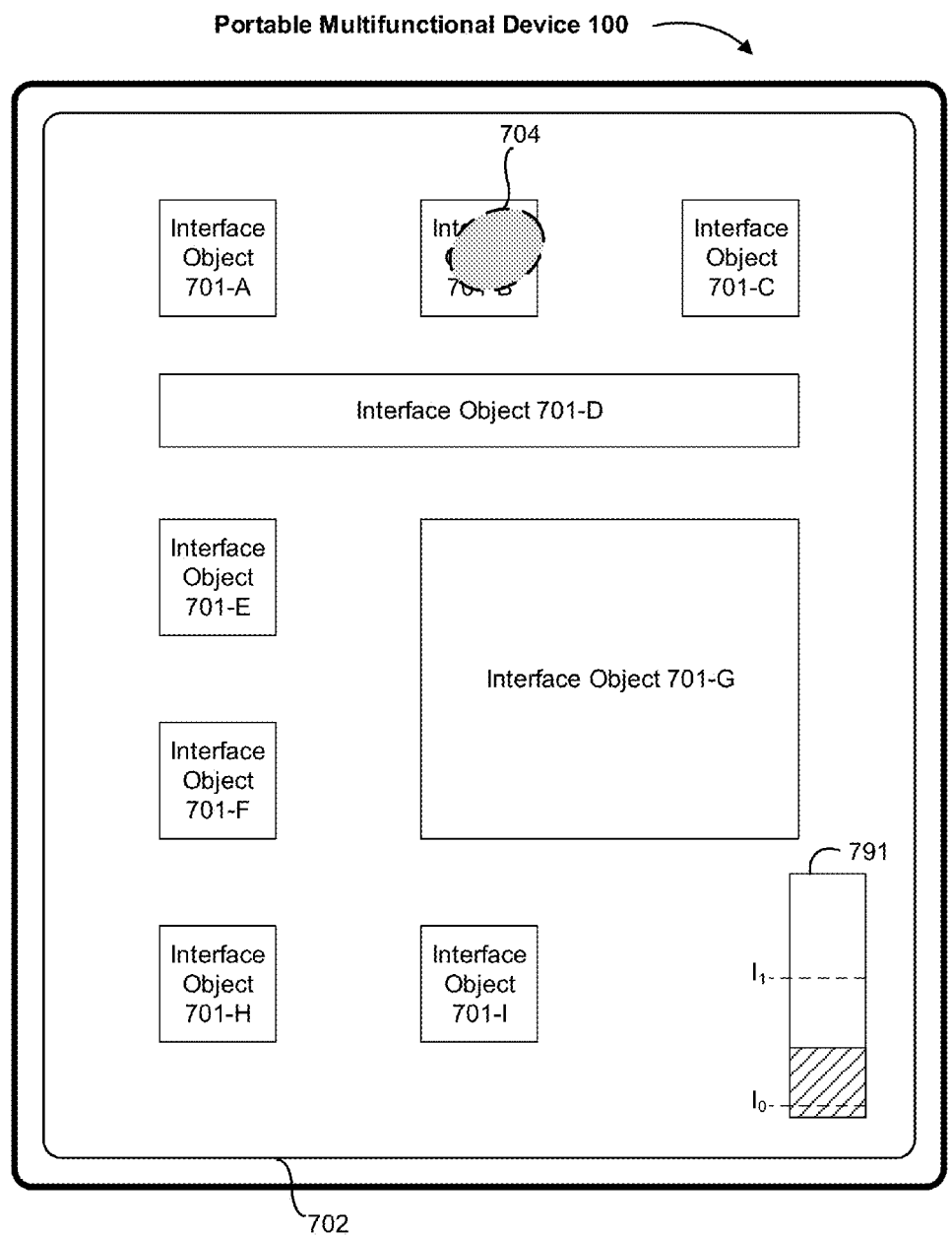
FIGS. 7A-7Z illustrate exemplary user interfaces for enabling generation of contact-intensity-dependent interface responses in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod (trademark of Apple Inc.) module 152, labeled "iPod;" and
Icons for other applications, such as:
  Icon 624 for IM module 141, labeled "Text;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Online Video;"
  Icon 634 for stocks widget 149-2, labeled "Stocks;"
  Icon 636 for map module 154, labeled "Map;"
  Icon 638 for weather widget 149-1, labeled "Weather;"
  Icon 640 for alarm clock widget 169-6, labeled "Clock;"
  Icon 642 for workout support module 142, labeled "Workout Support;"
  Icon 644 for notes module 153, labeled "Notes;" and
  Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
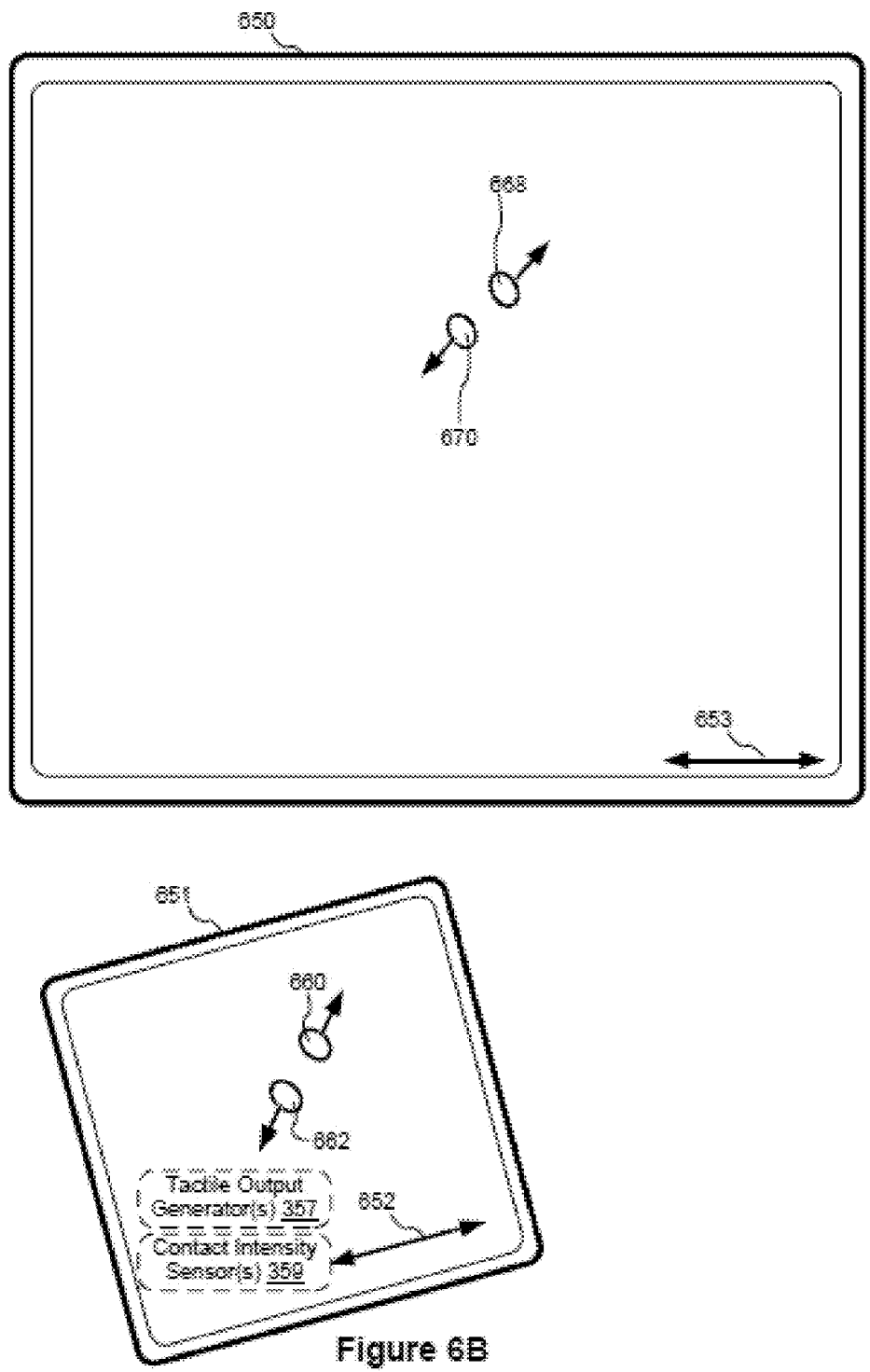
FIG. 6B illustrates an exemplary user interface for a multifunction device with a touch-sensitive surface that is separate from the display in accordance with some embodiments.

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from the display 650. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 6A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7Z) described below optionally include various intensity diagrams that show a detected intensity (e.g., intensity diagram 791) and/or a simulated intensity (e.g., intensity diagram 792) of the contact on the touch-sensitive surface relative to one or more intensity thresholds (e.g., a contact detection intensity threshold $I_0$, a light press intensity threshold $I_1$, a deep press intensity threshold $I_2$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $I_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $I_1$ to an intensity between the light press intensity threshold $I_1$ and the deep press intensity threshold $I_2$ is sometimes referred to as a "light press" input. An increase of characteristic intensity of the contact from an intensity below the deep press intensity threshold $I_2$ to an intensity above the deep press intensity threshold $I_2$ is sometimes referred to as a "deep press" input. An increase of characteristic intensity of the contact from an intensity below the contact-detection intensity threshold $I_0$ to an intensity between the contact-detection intensity threshold $I_0$ and the light press intensity threshold $I_1$ is sometimes referred to as detecting the contact on the touch-surface. A decrease of characteristic intensity of the contact from an intensity above the contact-detection intensity threshold $I_0$ to an intensity below the contact-detection intensity threshold $I_0$ is sometimes referred to as detecting liftoff of the contact from the touch-surface. In some embodiments $I_0$ is zero. In some embodiments, $I_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

FIGS. 7A-7Z illustrate exemplary user interfaces for enabling generation of a contact-intensity-dependent interface response in accordance with some embodiments. The user interfaces in these figures are used to illustrate the process described below in FIGS. 8A-8E. Although some of the examples which follow will be given with reference to inputs on a touch-screen display (where the touch-sensitive surface and the display are combined), in some embodiments, the device detects inputs on a touch-sensitive surface 651 that is separate from the display 650, as shown in FIG. 6B.

As shown in FIG. 7A-7Z, a device (e.g., portable multifunctional device 100 of FIG. 1A) displays a user interface 702 with a plurality of interface objects 701-A-701-I on a touch-screen display. Although substantially rectangular interface objects are illustrated in FIGS. 7A-7Z, the interface objects can be circular, irregular, or any other shape. At least one of the interface objects 701-B is associated with a plurality of contact-intensity-dependent interface responses. Thus, when the portable multifunctional device 100 detects a contact associated with the interface object 701-B and having a first contact intensity level value, a first interface response occurs, and when the portable multifunctional device 100 detects a contact associated the interface object 701-B and having a second contact intensity level value, a second interface response occurs. In some implementations, others of the interface objects 701-A-701-I are also associated with a respective plurality of contact-intensity-dependent interface responses. Further, although in some of the examples below, two or three interface responses are illustrated for a particular interface object, an interface object can be associated with any number of contact-intensity-dependent interface responses.

Figure 7B:
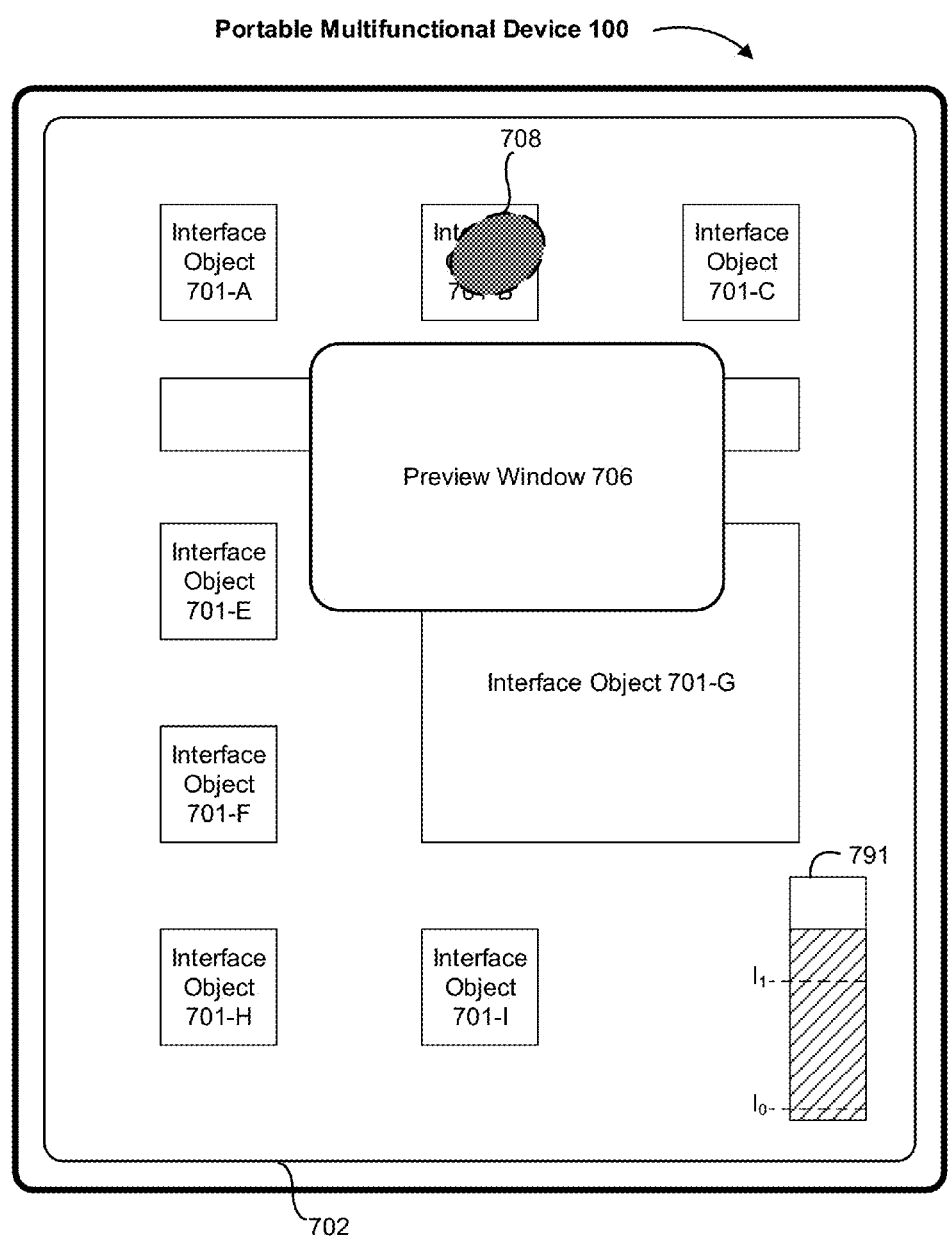
Figure 7C:
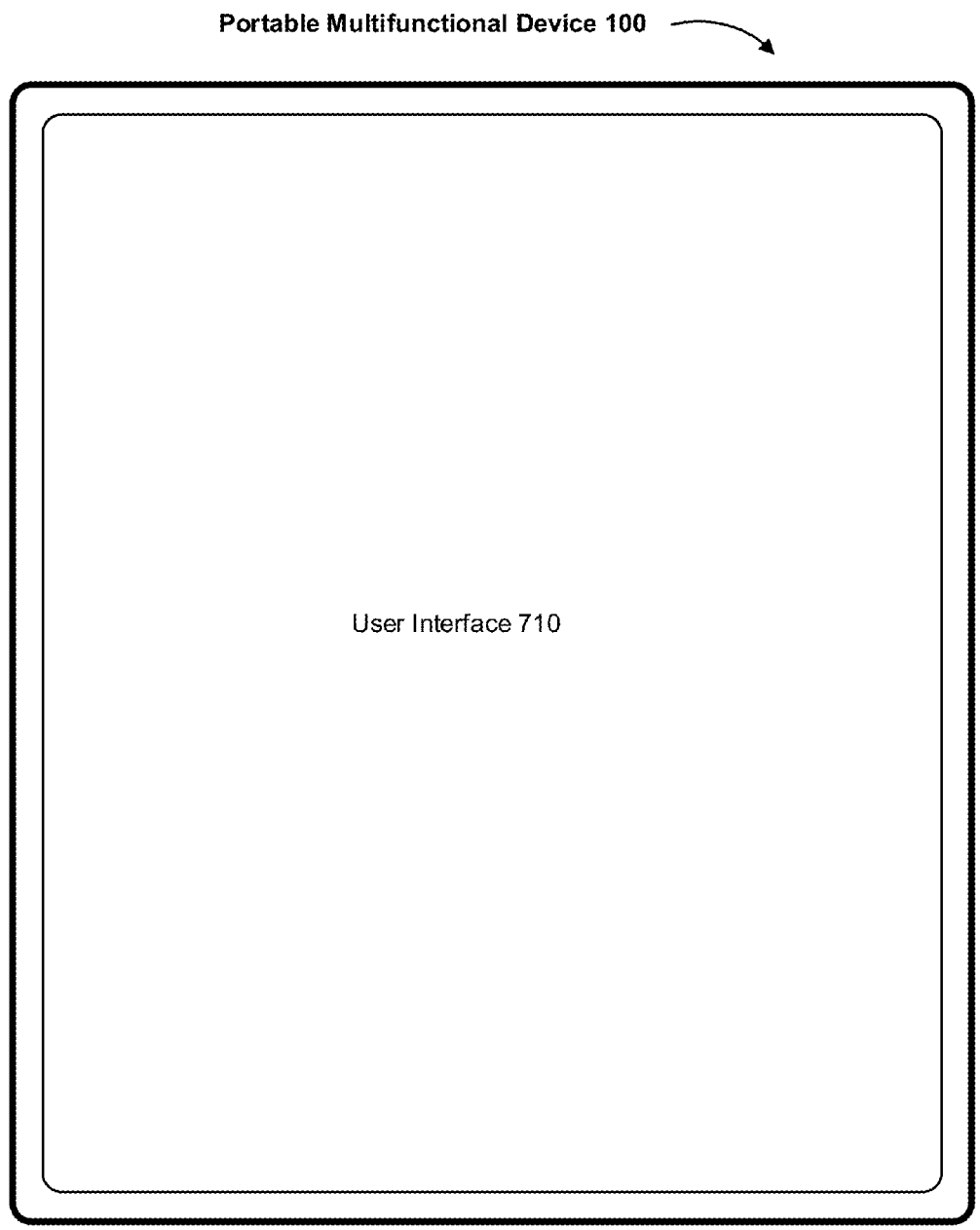
Figure 7D:
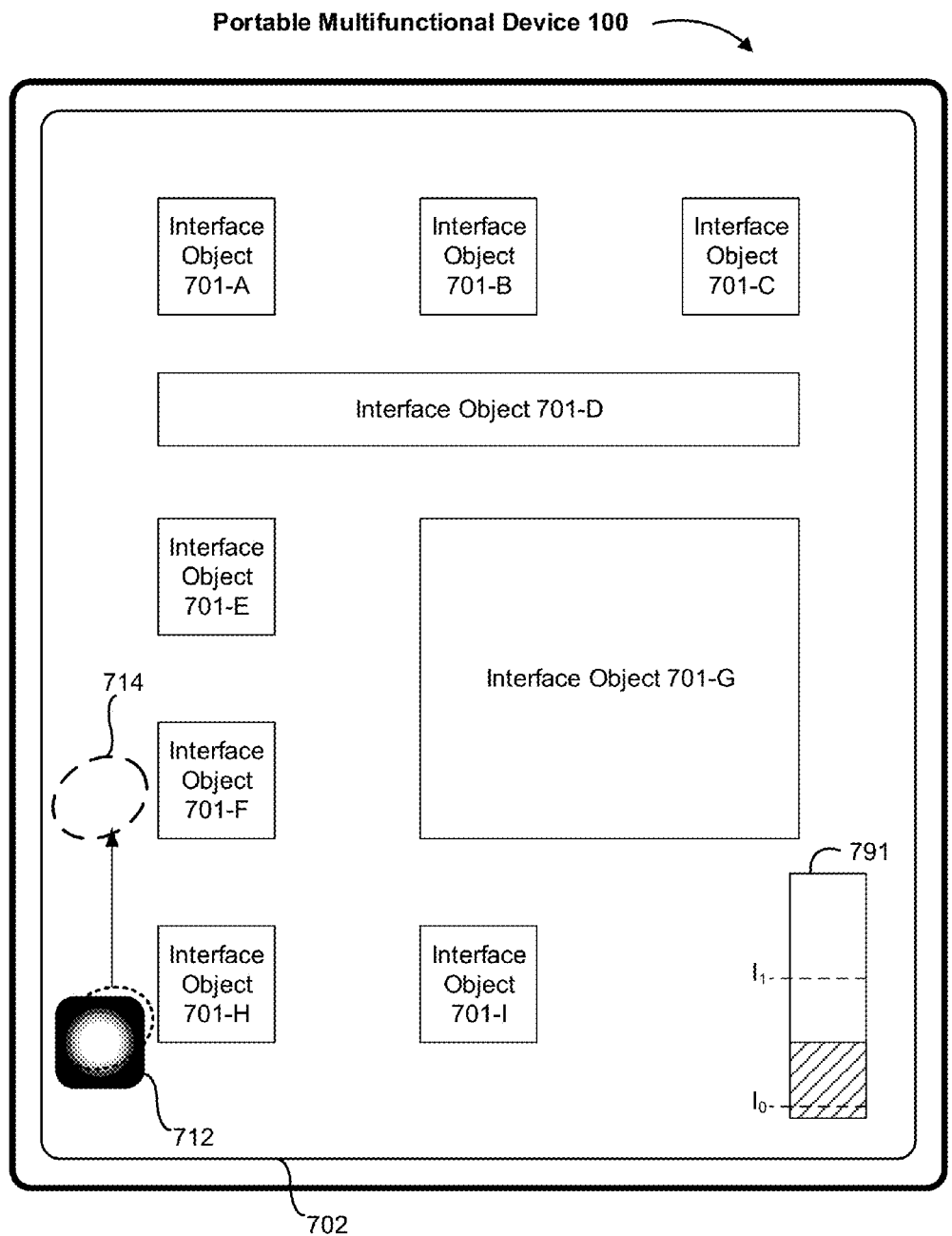

FIGS. 7A-7C illustrate exemplary user interfaces for interacting with an interface object associated with a plurality of contact-intensity-dependent responses when a first mode (e.g., a default mode) in enabled. FIGS. 7D-7Z illustrate exemplary user interfaces for interacting with the interface object when a second mode (e.g., an accessibility mode) is enabled. In particular, FIGS. 7D-7K illustrate a first embodiment of the second mode, FIGS. 7L-7U illustrate a second embodiment of the second mode, and FIGS. 7V-7Z illustrate various implementations of a third embodiment of the second mode. In some implementations, the first mode is enabled whenever the second mode is not enabled and the second mode is enabled whenever the first mode is not enabled. The device can provide an input affordance (e.g., an options menu) for allowing a user to select between the first mode and the second mode (or between various embodiments or implementations of the second mode).

FIG. 7A illustrates the user interface 702 displayed on a touch-sensitive display of a portable multifunctional device 100 when a default mode is enabled. FIG. 7A also illustrates a contact 704 at the location of the interface object 701B having a first contact intensity level value as shown by the detected intensity diagram 791. The contact 704 in FIG. 7A has a first contact intensity level value greater than zero (and greater than a contact detection threshold $I_0$), but below a threshold (e.g., press threshold $I_1$).

FIG. 7B illustrates the user interface 702 in response to detecting the contact 704 having the first contact intensity level at the location of the interface object 701-B. As shown in FIG. 7B, a preview window 706 is displayed in response to detecting the contact 704 at the location of the interface object 701-B, the contact 704 having a contact intensity level value greater than zero, but below the threshold. In the exemplary user interface 702 of FIG. 7B, the preview window 706 is a pop-up window that is displayed over other interface objects 701-A-701-I. In various implementations, other interface responses can occur in response to detection of the contact 704.

FIG. 7B also illustrates a contact 708 at the location of the interface object 701-B having a second contact intensity level as shown by the detected intensity diagram 791. The contact 708 in FIG. 7B has a second contact intensity level value that is greater than the threshold. In some implementations, the contact 708 is a continuation of the contact 704 of FIG. 7B (e.g. contact 704 and contact 708 form a single contact with increased force or pressure applied over time).

FIG. 7C illustrates the user interface 702 in response to detecting the contact 708 having the second contact intensity level at the location of the interface object 701-B. As shown in FIG. 7C, a different user interface 710 is displayed in response to detecting the contact 708 at the location of the interface object 701-B, the contact 708 having a contact intensity level value greater than the threshold. In the exemplary user interface 702 of FIG. 7C, the different user interface 710 is a new screen (e.g., content related to the content displayed in the preview window 706). In various implementations, other interface responses can occur in response to detection of the contact 708. Although not shown in FIG. 7C, the different user interface 710 can have a number of interface objects for further interaction.

FIG. 7D illustrates an exemplary user interface 702 displayed on a touch-sensitive surface of a portable multifunctional device 100 when a first embodiment of an accessibility mode is enabled. FIG. 7D illustrates an interaction menu activation interface object 712 at a periphery of the user interface 702. Although the interaction menu activation interface object 712 is illustrated in FIG. 7D at a periphery of the user interface 702, the interaction menu activation interface object 712 can be located anywhere in the user interface. Further, although the interaction menu activation interface object 712 is illustrated in FIG. 7D as a square icon, the interaction menu activation interface object 712 can be any shape or size.

FIG. 7D also illustrates a contact 714 that begins at the location of the interaction menu activation interface object 712 and moves upwards (e.g., a touch-drag contact). In FIGS. 7D-7Z, various contacts are illustrated. As described above, the portable multifunctional device 100 includes sensors capable of detecting the intensity of such contacts. However, the detected contact level intensity value (at least as being above or below the threshold $I_1$) does not affect the user interface 702 in the second mode. The detected intensity of the contacts in FIGS. 7D-7Z is shown by detected intensity diagram 791 along with a simulated intensity (when such is provided) shown by simulated intensity diagram 792.

Figure 7E:
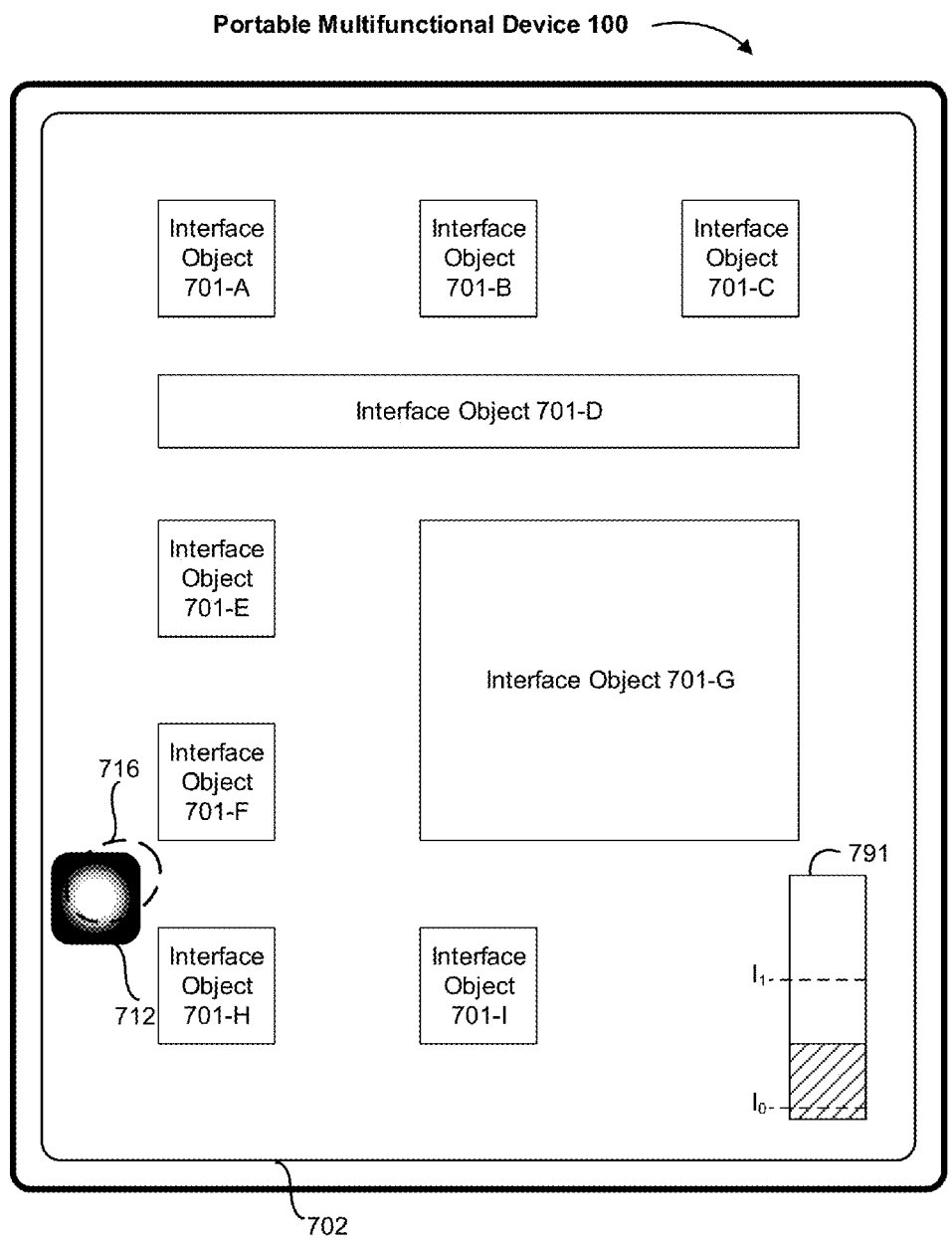

FIG. 7E illustrates the user interface 702 in response to detecting the contact 714 at the location of the interaction menu activation interface object 712. As compared to the user interface 702 of FIG. 7D, the interaction menu activation interface object 712 is moved upwards proportional to the distance of the contact 714. Thus, the contact 714 moves the interaction menu activation interface object 712. Although FIGS. 7D-7E illustrate that the interaction menu activation interface object 712 can be moved with a touch-drag contact, in some implementations, the interaction menu activation interface object 712 can be moved through other inputs. For example, in some implementations, the location of the interaction menu activation interface object 712 can be set via an options menu. In some implementations, the interaction menu activation interface object 712 can be moved by a prolonged contact (e.g., a contact having a duration longer than a threshold) at the location of the interaction menu activation interface object 712, followed by a contact at a desired location. In some implementations, the interaction menu activation interface object 712 can be moved by a first contact at the location of the interaction menu activation interface object 712 followed by (while the first contact is maintained) a second contact at the desired location.

FIG. 7E also illustrates a contact 716 at the current location of the interaction menu activation interface object 712.

Figure 7F:
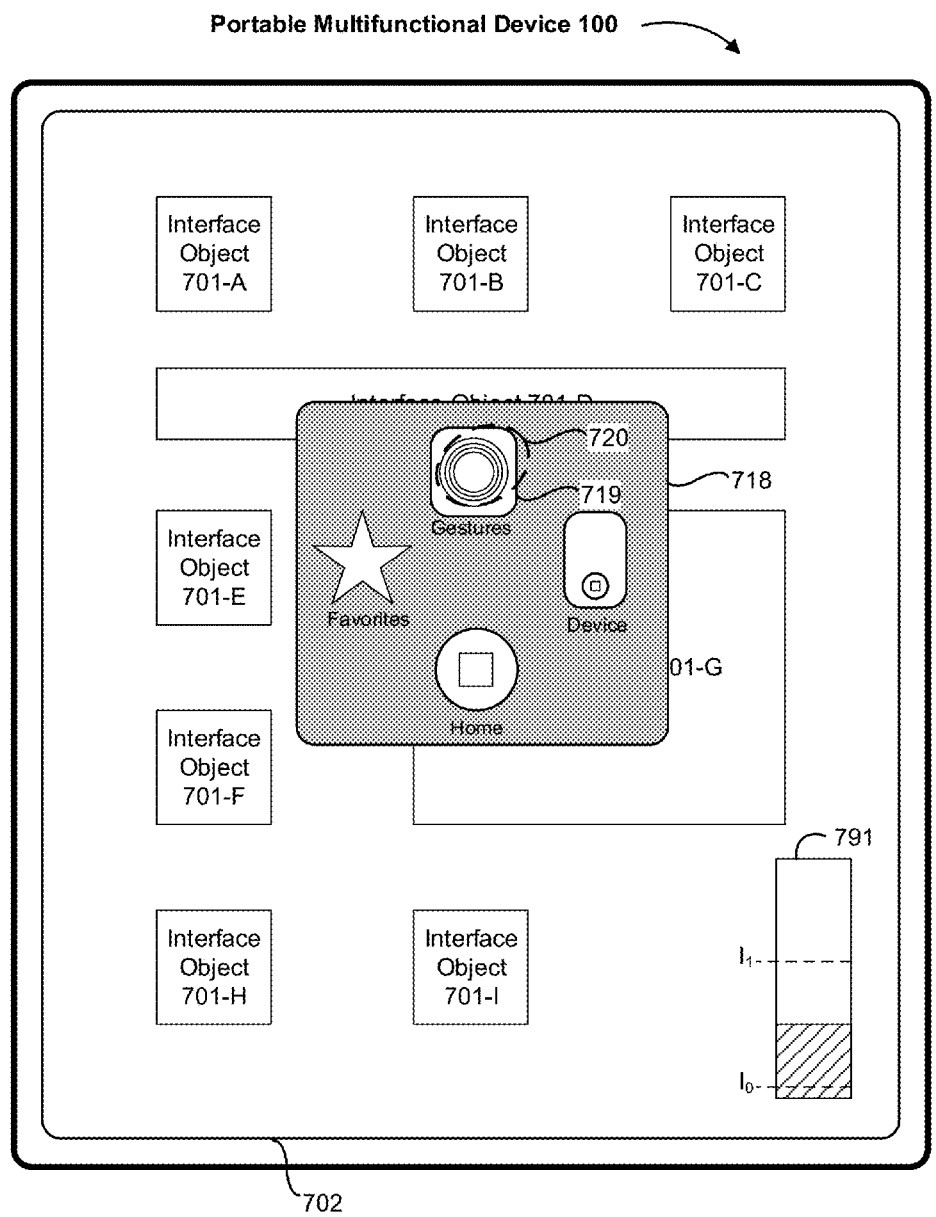

FIG. 7F illustrates the user interface 702 in response to detecting the contact 716 at the location of the interaction menu activation interface object 712. As shown in FIG. 7F, the interaction menu activation interface object 712 ceases to be displayed and an interaction menu 718 is displayed proximal to a center of the user interface 702 over the various other interface objects 701-A-701-I. The interaction menu 718 includes a number of interface objects for simulating various interactions with the user interface 702, including a gestures interface object 719.

Although illustrated in FIG. 7F proximal to the center of the user interface 702, in some implementations, the interaction menu 718 is displayed at other locations of the user interface, e.g., at a periphery of the user interface 702. In particular, in some implementations, the interaction menu 718 is displayed at a bottom of the user interface. Further, although FIG. 7F illustrates the interaction menu 718 displayed over the other interface objects, in some implementations, the interaction menu 718 displaces the other interface objects of the user interface 702. For example, the interaction menu 718 can be displayed at the bottom of the user interface and the remainder of the user interface resized to accommodate the interaction menu 718. FIG. 7F illustrates the interface objects of the interaction menu 718 situated in a radial pattern, approximately an equal distance from the center of the interaction menu 718. In some implementations, the interface objects are arranged in a line or in another configuration. Although exemplary interface objects for the interaction menu 718 are shown in FIG. 7F, the interaction menu 718 can include other sets of interface objects. Further, although the interaction menu 718 of FIG. 7F includes exemplary labels associated with the interface objects, in some implementations, other labels or no labels are used.

FIG. 7F also illustrates a contact 720 at the location of the gestures interface object 719.

Figure 7G:
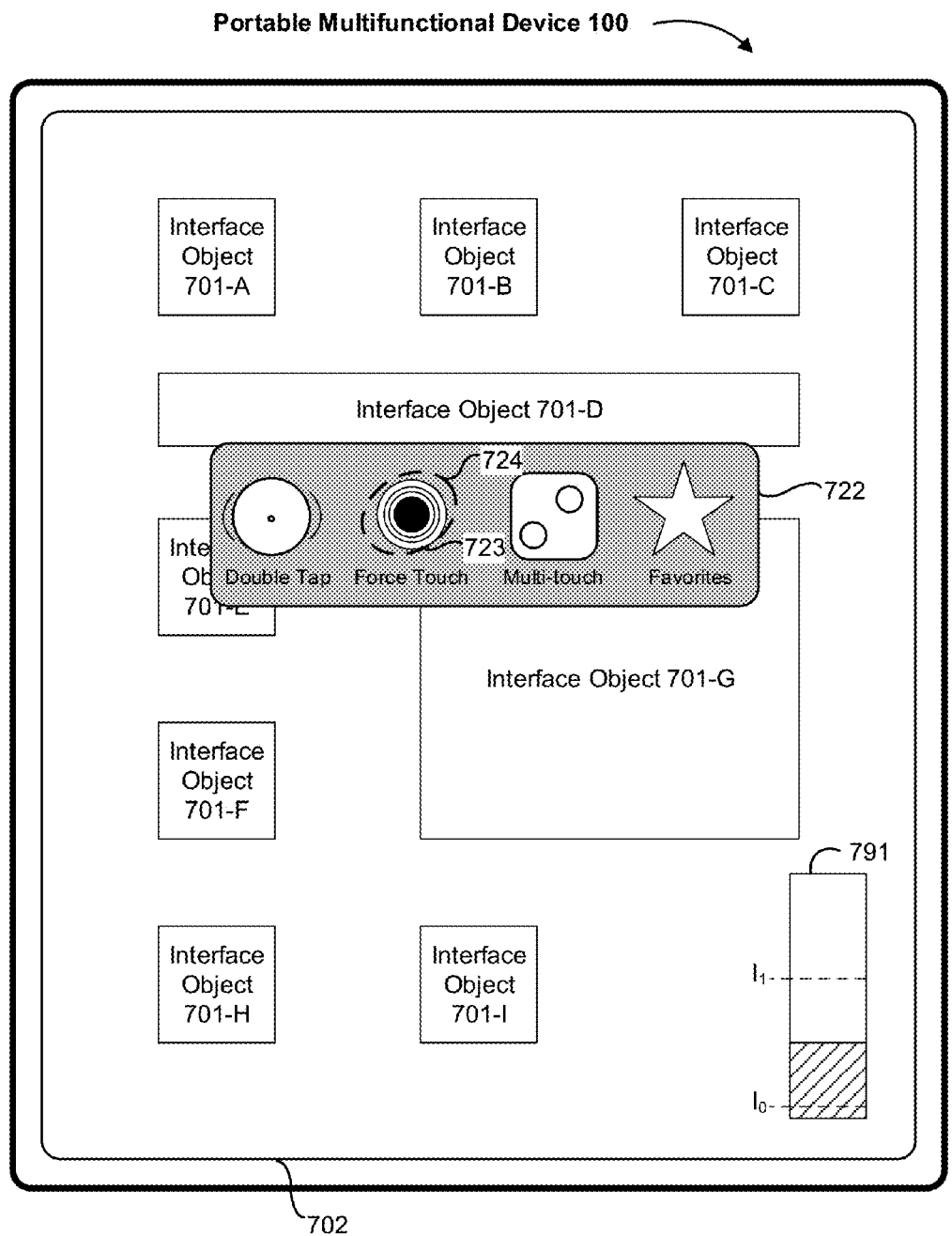

FIG. 7G illustrates the user interface 702 in response to detecting the contact 720 at the location of the gestures interface object 719. As shown in FIG. 7G, the interaction menu 718 ceases to be displayed and a gestures menu 722 is displayed at approximately the same location of the user interface 702. The gestures menu 722 includes a number of interface objects for simulating various contact gestures on the user interface 702, including a force touch gesture selection interface object 723. Although exemplary interface objects for the gestures menu 722 are shown in FIG. 7G, the gestures menu 718 can include other sets of interface objects. Further, although the gestures menu 722 of FIG. 7G includes exemplary labels associated with the interface objects, in some implementations, other labels or no labels are used.

FIG. 7G also illustrates a contact 724 at the location of the force touch gesture selection interface object 723.

FIGS. 7E-7G show that, in some implementations, detection of a first contact 716 with the interaction menu activation interface object 712 results in display of an interaction menu 718 including a gestures interaction object 719 and detection of a second contact 720 with the gestures interaction object 719 results in display of a gestures menu including a force touch gesture selection interface object 723. However, in some implementations, detection of a first contact 716 with the interaction menu activation interface object results in a display of an interaction menu 718 including the force touch gesture selection interface object 723 without an intermediate menu. In some implementations, the device displays additional intermediate menus to reach the force touch gesture selection interface object 723.

Figure 7H:
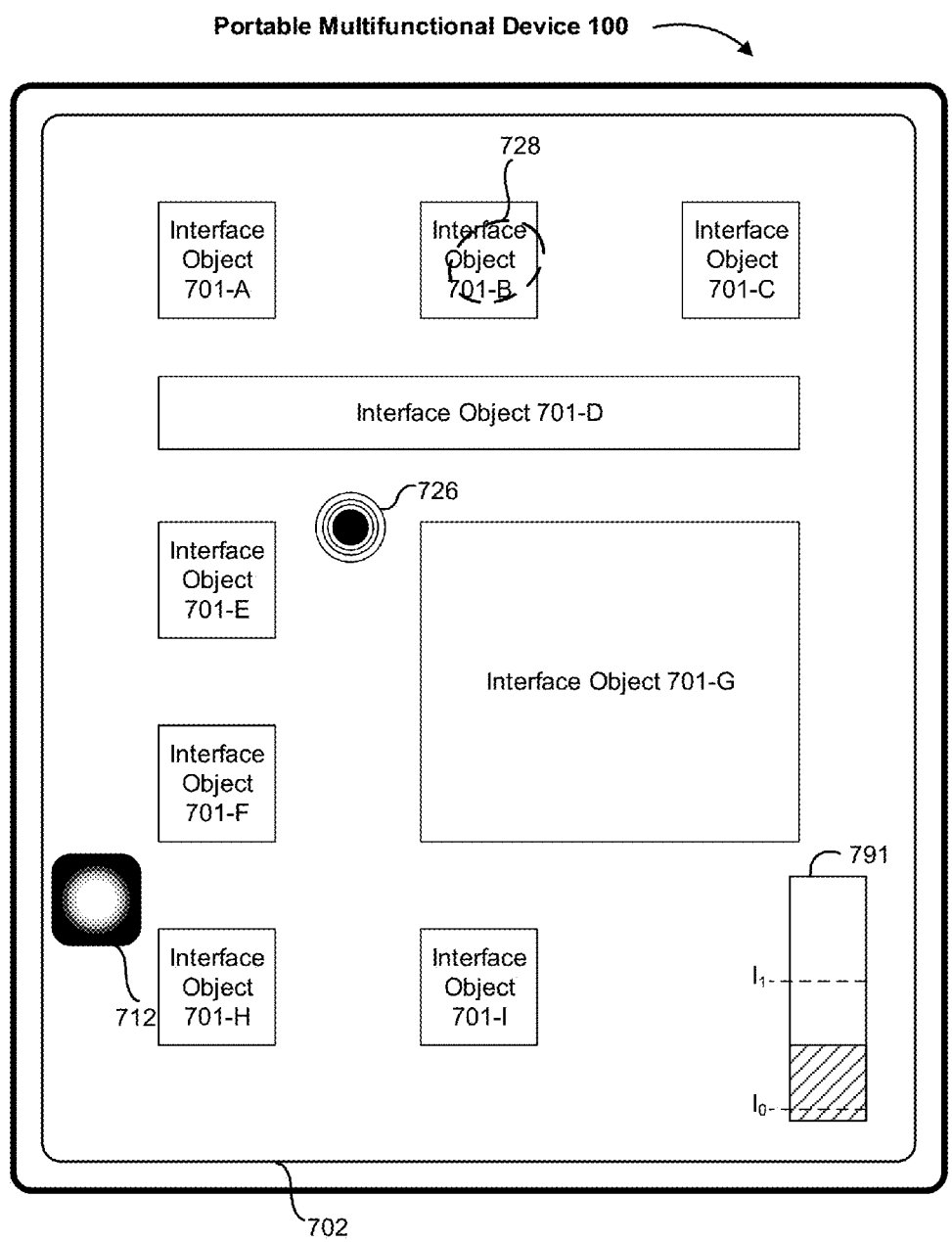

FIG. 7H illustrates the user interface 702 in response to detecting the contact 724 at the location of the force touch gesture selection interface object 723. As shown in FIG. 7H, the gestures menu 722 ceases to be displayed and a force touch gesture activation interface object 726 is displayed on the user interface 702. Further, the interaction menu activation interface object 712 is once again displayed on the user interface.

FIG. 7H further illustrates a contact 728 at a location of the interface object 701-B.

Figure 7I:
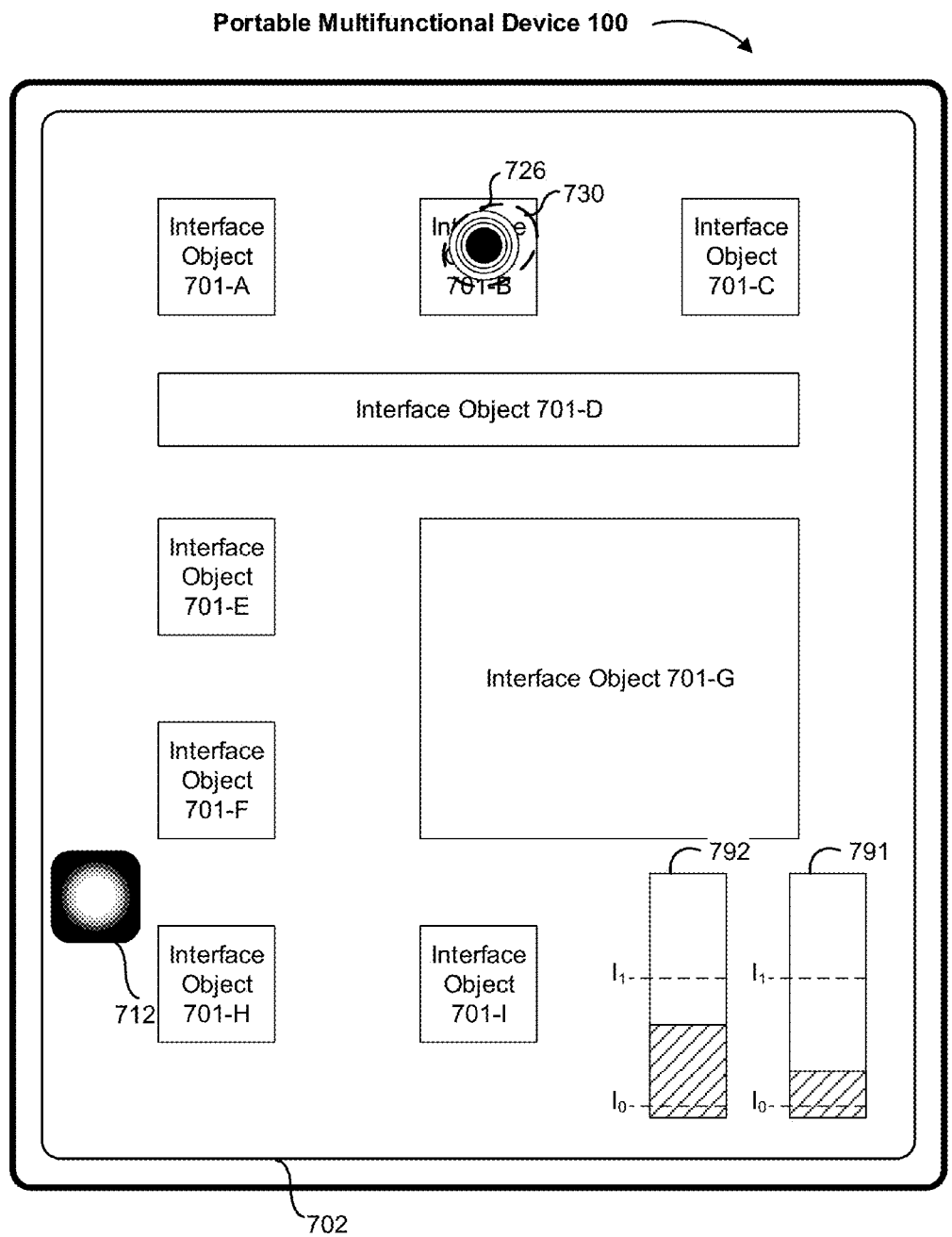

FIG. 7I illustrates the user interface 702 in response to detecting the contact 728 at the location of the interface object 701-B. As shown in FIG. 7I, display of the force touch gesture activation interface object 726 is moved to the location of the contact 728 (e.g., the location of the interface object 701-B). In some implementations, the force touch gesture activation interface object 726 is moved to the location of the interface object 701-B by other inputs. For example, in some implementations, the force touch gesture activation interface object 726 is moved by a touch-drag contact or in a similar manner to the movement of the interaction menu activation object 712 described above with respect to FIGS. 7D-7E.

FIG. 7I further illustrates a contact 730 at the location of the force touch gesture activation interface object 726. Although the contact 730 has a detected contact intensity level value as shown by the detected intensity level diagram 791, the device generates a simulated contact intensity level for the contact 730 as shown by the simulated intensity level diagram 792 in response to detecting the contact 730 at the location of the force touch gesture activation interface object 726. The simulated contact intensity level value is below the threshold, but different from the detected contact intensity level value.

Figure 7J:
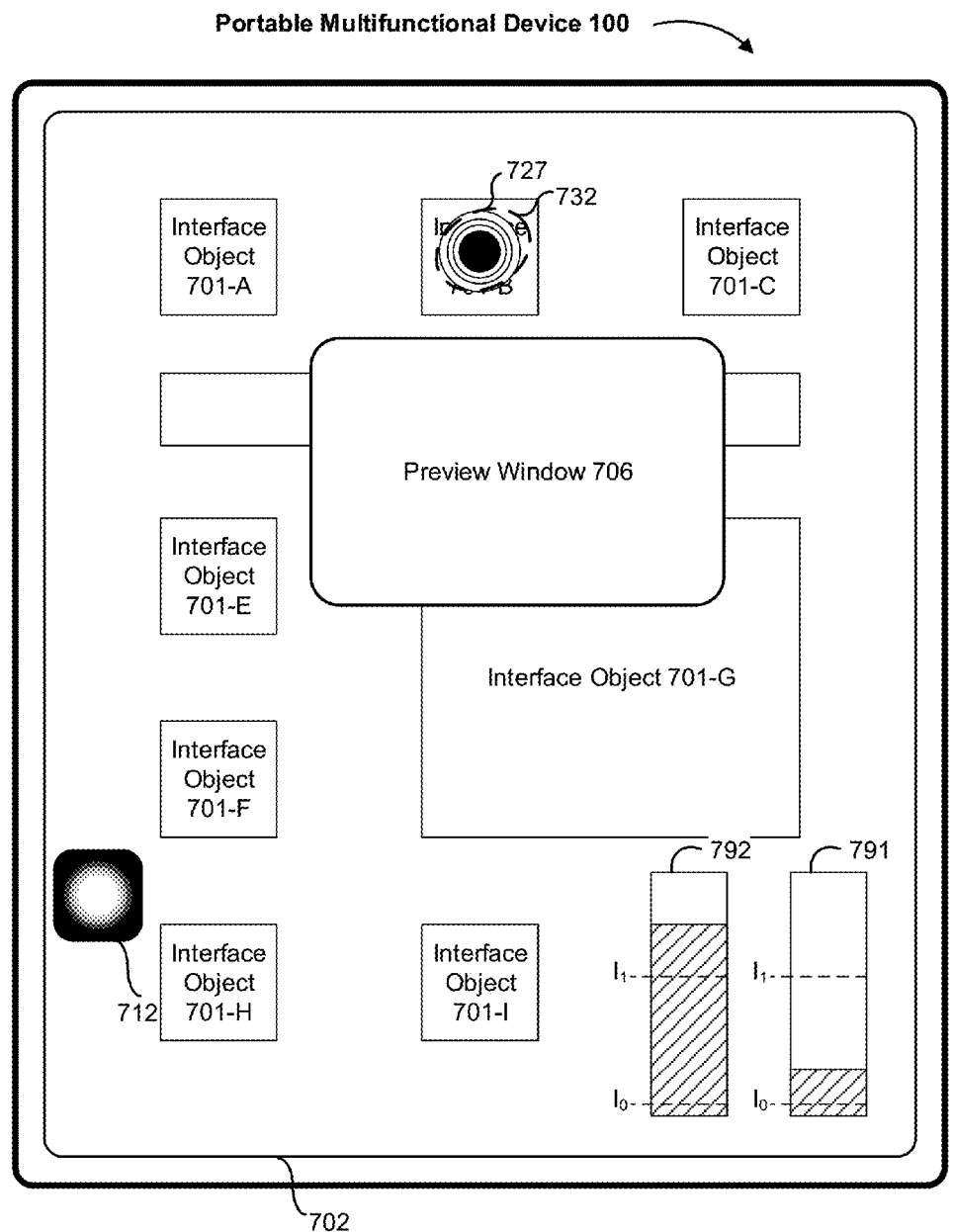

FIG. 7J illustrates the user interface 702 in response to detecting the contact 730 at the location of the force touch gesture activation interface object 726 (e.g., in response to the simulated contact intensity level value of the contact 730). As shown in FIG. 7J, the preview winder 706 is displayed in response to detecting the contact 730 at the location of the force touch gesture activation interface object 726 displayed at the location of the interface object 701-B. The preview window 706 is the same preview window 706 illustrated in FIG. 7B which is displayed, when the default mode is enabled, in response to detecting a contact at the location of the interface object 701-B having a first contact intensity level.

FIG. 7J further illustrates an enlarged force touch gesture activation interface object 727 at the location of the interface object 701-B. The enlarged force touch gesture activation interface object 727 indicates the simulation of a contact having the first contact intensity level. After a threshold amount of time (e.g., 8 seconds) without further interaction, simulation of the contact ceases and the user interface 702 returns to the state illustrated in FIG. 7D. Further, if a contact is detected away from the location of the enlarged force touch gesture activation object 727, the user interface 702 returns to the state illustrated in FIG. 7D. However, FIG. 7J illustrates a contact 732 at the location of the enlarged force touch gesture activation object 727. Although the contact 732 has a detected contact intensity level value as shown by the detected intensity level diagram 791, the device generates a simulated contact intensity level as shown by the simulated intensity level diagram 792 in response to detecting the contact 732 at the location of the enlarged force touch gesture activation interface object 727. Although the detected contact intensity level value is below the threshold, the simulated contact intensity level value is above the threshold.

Figure 7K:
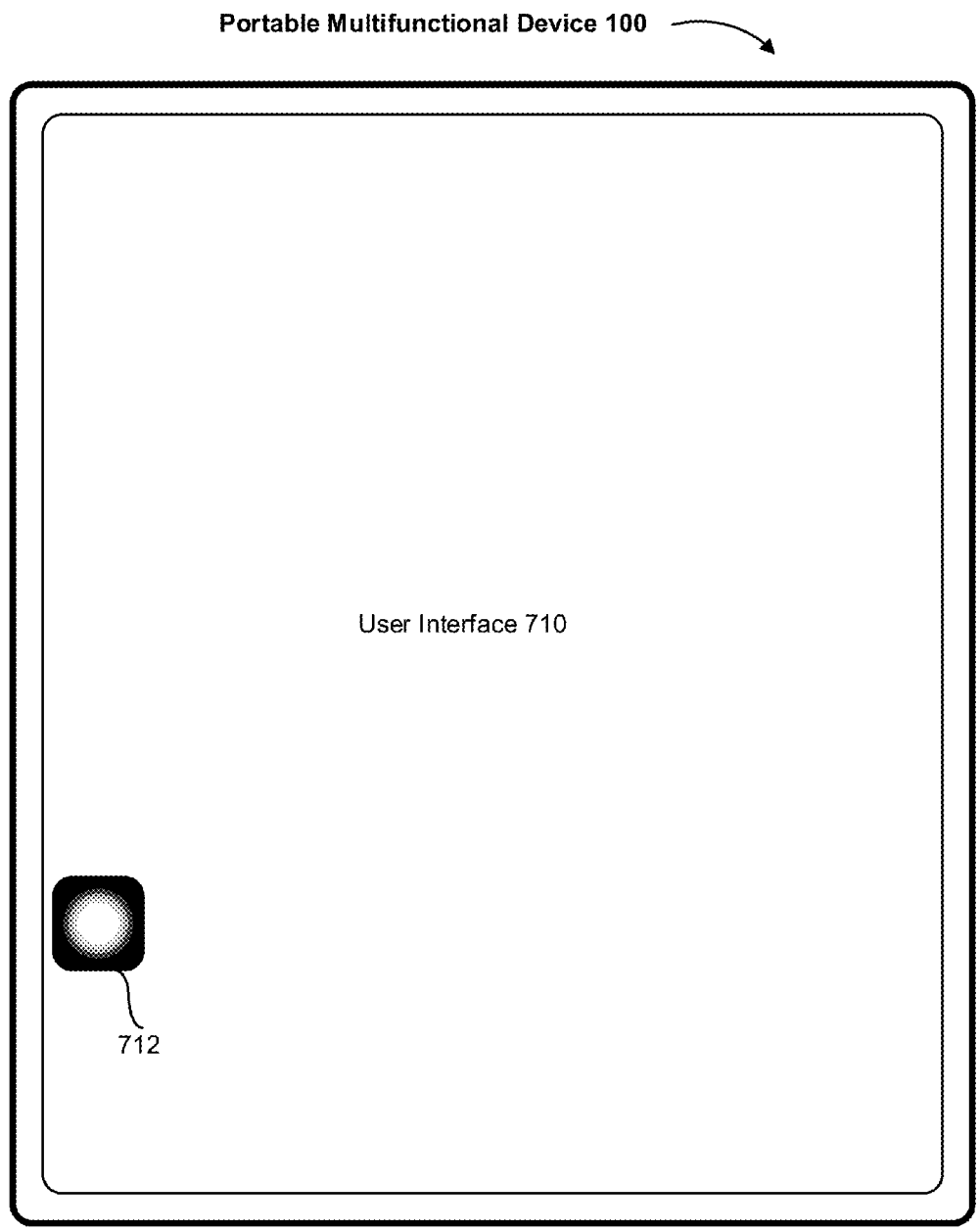

FIG. 7K illustrates the user interface 702 in response to detecting the contact 732 at the location of the enlarged force touch gesture activation interface object 727 (e.g., in response to the simulated contact intensity level of the contact 732) before the threshold amount of time has passed (e.g., within 8 seconds of the contact 730 of the force touch gesture activation interface object 726 of FIG. 7I). As shown in FIG. 7K, the different user interface 710 is displayed in response to detecting the contact 732 at the location of the enlarged force touch gesture activation interface object 727 displayed at the location of the interface object 701-B. The different user interface 710 is the same user interface 710 illustrated in FIG. 7C which is displayed, when the default mode is enabled, in response to detecting a contact at the location of the interface object 701-B having the second contact intensity level. FIG. 7K illustrates that the user interface 702 includes display of the interaction menu activation interface object 712 for further interaction with the user interface 702 after the different user interface 710 is displayed (e.g., for interacting with interface objects displayed on the different user interface 710).

Figure 7L:
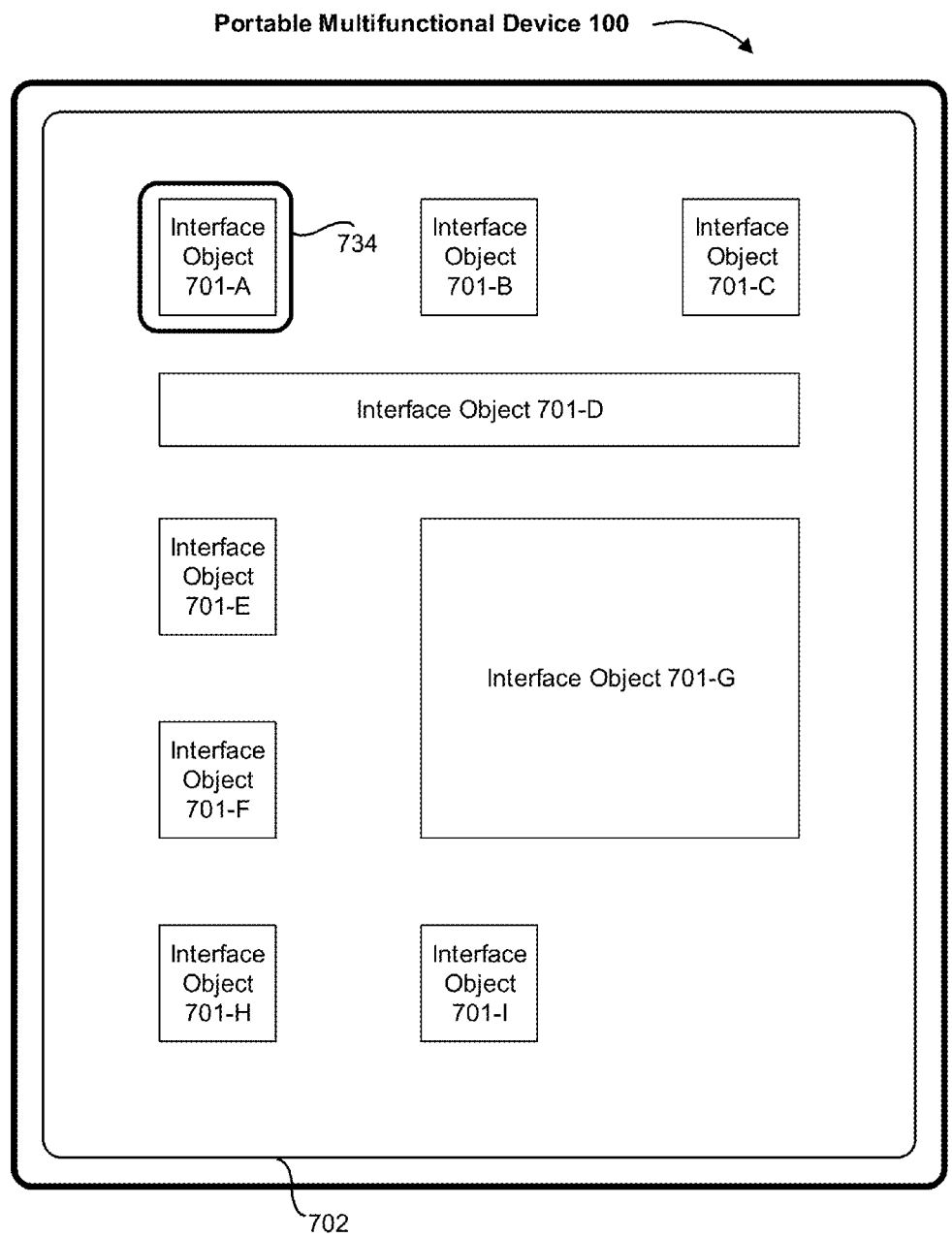
Figure 7M:
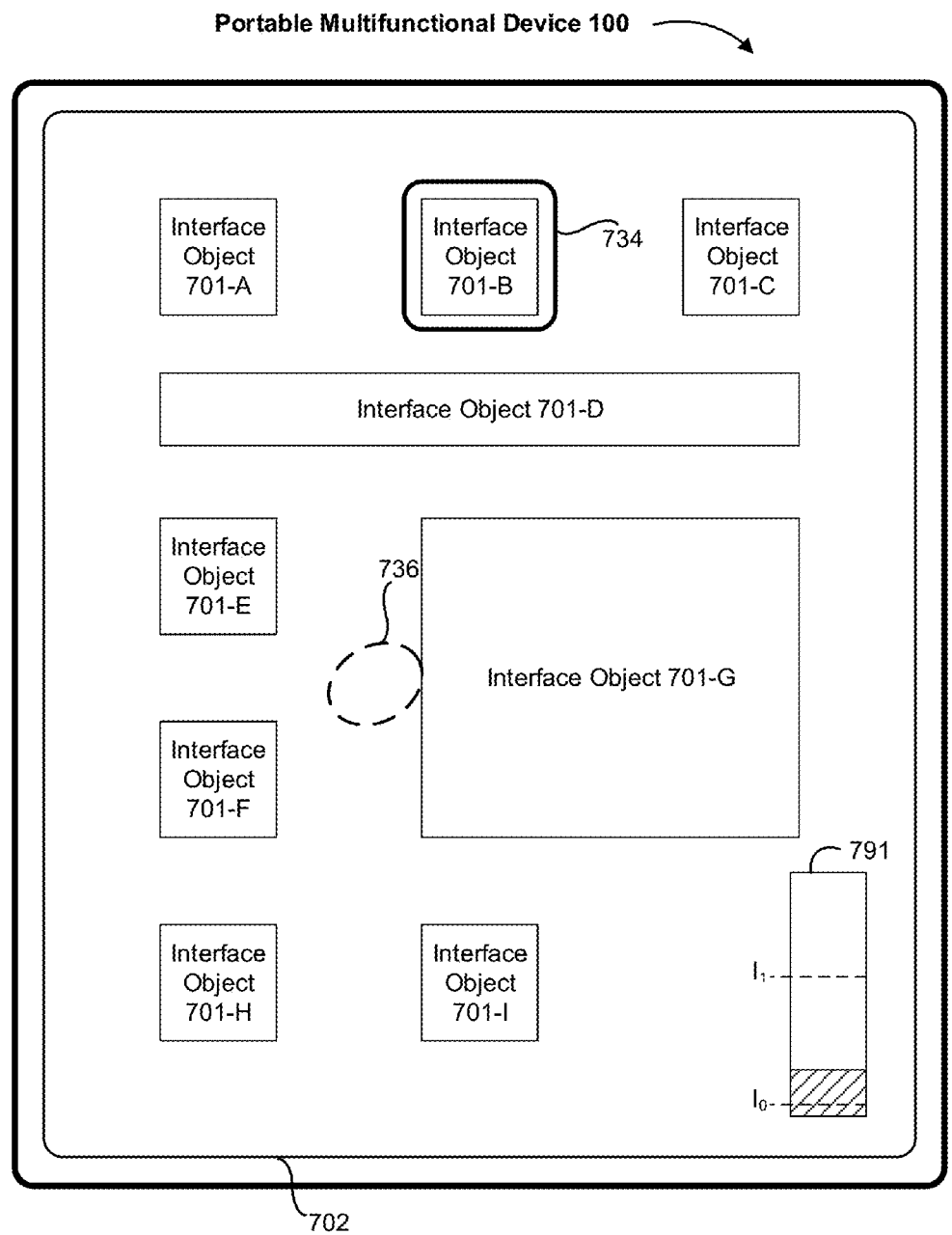

FIG. 7L illustrates an exemplary user interface 702 displayed on a touch-sensitive surface of a portable multifunctional device 100 when a second embodiment of an accessibility mode is enabled. FIG. 7L illustrates that the user interface 702 includes display of a selection indictor 734 surrounding a first one of the interface objects 701-A. The selection indictor 734 cycles through highlighting the interface objects 701-A-701-I at a set rate or cycle frequency. Thus, after a set amount of time, even without detecting interaction, the selection indicator 734 surrounds a second interface object 701-B as illustrated in FIG. 7M. After the set amount of time, without detecting interaction, the selection indicator 734 surrounds a third interface object 701-C. However, FIG. 7M illustrates a contact 736 on the touch-sensitive surface of the portable multifunctional device 100 while the selection indicator 734 surrounds the interface object 701-B.

Although FIGS. 7L-7M illustrate the selection indicator 734 as surrounding the interface object 701-B, in various implementations, the selection indicator 734 indicates the location of the interface object 701-B in other ways. For example, in various implementations, the selection indicator 734 surrounds the interface object, is displayed over the interface object, highlights the interface object, points to a location of interface object, or otherwise indicates the location of the interface object.

Further although FIG. 7M illustrates a contact 736 on the touch-sensitive surface of the portable multifunctional device 100, in some implementations, the same input is provided via a switch device. The switch device can include, for example, a push-button, a camera to capture body or facial gestures (e.g., eye-blinks, head nods, etc.), or (as in the description below) the whole of the touch-sensitive surface configured by the second mode to function as a switch.

Figure 7N:
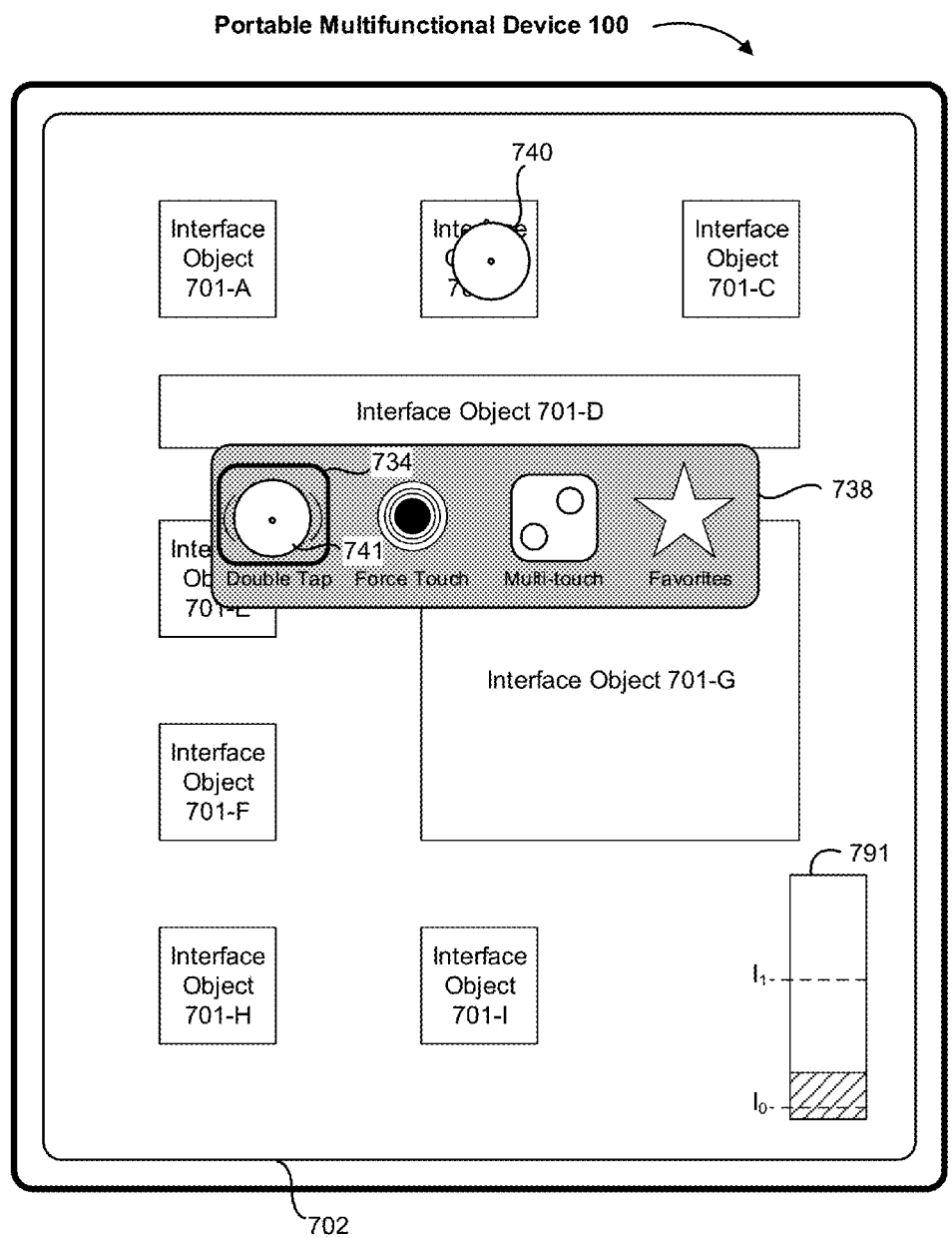
Figure 7O:
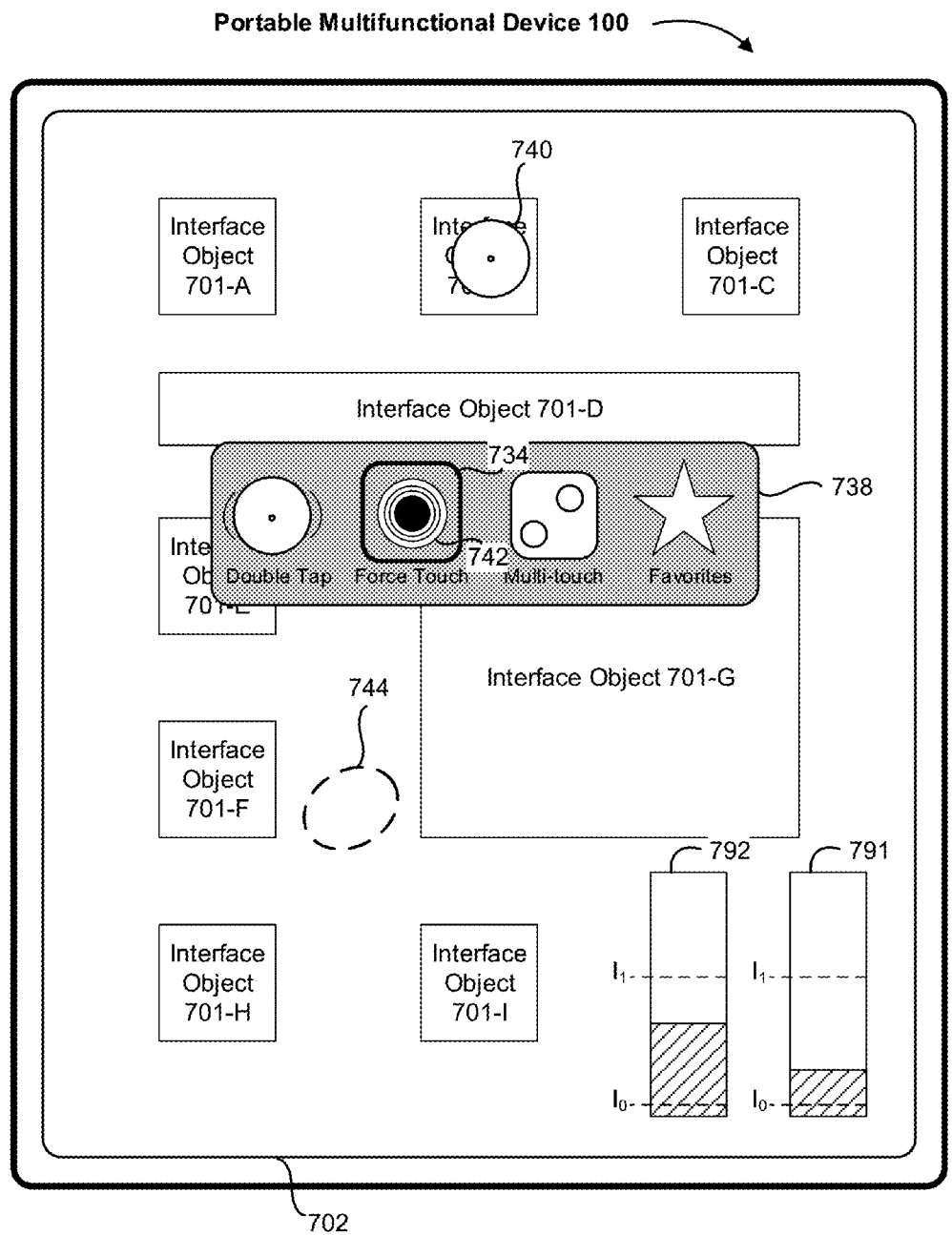

FIG. 7N illustrates the user interface 702 in response to detecting the contact 736 while the selection indicator 734 surrounds the interface object 701-B. As shown in FIG. 7N, a selected object indicator 740 is displayed at the location of the interface object 701-B. Further, a gesture activation menu 738 is displayed having a number of gesture activation interface objects. Initially, as shown in FIG. 7N, the selection indicator 734 surrounds a first gesture activation interface object, a double tap activation object 741. The selection indictor 734 cycles through highlighting the interface objects of the gesture activation menu 738 at a set rate or cycle frequency. Thus, after a set amount of time, even without detecting interaction, the selection indicator 734 surrounds a second gesture activation interface object, a force touch gesture activation interface object 742 as illustrated in FIG. 7O. After the set amount of time, without detecting interaction, the selection indicator 734 surrounds a third gesture activation interface object, a multitouch gesture activation interface object. After the set amount of time, again, without detecting interaction, the selection indicator 734 surrounds a fourth gesture activation interface object, a favorite gesture activation interface object, as illustrated in FIG. 7S and described further below. However, FIG. 7O illustrates a contact 744 on the touch-sensitive surface of the portable multifunctional device 100 while the selection indicator 734 surrounds the force touch gesture activation interface object 742. Although the contact 744 has a detected contact intensity level value as shown by the detected intensity level diagram 791, the device generates a simulated contact intensity level as shown by the simulated intensity level diagram 792 in response to detecting the contact 744 while the selection indicator 734 surrounds the force touch gesture activation interface object 742. The simulated contact intensity level value is below the threshold, but different from the detected contact intensity level value.

Figure 7P:
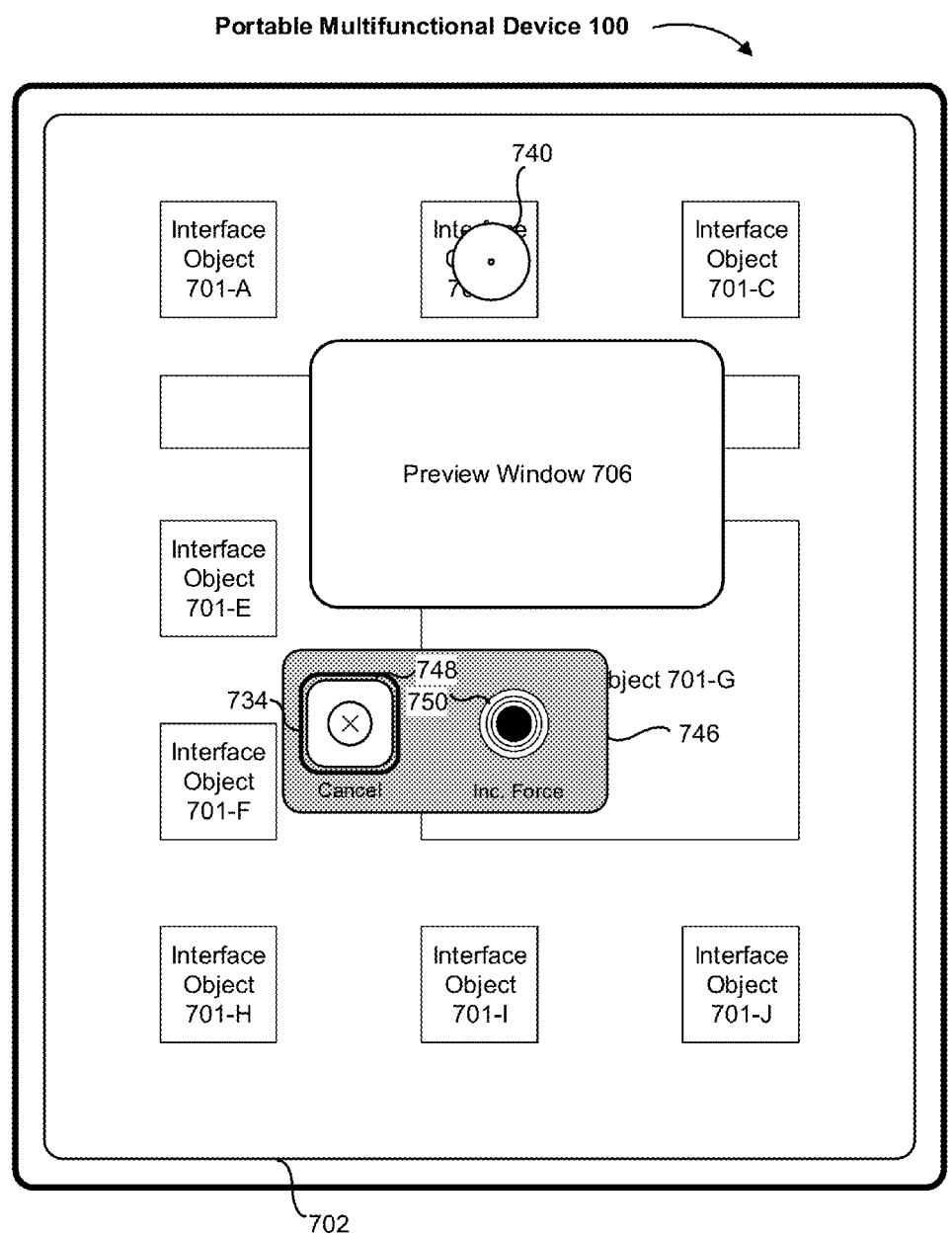

FIG. 7P illustrates the user interface 702 in response to detecting the contact 744 while the selection indicator 734 surrounds the force touch gesture activation interface object 742 (e.g., in response to the simulated contact intensity level value of the contact 744). As shown in FIG. 7P, the preview window 706 is displayed in response to detecting the contact 744 while the selection indicator 734 surrounds the force touch gesture activation interface object 742. The preview window 706 is the same preview window 706 illustrated in FIG. 7B which occurs, when the default mode is enabled, in response to detecting a contact at the location of the interface object 701-B having the first contact intensity level value.

Figure 7Q:
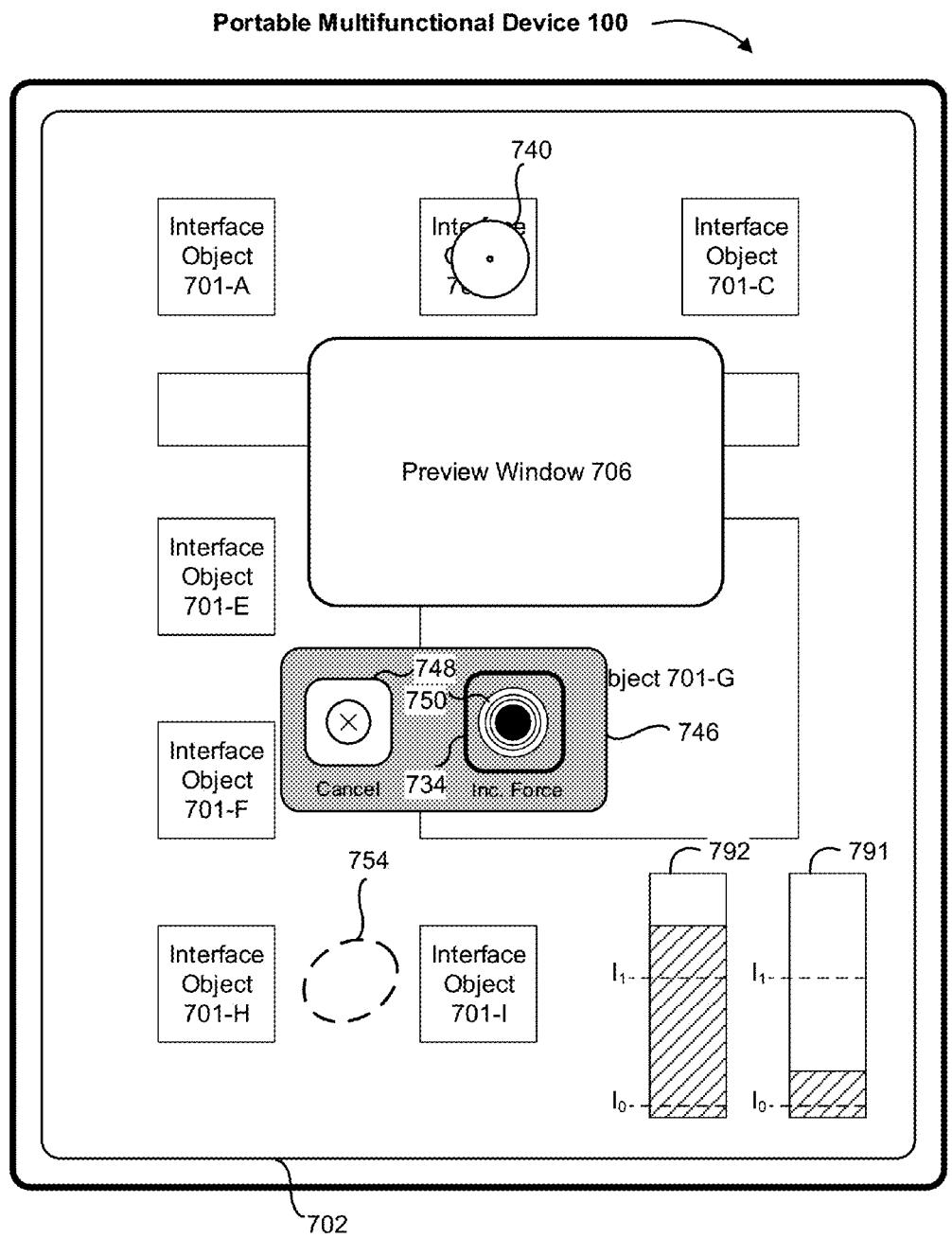

FIG. 7P further illustrates that the gesture activation menu 738 ceases to be displayed and a force touch menu 746 is displayed. Initially, as shown in FIG. 7P, the selection indicator 734 surrounds a first force touch menu interface object, a cancel activation object 748. The selection indictor 734 cycles through highlighting the interface objects of the force touch menu 746 at a set rate or cycle frequency. Thus, after a set amount of time, even without detecting interaction, the selection indicator 734 surrounds a second gesture activation interface object, an increase force interface object 750 as illustrated in FIG. 7Q. After the set amount of time, without detecting interaction, the selection indicator 734 returns to surrounding the cancel interface object 748 as shown in FIG. 7P. A detected touch while the selection indicator 734 surrounds the cancel activation object 748 results in the user interface 702 returning to the state illustrated in FIG. 7L in which the selection indicator 734 cycles through the interface objects 701-A-701-I. However, FIG. 7Q illustrates a contact 754 on the touch-sensitive surface of the portable multifunctional device 100 while the selection indicator 734 surrounds the increase force interface object 750. Although the contact 754 has a detected contact intensity level value as shown by the detected intensity level diagram 791, the device generates a simulated contact intensity level as shown by the simulated intensity level diagram 792 in response to detecting the contact 754 while the selection indicator 734 surrounds the increase force interface object 750. Although the detected contact intensity level value is below the threshold, the simulated contact intensity level value is above the threshold.

Figure 7R:
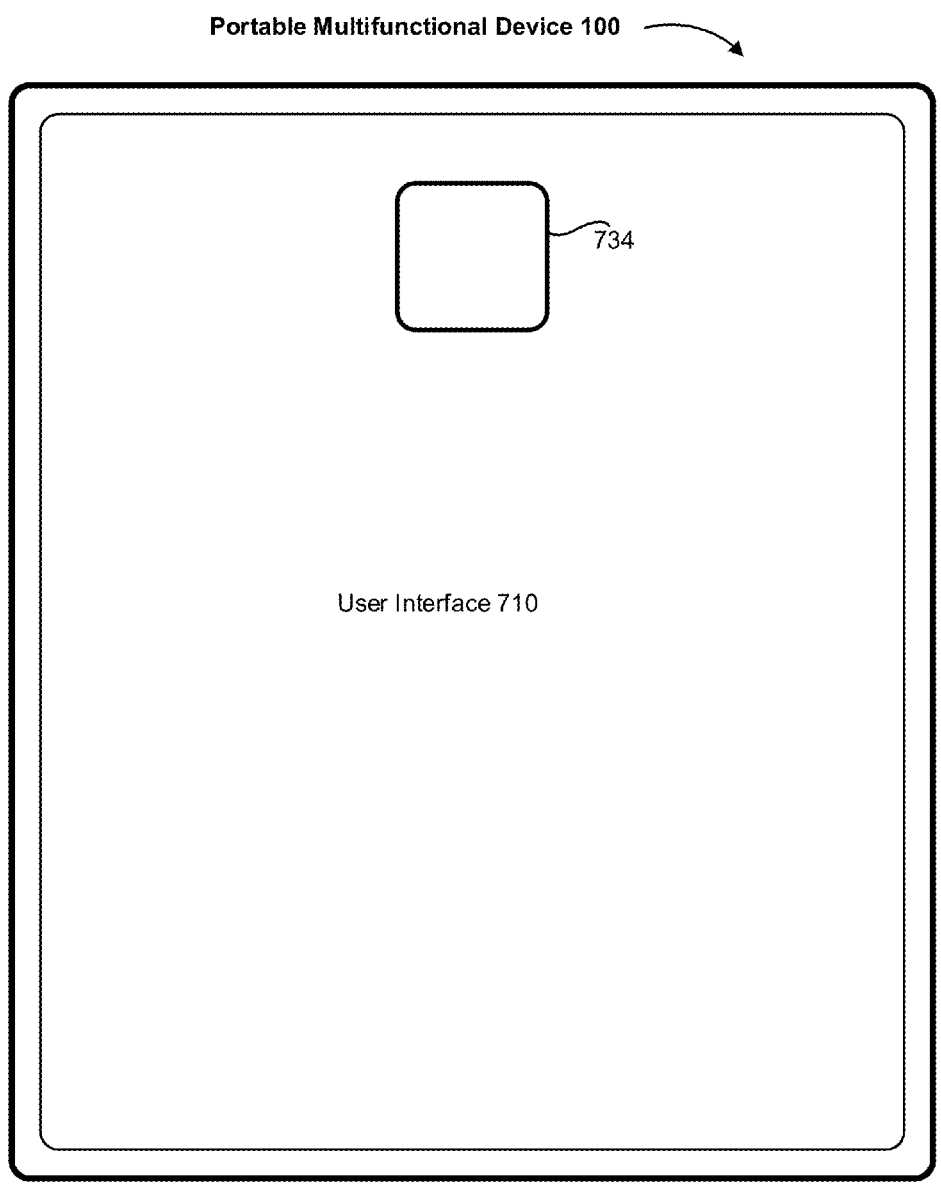
Figure 7S:
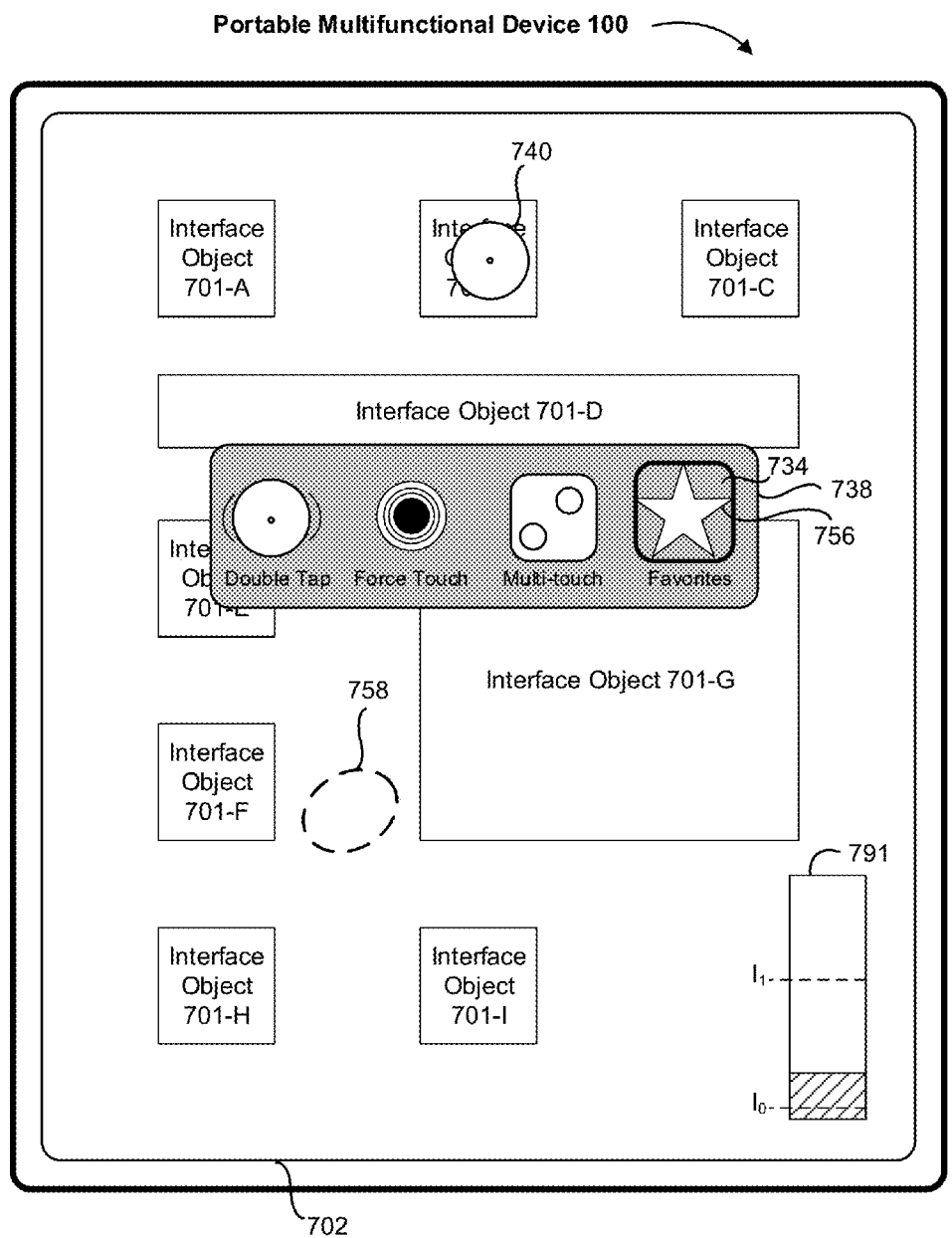

FIG. 7R illustrates the user interface 702 in response to detecting the contact 754 while the selection indicator 734 surrounds the increase force interface object 750 (e.g., in response to the simulated contact intensity level value of the contact 754). As shown in FIG. 7R, the different user interface 710 is displayed in response to detecting the contact 754 while the selection indicator 734 surrounds the increase force interface object 750. The different user interface 710 is the same user interface 710 illustrated in FIG. 7C which occurs, when the default mode is enabled, in response to detecting a contact at the location of the interface object 701-B having the second contact intensity level value. FIG. 7R illustrates that the user interface 702 includes display of the selection indicator 734 which cycles through interface objects displayed on the user interface 702 after the different user interface 710 is displayed (e.g., for interacting with interface objects displayed on the different user interface 710).

In some implementations, detection of a selection of the increase force interface object 750 results in the display of a modified force touch menu including the cancel interface object 748, a decrease force interface object, and an increase force interface object 750. In some implementations, detection of a selection of the decrease force interface object results in the preview window 706 and detection of a selection of the increase force interface object results in another interface response.

FIG. 7S illustrates the user interface 702 when the selection indicator 734 surrounds a fourth gesture activation interface object, a favorite gesture activation interface object 756, displayed as part of a gesture activation menu 738. FIG. 7S further illustrates a contact 758 on the touch-sensitive surface of the portable multifunctional device 100 while the selection indicator 734 surrounds the favorite gesture activation interface object 756.

Figure 7T:
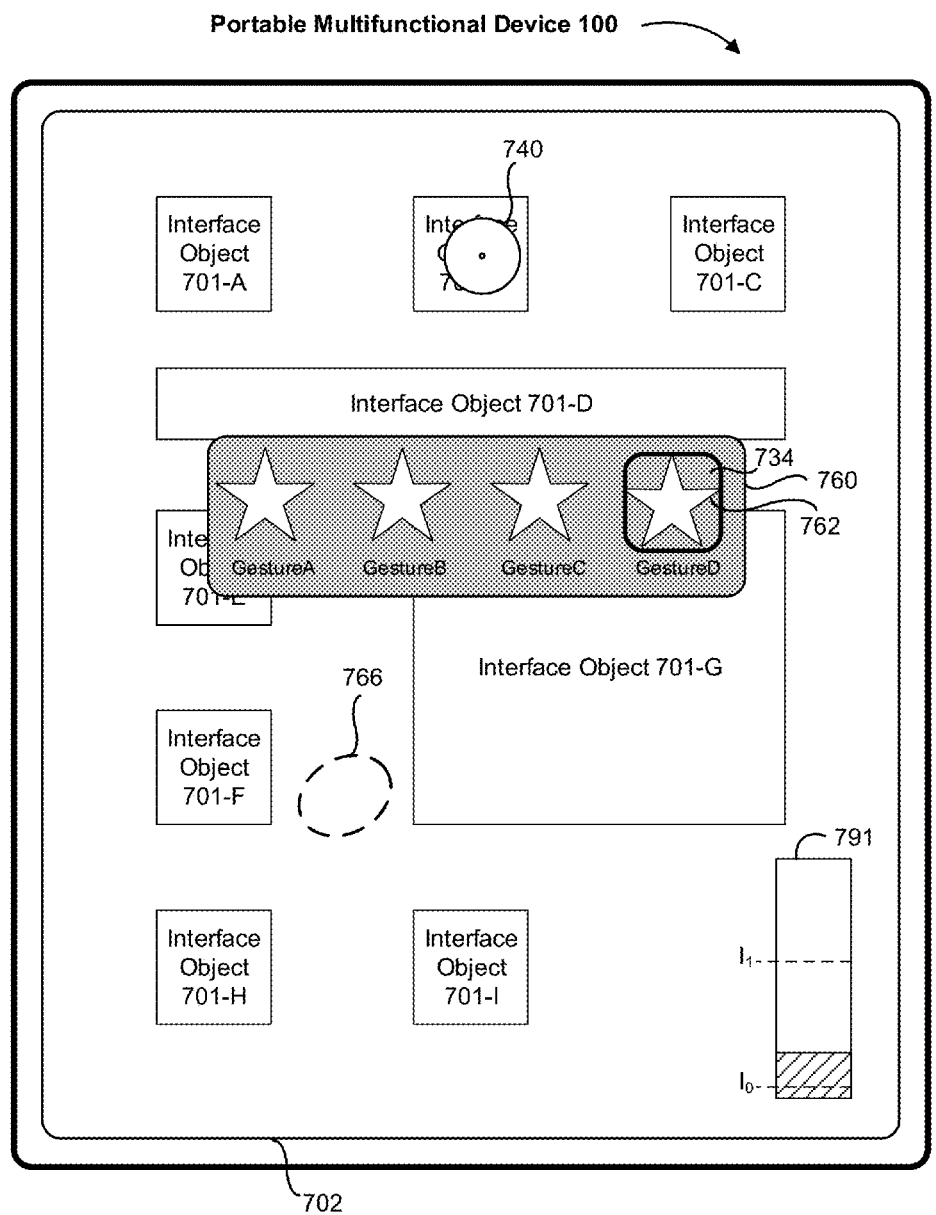

FIG. 7T illustrates the user interface 702 in response to detecting the contact 758 while the selection indicator 734 surrounds the favorite gesture activation interface object 756 and after a set amount of time, allowing the selection indicator 734 to cycle through the displayed interface objects of a favorites menu 760 to a fourth favorite gesture activation interface object 762. In some embodiments, the favorite gesture activation interface objects of the favorites menu 760 can illustrate corresponding gestures to be performed at the location of the selected object indicator 740 (e.g., the location of the interface object 701-B). The gestures can include, for example, multi-touch gestures, a double-tap gesture, or a recorded gesture. The recorded gesture can be input (and stored) via a recording interface and can include contact intensity information. FIG. 7T further illustrates a contact 766 on the touch-sensitive surface of the portable multifunctional device 100 while the selection indicator 734 surrounds the fourth favorite gesture activation interface object 762.

Figure 7U:
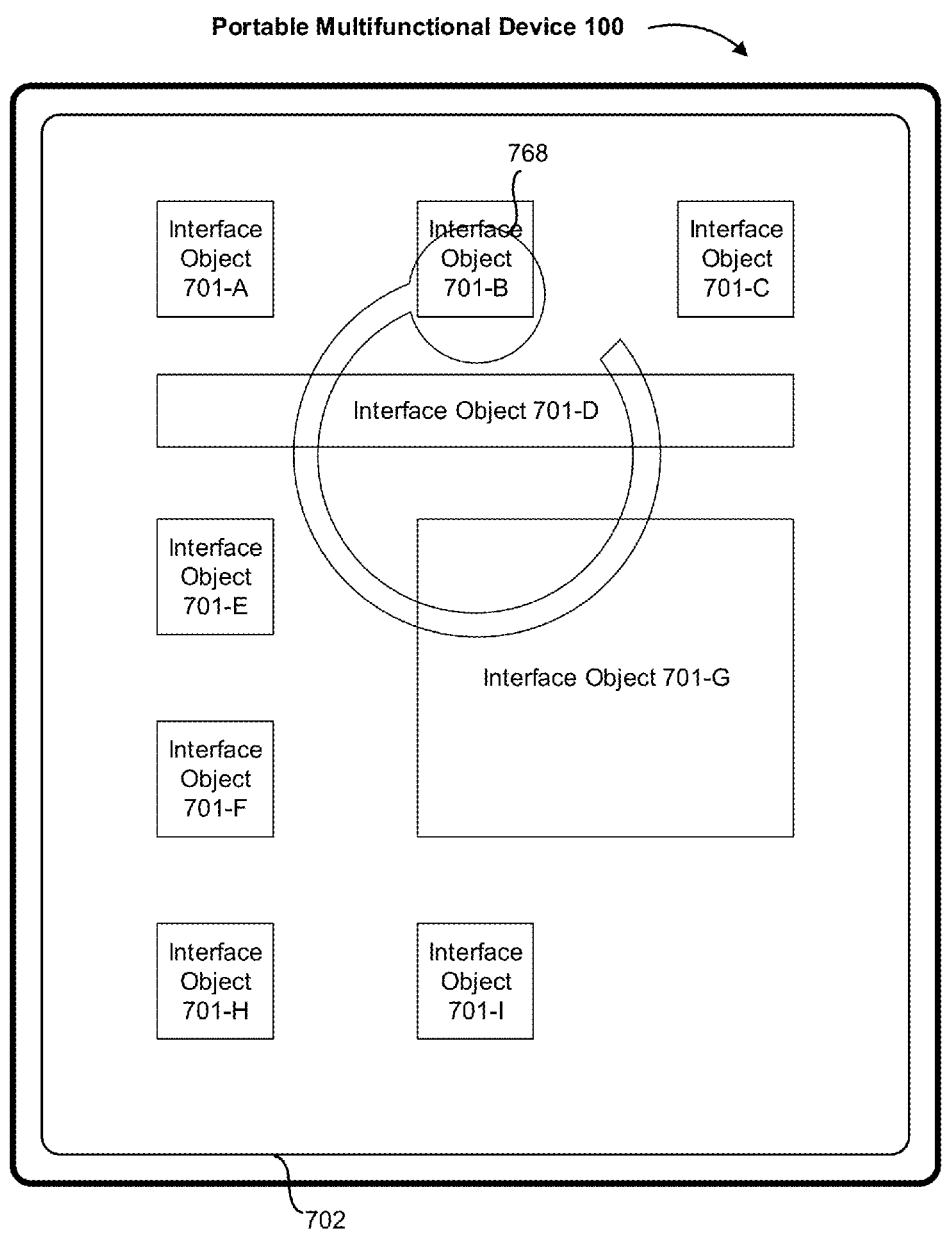

FIG. 7U illustrates the user interface 702 in response to detecting the contact 766 while the selection indicator 734 surrounds the fourth favorite gesture activation interface object 762. The user interface 702 includes display of a graphical indication 768 of changes in contact intensity as a recorded gesture is replayed. As shown in FIG. 7U, in some implementations, the graphical indication of changes in contact intensity is represented by increasing the width of a line along a path traversed by the gesture when contact intensity is increased and decreasing the width of the line as the contact intensity is decreased. Thus, the graphical indication 768 of the exemplary recorded gesture of FIG. 7U indicates a contact of a first contact intensity followed by a counter-clockwise circle of a second (lower) contact intensity.

Figure 7V:
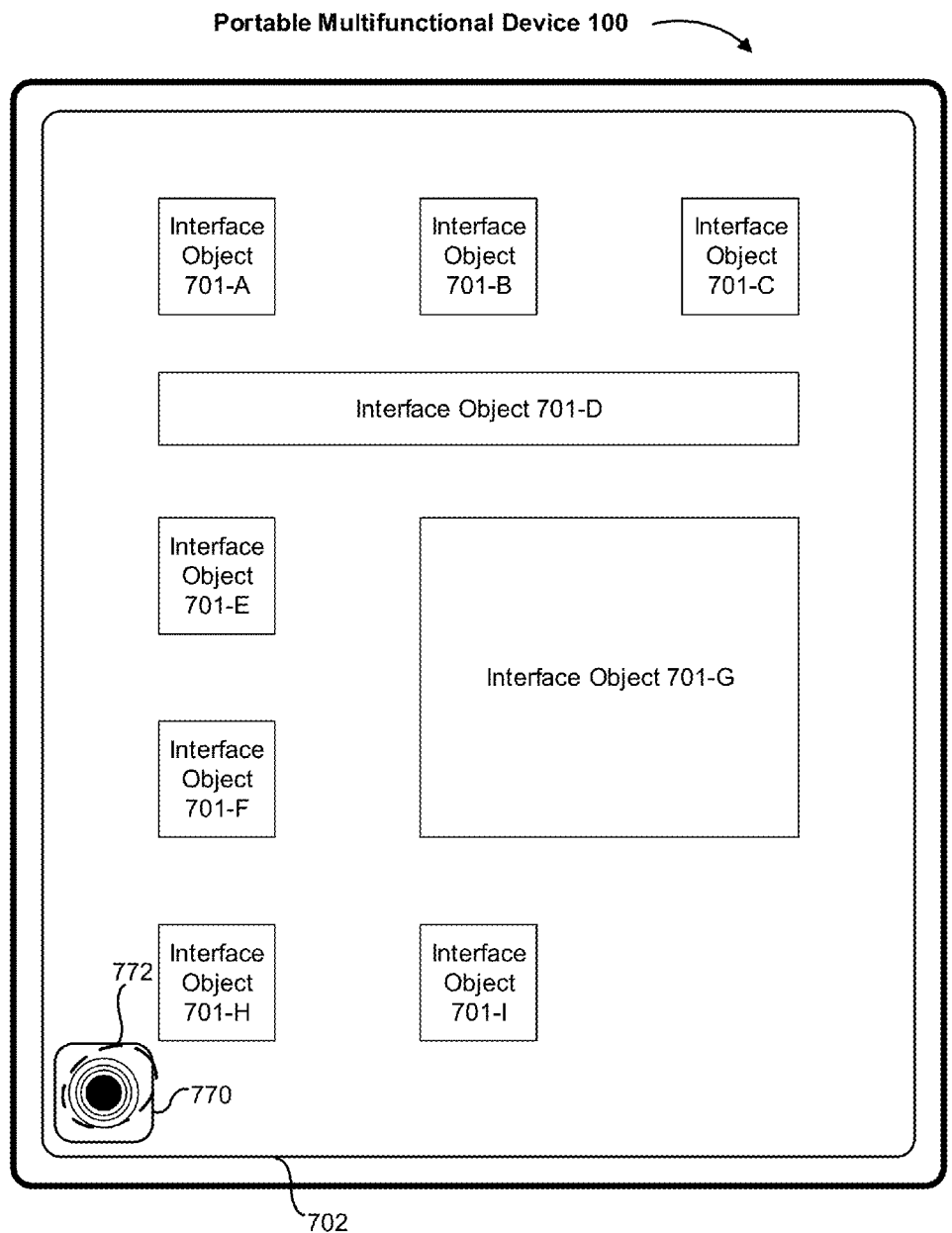

FIG. 7V illustrates an exemplary user interface 702 displayed on a touch-sensitive surface of a portable multifunctional device 100 when a third embodiment of an accessibility mode is enabled. FIG. 7V illustrates that the user interface 702 includes display of a force touch accessibility interface object 770 at a periphery of the user interface 702.

In some implementations other accessibility interface objects are displayed for enabling a user to simulate other gestures, such as a double-tap gesture (via a double-tap accessibility interface object) or a multi-touch gesture (via a multi-touch accessibility interface object). In some implementations, the force touch accessibility interface object 770 is displayed at other locations of the user interface. In some implementations, the force touch accessibility interface object 770 can be moved in a similar manner to the movement of the interaction menu activation object 712 described above with respect to FIGS. 7D-7E.

Figure 7W:
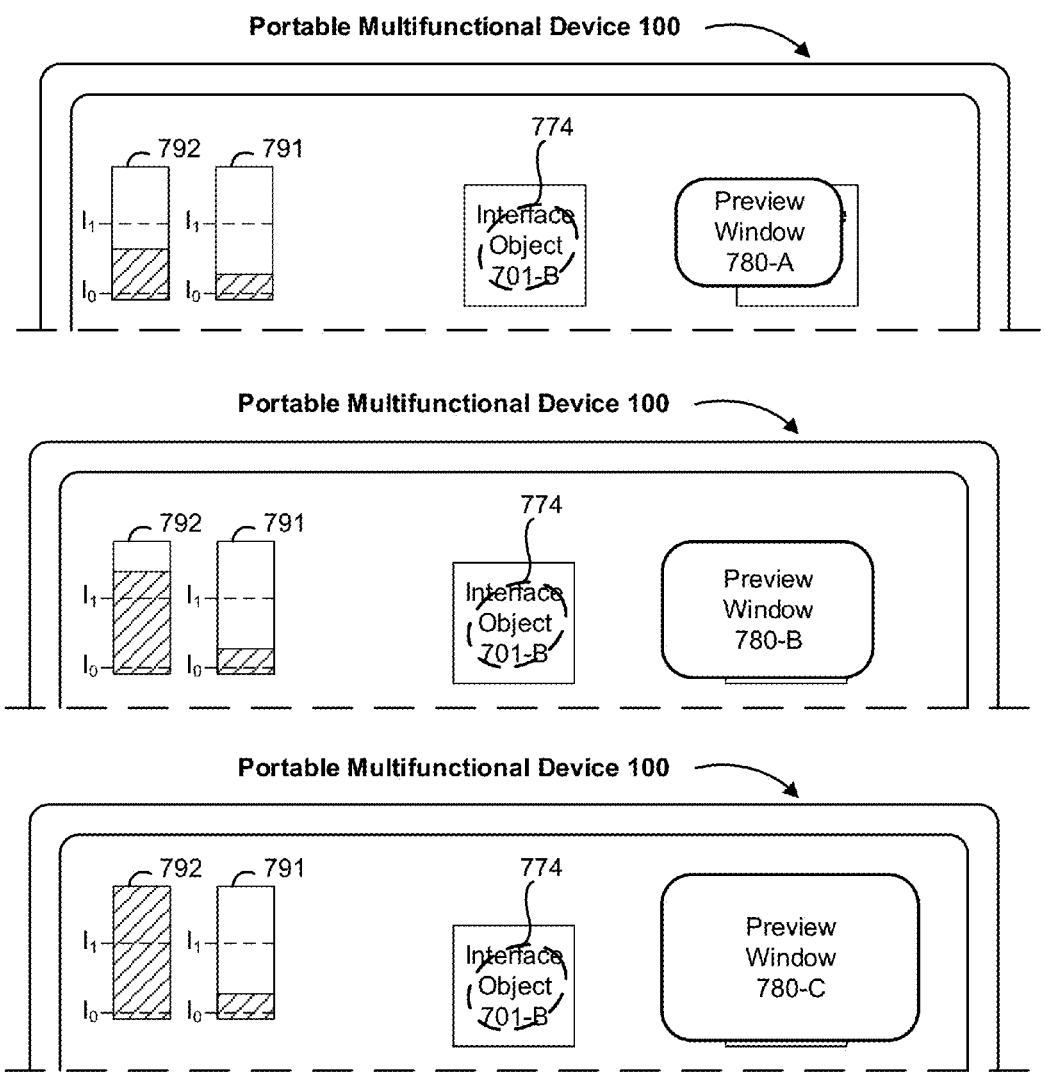
Figure 7W:
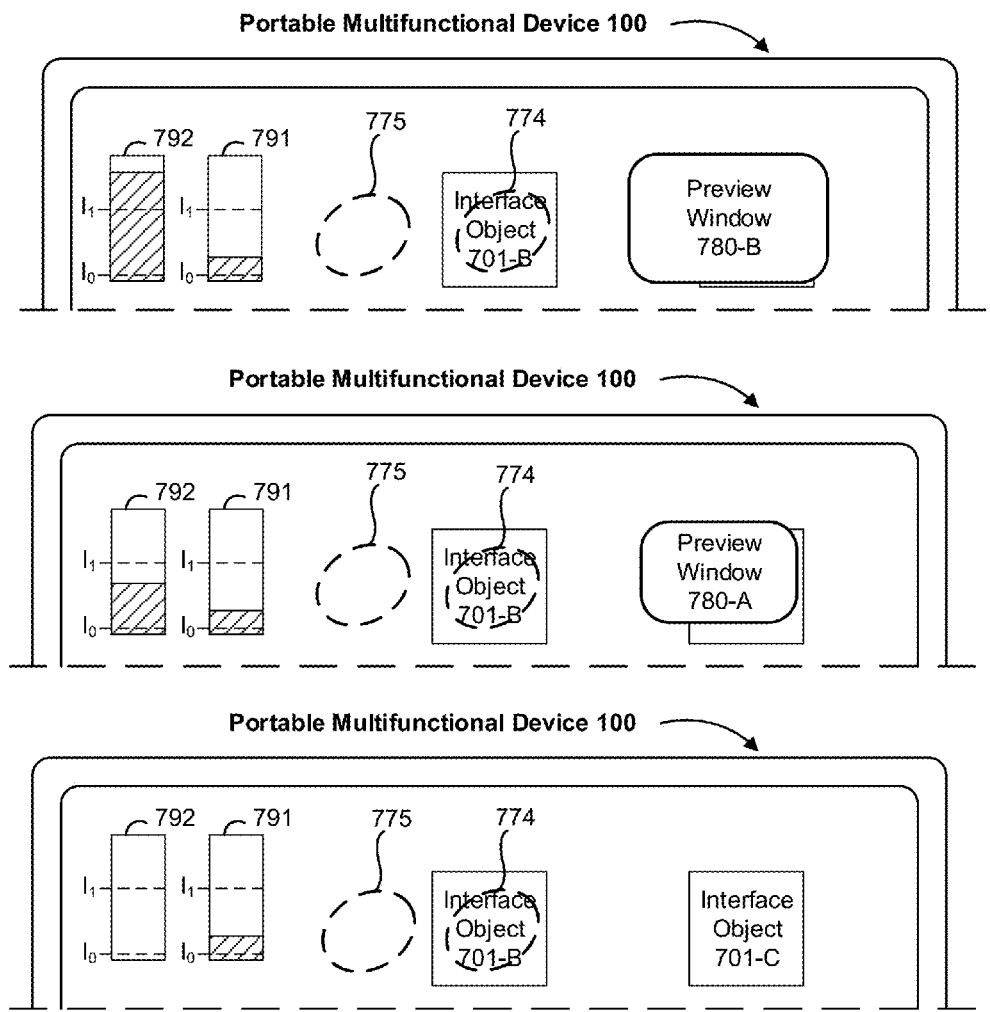

FIG. 7V also illustrates a contact 772 at the location of the force touch accessibility interface object 770. FIGS. 7Wa-7Z illustrate contacts at the location of the interface object which are interpreted as contacts having a particular contact intensity level based on various features of the contacts. Thus, in some implementations, the device separately receives an indication of an interface object (e.g., a contact at the location of the interface object 701-B) and an indication that the contact is to be interpreted as having a contact intensity level value independent of the output of the sensors capable of detecting intensity of one or more contacts with the touch-sensitive surface (e.g., a contact at the location of the force touch accessibility interface object 770).

FIG. 7Wa illustrates the user interface 702 in response to detecting the contact 772 at the location of the force touch accessibility interface object 770 where a simulated contact intensity level value is determined based on the duration of a contact.

FIG. 7Wa shows the user interface at three time points. At the first time point, a contact 774 is detected at the location of the interface object 701-B and in response, a preview window of a first size 780-A is displayed. At the second time point, in response to detecting the contact 774 is maintained, a preview window of a second size 780-B is displayed (e.g., the preview window is increased in size). At the third time point, in response to detecting that the contact 774 is maintained, a preview window of a third size 780-C is displayed (e.g., the preview window is further increased in size). Thus, as the contact 774 is detected and maintained at the location of the interface object 701-B, the size of the preview window 780-A-780-C is increased. In some implementations, the series of preview windows 780-A-780-C correspond to contact intensity level values above or below a threshold $I_1$. In some implementations, the size of the preview window 780-A-780-C can be proportional to the contact intensity level value (without respect to thresholds), thus creating a smooth progression. In the second mode, the same effect is produced by maintaining a contact at the location of the interface object 701-B for a duration after a contact is detected at the location of the force touch accessibility interface object 770.

Thus, the device 100 interprets the contact 774 having a particular duration as a contact having a particular contact intensity level value. In some implementations, the device determines the contact intensity level value in proportion to the duration. For example, the contact intensity level value can be kt+c, where k is a multiplier, t is the duration of the touch, and c is a minimum value or 0.

FIG. 7Wb illustrates the user interface 702 in response to detecting an additional contact 775 in addition to the contact 774. FIG. 7Wb shows that, in response to detecting the additional contact 775, the simulated contact intensity level (as shown by the simulated contact intensity diagram 792) decreases in proportion to the length of time that the additional contact 775 is detected. Thus, at the first time point after the additional contact 775 is detected, the preview window of the second size 780-B is displayed (e.g., the preview window decreases in size) and at a second time point after the additional contact 775 is detected, the preview window of the first size 780-A is displayed (e.g., the preview window further decreases in size). At the third time point, the simulated contact intensity level value is below a detection threshold and no preview window is displayed.

Figure 7X:
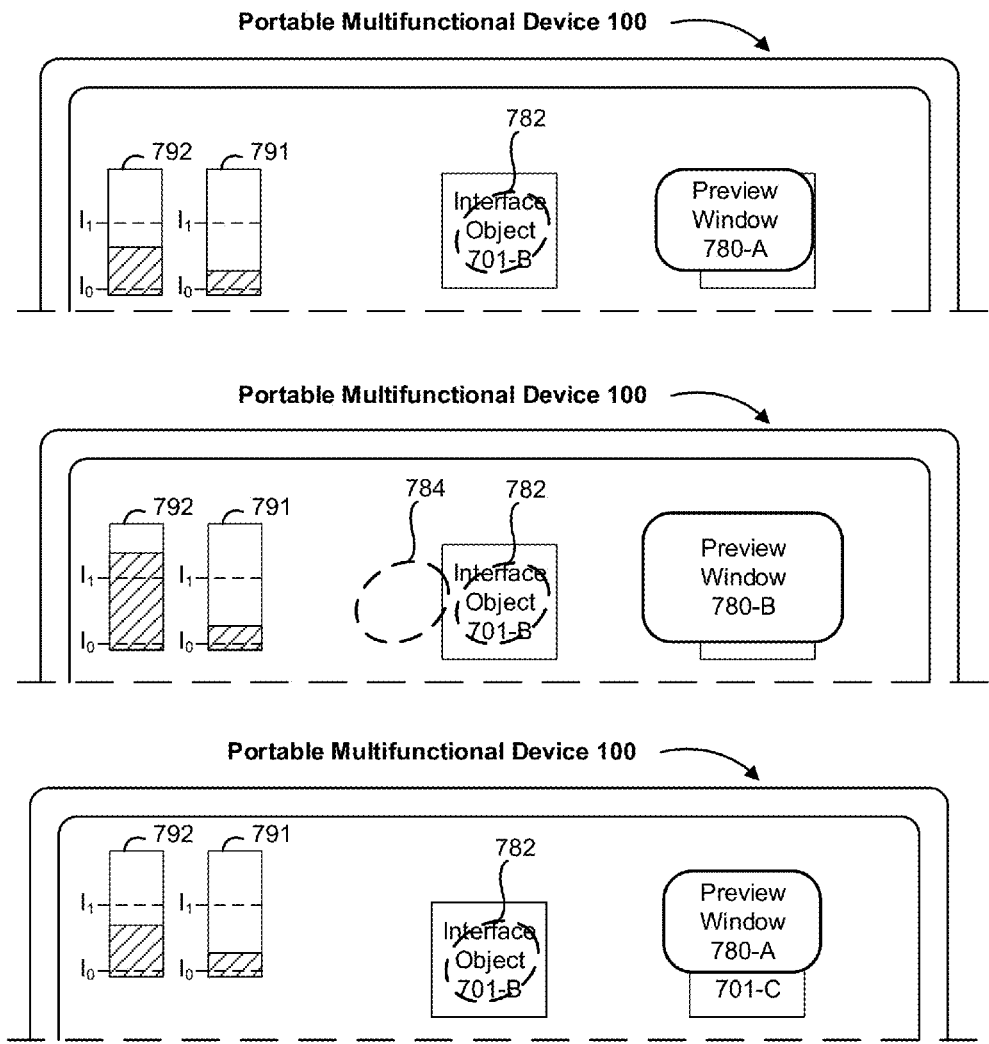

FIG. 7X illustrates the user interface 702 in response to detecting the contact 772 at the location of the force touch accessibility interface object 770 (shown in FIG. 7V) where a simulated contact intensity level value is based on a number of concurrently detected contacts. FIG. 7X shows the user interface at three time points. At the first time point, in response to detecting a contact 782 at the location of the interface object 701-B, a preview window of a first size 780-A is displayed. At the second time point, in response to detecting maintenance of the contact 782 and a supplemental contact 784, a preview window of a second size 780-B is displayed (e.g., the preview window is increased in size). At the third time point, in response to detecting that the contact 782 is maintained and discontinuance of the supplemental contact 784, the preview window of the first size 780-A is, again, displayed (e.g., the preview window is decreased in size). Thus, in response to the contact 782 and the supplemental contact 784, a series of preview windows 780-A-780-B are displayed corresponding to one of the plurality of contact-intensity-dependent responses of the interface object 701-B. As shown in FIG. 7X, in some implementations, the size of the preview window 780-A-780-B increases as the contact intensity of a contact increases. In the second mode, the same effect is produced by increasing the number of concurrent contacts, after a contact is detected at the location of the force touch accessibility interface object 770. Thus, when one contact (e.g., contact 782) is detected, a preview window of a first size 780-A is displayed and when two contacts (e.g., contact 782 and supplemental contact 784) are detected, a preview window of a second size 780-B is displayed. In some implementations, a preview window of a third size (e.g. preview window 780-C) is displayed in response to detecting three concurrent contacts.

Thus, the device 100 interprets the contact 782 with zero or more additional concurrent contacts as a contact having a particular contact intensity level value. In some implementations, the device determines the contact intensity level value in proportion to the number of concurrent contacts. For example, the contact intensity level value can be x for one contact (zero additional concurrent contacts), 2x for two concurrent contacts (one additional concurrent contact), and 4x for four concurrent contacts (three additional concurrent contacts). In some embodiments, in response to detecting an additional concurrent contact, the simulated contact intensity level is smoothly increased to the higher contact intensity level over time rather than immediately, resulting in animated transitions between the preview windows of different sizes 780-A-780-C.

Figure 7Y:
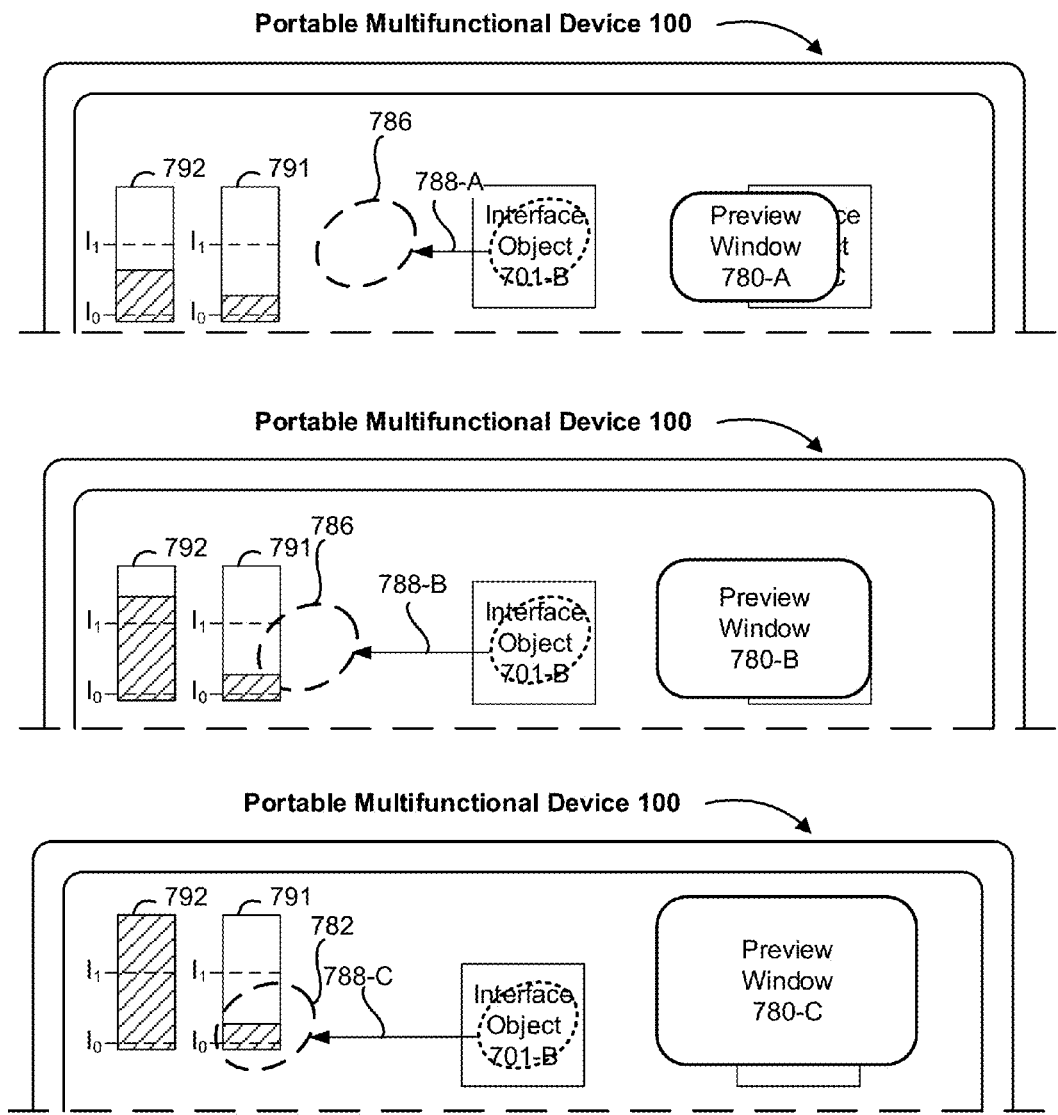
Figure 7Z:
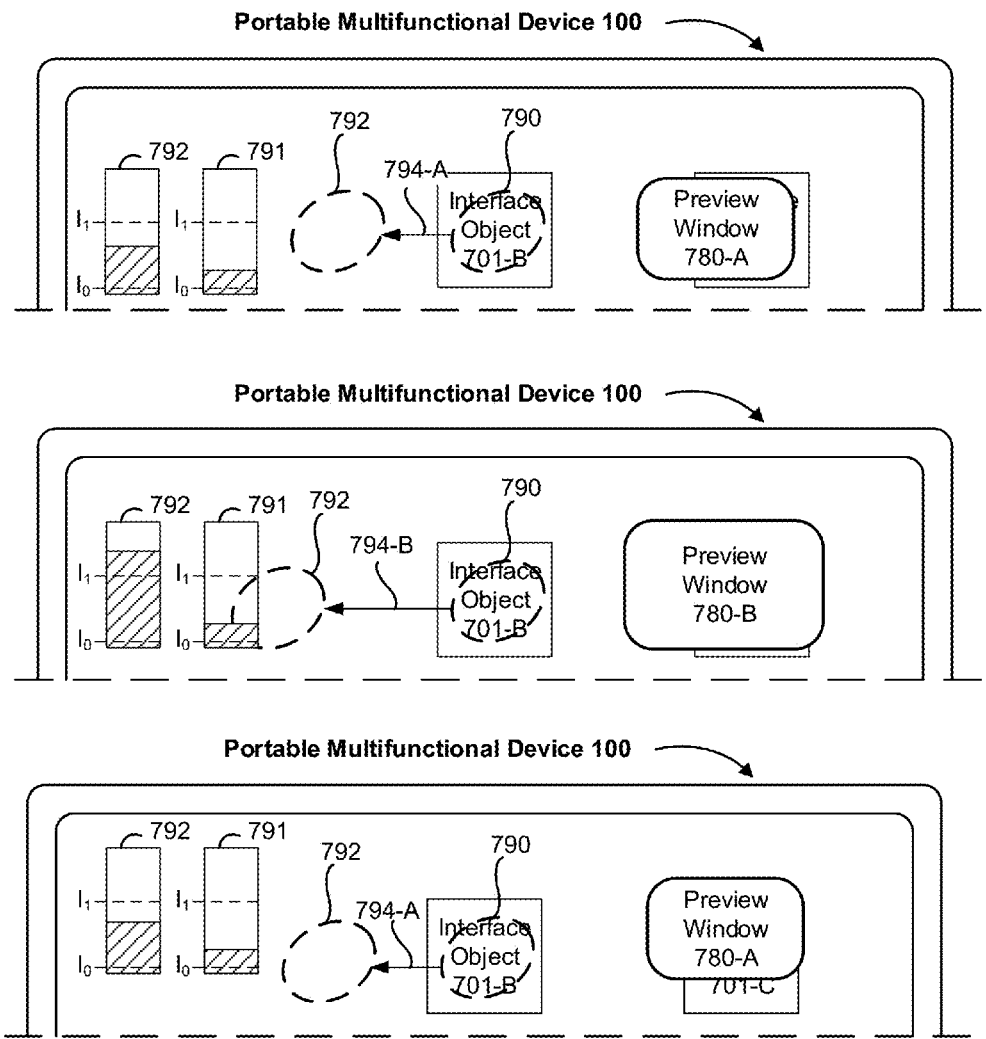
Figure 8A:
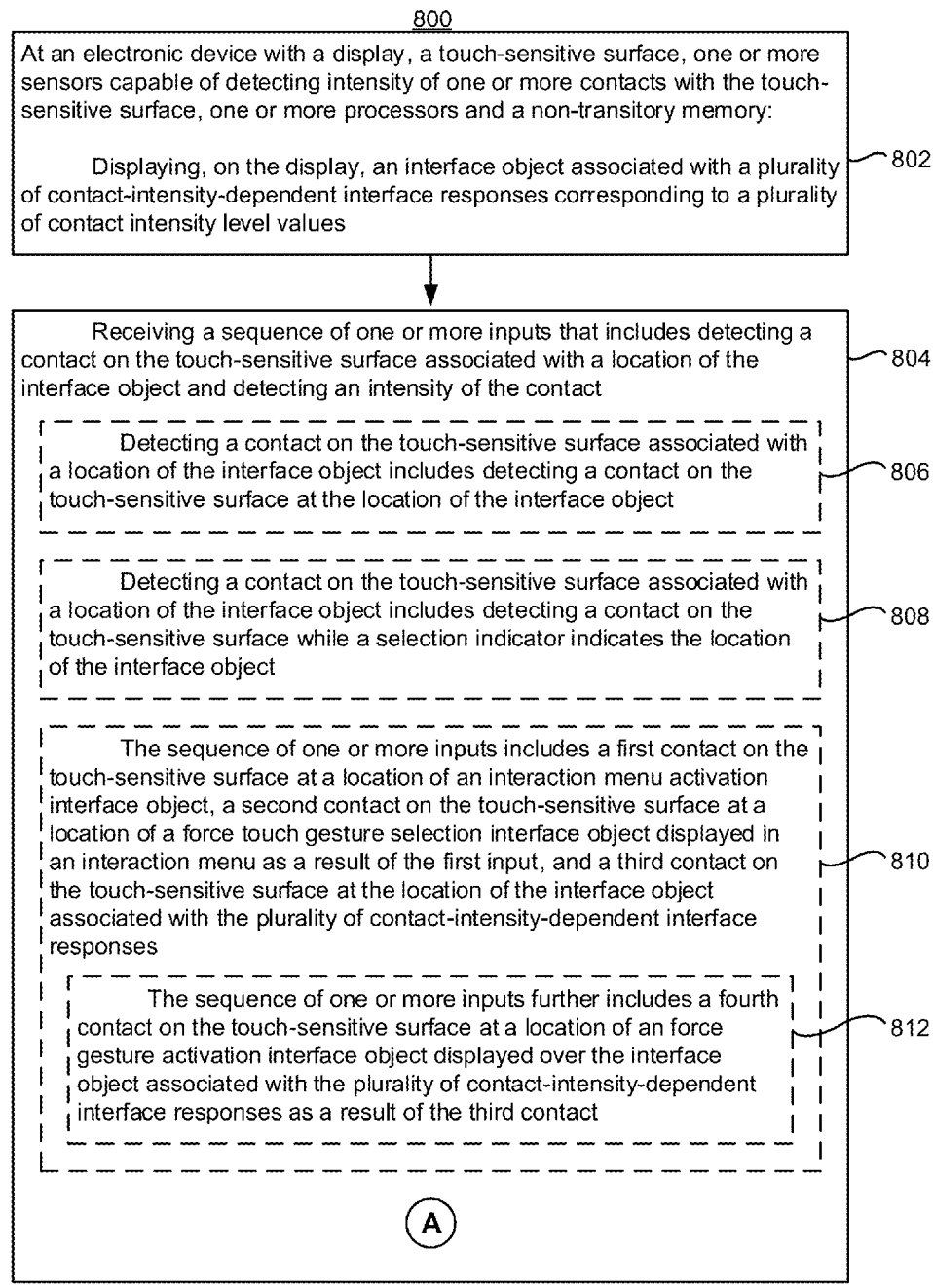
FIGS. 8A-8E are flow diagrams illustrating a method of enabling generation of contact-intensity-dependent interface responses in accordance with some embodiments.
Figure 8B:
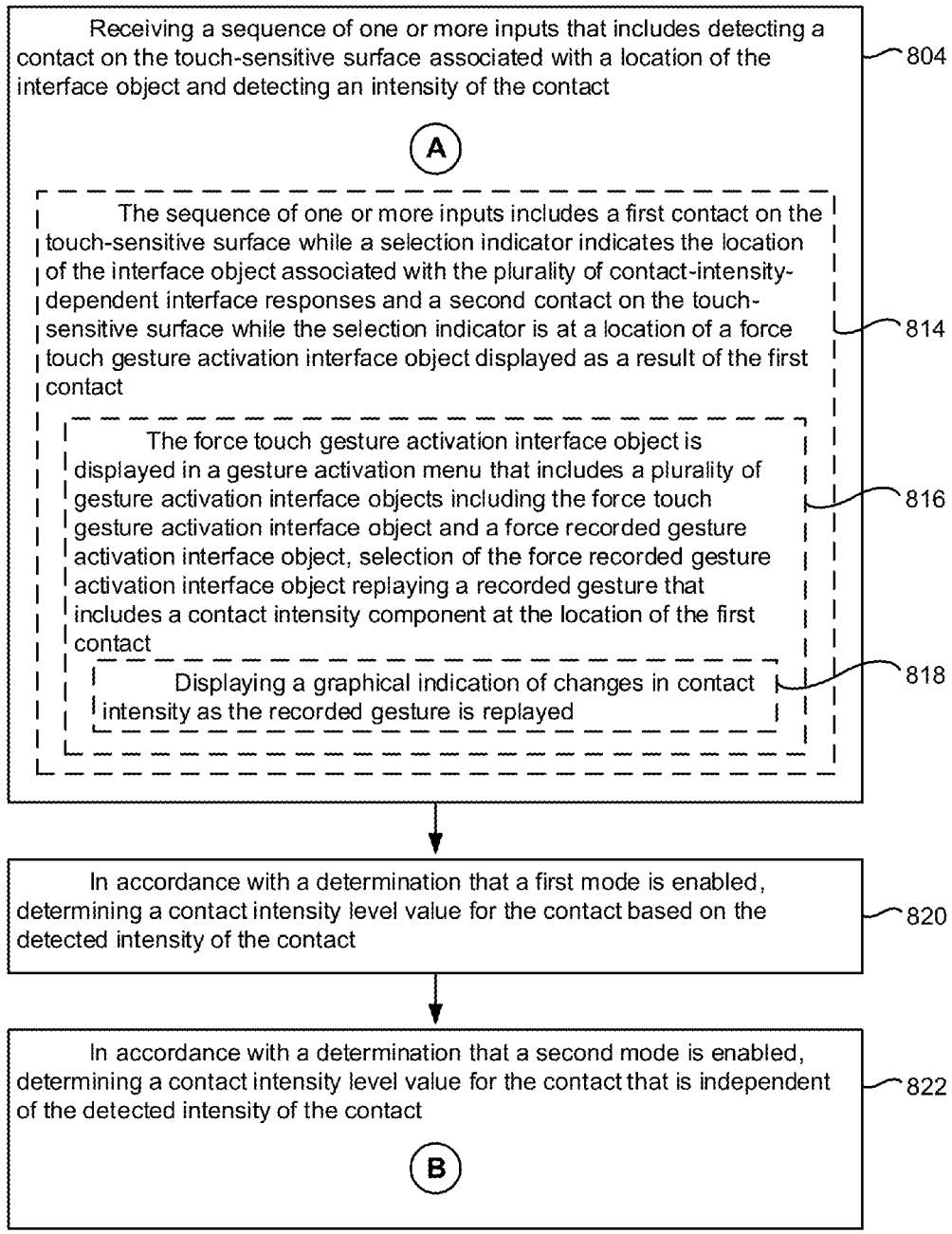
Figure 8C:
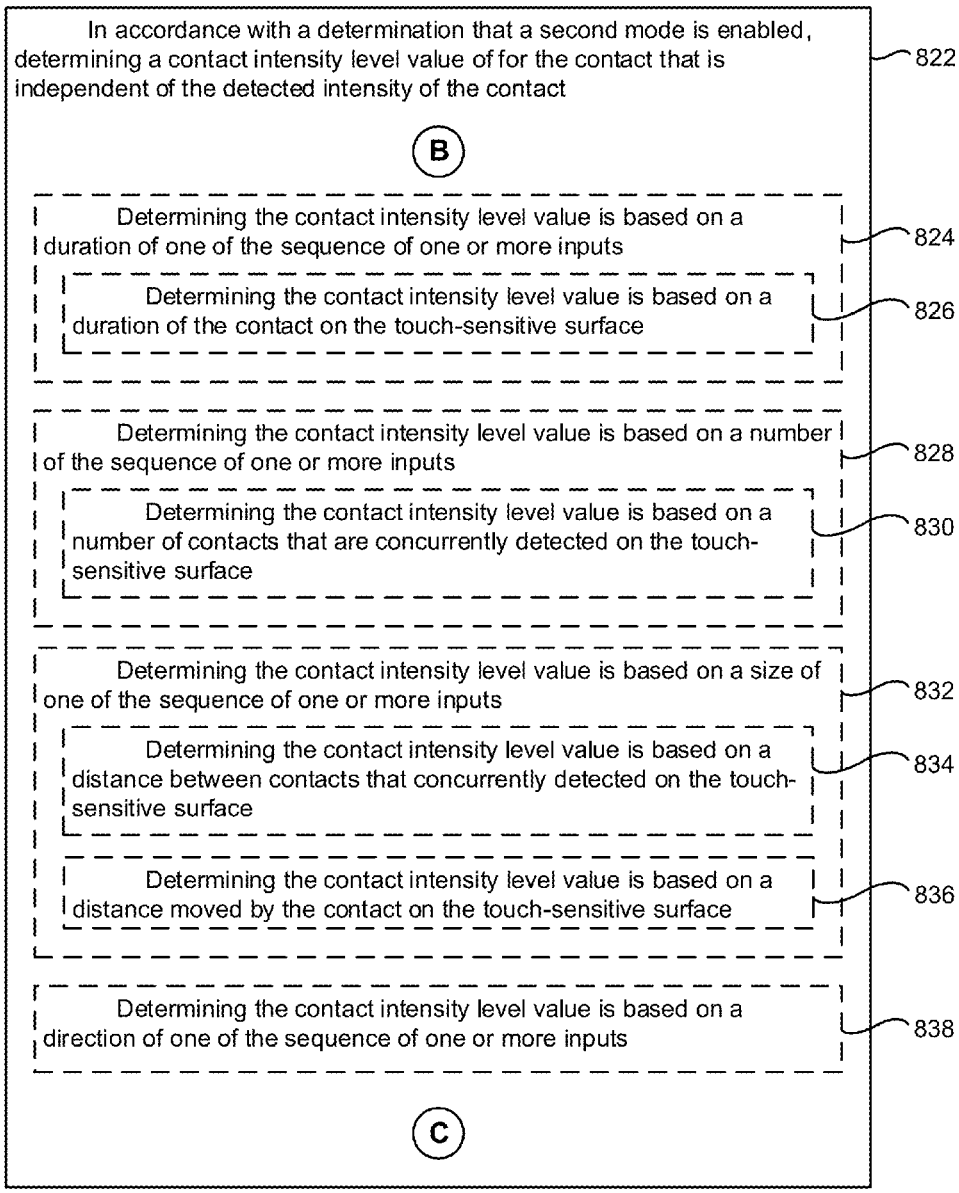
Figure 8D:
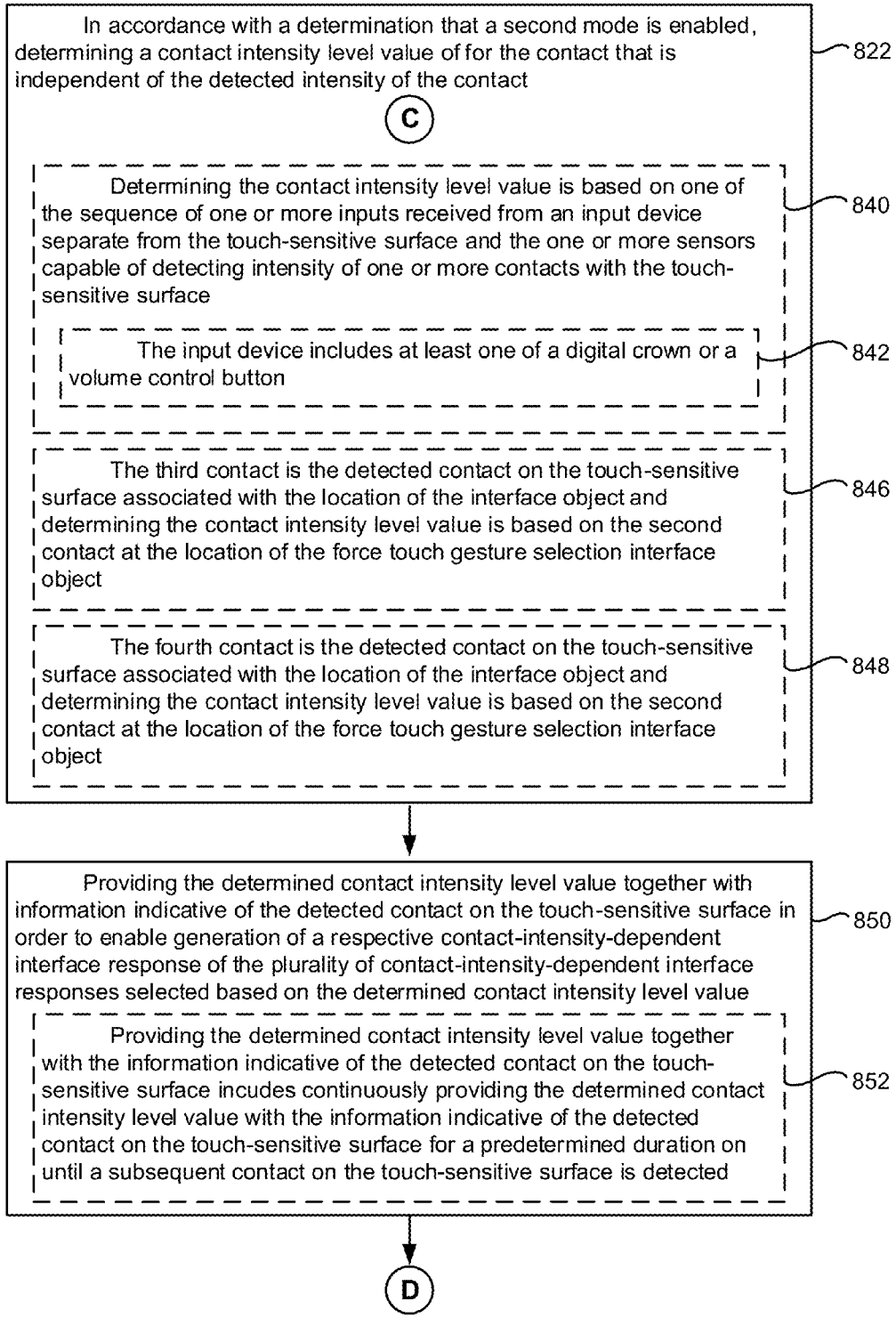
Figure 8E:
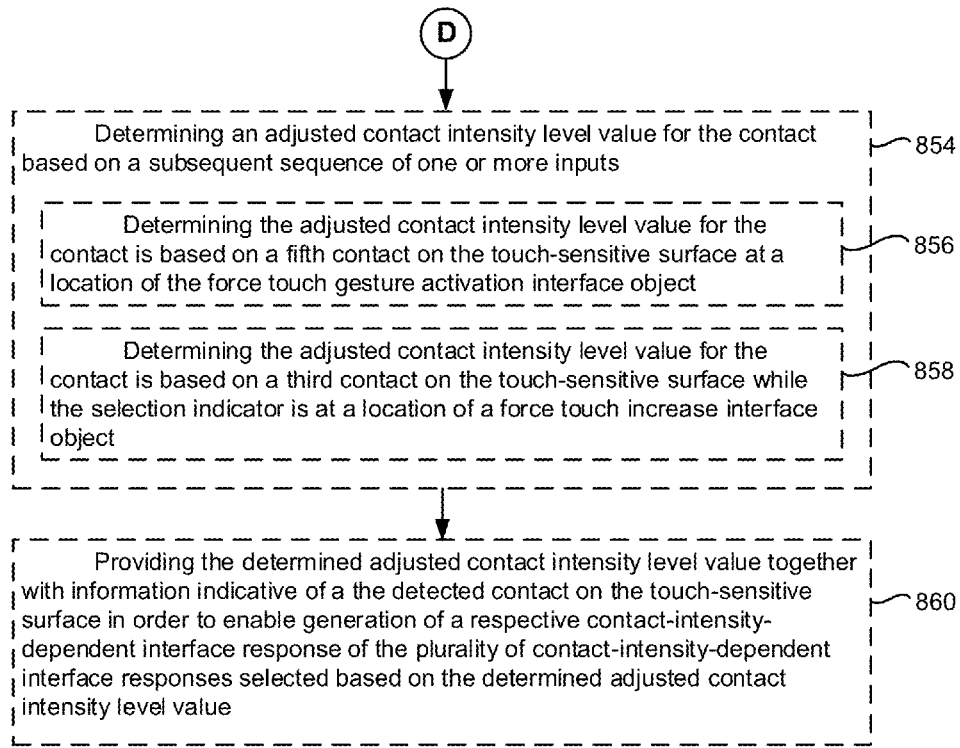

FIG. 7Y illustrates the user interface 702 in response to detecting the contact 772 at the location of the force touch accessibility interface object 770 (as shown in FIG. 7V) where a simulated contact intensity level value is based on a distance a contact is dragged. FIG. 7Y shows the user interface 702 at three time points. At the first time point, in response to detecting a contact 786 dragged a first distance 788-A from the location of the interface object 701-B, a preview window of a first size 780-A is displayed. At the second time point, the distance of the contact 786 is increased to a second distance 788-B and, in response, a preview window of a second size 780-B is displayed (e.g., the preview window is increased in size). At the third time point, the distance of the contact 786 is increased to a third distance 788-C and, in response, a preview window of a third size 780-C is displayed (e.g., the preview window is further increased in size). Thus, as the distance of the contact 786 is increased, the size of the preview window 780-A-780-C is increased. Similarly, in some implementations, as the distance of the contact 786 is decreased, the size of the preview window 780-A-780-C is decreased. In some implementations, the size of the preview window 780-A-780-C corresponds to contact intensity level values above or below a threshold $I_1$. In some implementations, the size of the preview window 780-A-780-C can be proportional to the contact intensity level value (without respect to thresholds), thus creating a smooth progression. In the second mode, the same effect is produced by increasing the distance of a contact at the location of the interface object 701-B, after a contact is detected at the location of the force touch accessibility interface object 770.

Thus, the device 100 interprets the contact 786 with a dragging distance as a contact having a particular contact intensity level value. In some implementations, the device determines the contact intensity level value in proportion to the distance. For example, the contact intensity level value can be kt+c, where k is a multiplier, t is the distance of the contact, and c is a minimum value or 0.

In some implementations, the device 100 determines the contact intensity level value based on the direction of the drag (rather than the distance). For example, the contact intensity level value can be a first contact intensity level value if the device detects a drag to the left and a second contact intensity level value if the device detects a drag to the right. As another example, the contact intensity level value can be proportional to the angle made between the interface object 701-B and the location of the touch (after dragging). Thus, a device simulates increasing or decreasing the contact intensity level in response to detecting a contact at a location that corresponds to the interface object 701-B, detecting movement of the contact a distance from interface object 701-B, and detecting movement of the contact clockwise or counter-clockwise around the interface object 701-B.

FIG. 7Z illustrates the user interface 702 in response to detecting the contact 772 at the location of the force touch accessibility interface object 770 (shown in FIG. 7V) where a simulated contact intensity level value is based on a distance between two contacts. FIG. 7Z shows the user interface 702 at three time points. At the first time point, in response to detecting a first contact 790 at the location of the interface object 701-B and a second contact 792 a first distance 794-A from the first contact 790, a preview window of a first size 780-A is displayed. At the second time point, the distance between the first contact 790 and the second contact 792 is increased to a second distance 794-B and, in response, a preview window of a second size 780-B is displayed (e.g., the preview window is increased in size). At the third time point, the distance between the first contact 790 and the second contact 792 is decreased back to the first distance 794-A and, in response, the preview window of the first size 780-A is, again, displayed (e.g., the preview window is decreased in size). Thus, in response to the first contact 790 and second contact 792, a series of preview windows 780-A-780-B are displayed corresponding to one of the plurality of contact-intensity-dependent responses of the interface object 701-B. In some implementations, the size of the preview window 780-A-780-B corresponds to contact intensity level values above or below a threshold $I_1$. In some implementations, the size of the preview window can be proportional to the contact intensity (without respect to thresholds), thus creating a smooth progression. In the second mode, the same effect is produced by increasing or decreasing the distance between concurrent contacts, after a contact is detected at the location of the force touch accessibility interface object 770. Thus, when the two contacts are detected, a preview window of a size based on the distance between the two contacts is displayed. In some implementations, a preview window of a third size (e.g., preview window 780-C) is displayed in response to detecting that the distance between the first contact 790 and the second contact 792 has increased to a third distance (greater than the second distance 794-B).

Thus, the device 100 interprets the contacts 790, 792 with a distance between the contacts as a single contact having a particular contact intensity level value. In some implementations, the device determines the contact intensity level value in proportion to the distance. For example, the contact intensity level value can be kt+c, where k is a multiplier, t is the distance between the contacts, and c is a minimum value or 0.

In some implementations, the device 100 determines the contact intensity level value based on the direction of a line through the contacts (rather than the distance). For example, the contact intensity level value can be a first contact intensity level value if the detect detects contacts that are arranged vertically and a second contact intensity level value if the device detects contacts that are arranged horizontally.

Although FIG. 7Z illustrates a distance between two concurrent contacts, in some implementations, the device determines the contact intensity level value based on the distance between two sequential contacts. Further, in some implementations, the device determines the contact intensity level value based on an area defined by three or more concurrent (or sequential) contacts, rather than a distance between two contacts.

Whereas FIGS. 7W*a*-7Z illustrate various features of a contact (or set of contacts) that can be used to determine a contact intensity level value, other features and/or combinations of features can also be used to determine a contact intensity level value for a contact. For example, duration (as illustrated in FIG. 7W*a*) and distance (as illustrated in FIG. 7Y) can both be used to determine a contact intensity value.

Thus, in some implementations, a first contact intensity level value is determined in response to a first speed of the contact (e.g., a slow drag) and a second contact intensity level value is determined in response to a second speed of the contact (e.g., a fast drag). As another example, duration (as illustrated in FIG. 7Wa) and the number of contacts (as illustrated in FIG. 7X) can both be used to determine a contact intensity level value. Thus, in some implementations, a first contact intensity level value is determined in response to a single contact within a time period (e.g., a single-tap) and a second contact intensity level value is determined in response to multiple contacts within a time period (e.g., a double-tap).

FIGS. 8A-8E illustrate a flow diagram of a method 800 of providing a contact intensity level value to enable generation of a respective contact-intensity-dependent interface response in accordance with some embodiments. The method 800 is performed at an electronic device (e.g., device 300, FIG. 3, or portable multifunction device 100, FIG. 1A) with a display, a touch-sensitive surface, one or more sensors capable of detecting intensity of one or more contacts with the touch-sensitive surface, one or more processors and a non-transitory memory. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to enable generation of a contact-intensity-dependent interface response. In some embodiments, the contact-intensity-dependent interface response is generated without using an output of the sensors capable of detecting intensity of one or more contacts with the touch-sensitive surface (also referred to as "contact intensity sensors"). The method 800 reduces the cognitive burden on a user when generating a contact-intensity-dependent interface response, thereby creating a more efficient human-machine interface. For battery-operated electronic devices, enabling a user to generate a contact-intensity-dependent interface response faster and more efficiently conserves power and increases the time between battery charges.

The device displays (802), on the display, an interface object associated with a plurality of contact-intensity-dependent interface responses corresponding to a plurality of contact intensity level values. For example, in FIG. 7A-7C, interface object 701-B is associated with a first interface response (e.g., display of preview window 706) corresponding to a first contact intensity level value and a second interface response (e.g., display of different user interface 710) corresponding to a second contact intensity level value. In some embodiments, the device displays a plurality of interface objects, two or more of the interface objects being associated with a respective plurality of contact-intensity-dependent interface responses.

The device receives (804) a sequence of one or more inputs that includes detecting a contact on the touch-sensitive surface associated with a location of the interface object and detecting an intensity of the contact. In some embodiments, the contact on the touch-sensitive surface is detected by the touch-sensitive surface and the intensity of the contact is detected by the contact intensity sensors.

In some embodiments, detecting the contact on the touch-sensitive surface associated with a location of the interface object includes (806) detecting a contact on the touch-sensitive surface at the location of the interface object. For example, in FIG. 7A, the device detects a contact 704 at the location of the interface object 701-B. As another example, in FIG. 7I, the device detects a contact 730 at the location of the interface object 701-B.

In some embodiments, detecting the contact on the touch-sensitive surface associated with a location of the interface object includes (808) detecting a contact on the touch-sensitive surface while a selection indicator indicates the location of the interface object. For example, in FIG. 7M, the device detects a contact 736 on the touch-sensitive surface while the selection indicator 734 indicates the location of the interface object 701-B, in particular, while the selection indicator 734 surrounds the interface object 701-B. In various implementations, the selection indicator 734 (e.g., a cursor) surrounds the interface object, is displayed over the interface object, highlights the interface object, points to a location of interface object, or otherwise indicates the location of the interface object.

In some embodiments, the sequence of one or more inputs includes (810) a first contact on the touch-sensitive surface at a location of an interaction menu activation interface object, a second contact on the touch-sensitive surface at a location of a force touch gesture selection interface object displayed in an interaction menu as a result of the first input, and third contact on the touch-sensitive surface at the location of the interface object associated with the plurality of contact-intensity-dependent interface responses. For example, in FIG. 7E, a sequence of inputs includes a contact 716 (e.g., a first contact) at a location of an interaction menu activation interface object 712. In FIG. 7G, the sequence of inputs includes a contact 724 (e.g., a second contact) at a location of a force touch gesture selection interface object 723. In FIG. 7H, the sequence of inputs includes a contact 728 (e.g., a third contact) at a location of the interface object 701-B. Also, in FIG. 7I, the sequence of inputs includes a contact 730 (e.g., also a third contact in some embodiments) at the location of the interface object 701-B.

In some embodiments, the sequence of one or more inputs further includes (812) a fourth contact at the location of a force gesture activation interface object displayed over the interface object associated with the plurality of contact-intensity-dependent interface responses as a result of the third contact. For example, in FIG. 7I, the sequence of inputs includes a contact 730 (e.g., a fourth contact) at the location of the force gesture activation interface object 726.

In some embodiments, the sequence of one or more inputs includes (814) a first contact on the touch-sensitive surface while a selection indicator indicates a location of the interface object associated with the plurality of contact-intensity-dependent interface responses and a second contact on the touch-sensitive surface while the selection indicator indicates a location of a force touch gesture activation interface object displayed as a result of the first contact. For example, in FIG. 7M, a sequence of inputs includes a contact 736 while a selection indicator 734 indicates the location of the interface object 701-B. In FIG. 7O, the sequence of inputs includes a contact 744 while the selection indicator 734 indicates the location of the force touch gesture activation interface object 742.

In some embodiments, the force touch gesture activation interface object is displayed (816) in a gesture activation menu that includes a plurality of gesture activation interface objects including the force touch gesture activation interface object and a force recorded gesture activation interface object, selection of the force recorded gesture activation interface object replaying a recorded gesture that includes a contact intensity component at the location of the first contact. In some embodiments, the recorded gesture is replayed at a location in the user interface specified by the user (e.g., in response to a tap gesture or other selection gesture that indicates the location in the user interface at which the recorded gesture is to be replayed). For example, in FIGS. 7N-7S, the force touch gesture activation interface object 742 is displayed in a gesture activation menu 738 that includes a plurality of gesture activation interface objects, including a double-tap gesture activation interface object 741, the force touch gesture activation interface object 742, a multi-touch gesture activation interface object, and a favorites gesture activation interface object 756. Selection of the favorites gesture activation interface object 756 can, in some implementations, result in the replaying of a recorded gesture that includes a contact intensity component. In some implementations, replaying the recorded gesture includes (818) displaying a graphical indication of changes in contact intensity as the recorded gesture is replayed. For example, in FIG. 7U, a graphical indication 768 is illustrated in which the thickness of a path of the gesture is varied in accordance with the intensity of the gesture by increasing the width when the intensity of the replayed gesture is increasing and decreasing the width of the path when the intensity of the replayed gesture is decreasing.

In accordance with a determination that a first mode (e.g., a default mode) is enabled, the device determines (820) a contact intensity level value for the contact based on the detected intensity of the contact. For example, in FIGS. 7A-7B, the device determines a contact intensity level value for the contact 704 based on the detected intensity of the contact.

In accordance with a determination that a second mode (e.g., an accessibility mode) is enabled, the device determines (822) a contact intensity level value for the contact that is independent of the detected intensity of the contact. In particular, the device generates or synthesizes a contact intensity level value in order to simulate a contact having the contact intensity level value. For example, in FIG. 7Wa, the device determines a contact intensity level value for the contact 774 that is independent of the detected intensity of the contact, but is, instead, based on the duration of the contact 774. As another example, in FIG. 7X, the device determines a contact intensity level value for the contact 782 that is independent of the detected intensity of the contact, but is, instead, based on the number of concurrent contacts. As a further example, in FIG. 7Y, the device determines a contact intensity value for the contact 786 that is independent of the detected intensity of the contact, but is, instead, based on the distance of a drag of the contact. As yet another example, in FIG. 7Z, the device determines a contact intensity value for the contact 790 that is independent of the detected intensity of the contact, but is, instead, based on the distance between the contact 790 and another contact 792.

In some implementations, the first mode is enabled whenever the second mode is not enabled and the second mode is enabled whenever the first mode is not enabled. The device can provide an input affordance for allowing a user to select between the first mode and the second mode.

As noted above, in accordance with a determination that the second mode is enabled, the device determines a contact intensity level value for the contact that is independent of the detected intensity of the contact (e.g., from the contact intensity sensors), but is instead based on other inputs as described below.

In some embodiments, determining the contact intensity level value for the contact is based on (824) a duration of one of the sequence of one or more inputs. In some embodiments, determining the contact intensity level value for the contact is based on (826) a duration of the contact on the touch-sensitive surface associated with the location of the interface object. For example, in FIG. 7Wa, the device determines a contact intensity level value for the contact 774 that is based on the duration of the contact 774 on the touch-sensitive surface associated with the location of the interface object 701-B. In some implementations, the device determines a contact intensity level value for the contact based on a duration of an input separate from the contact on the touch-sensitive surface associated with the location of the interface object. For example, the device can determine a contact intensity level for the contact based on a duration of subsequent pressure-indication contact either at the location of the interface object or elsewhere in the user interface. In some implementations, the device determines the contact intensity level value in proportion to the duration. For example, the contact intensity level value can be kt+c, where k is a multiplier, t is the duration of the touch, and c is a minimum value or 0.

In some embodiments, determining the contact intensity level value for the contact is based on (828) a number of the sequence of one or more inputs. For example, in FIGS. 7I-7J, the device determines the contact intensity level value and enables generation of the corresponding interface response (e.g., display of preview window 706 and/or different user interface 710) based on the number of contacts at the location of the interface object 701-B. In some embodiments, determining the contact intensity level value is based on (826) a number of contacts that are concurrently detected on the touch-sensitive surface. For example, in FIG. 7X, the device determines the contact intensity level value of the contact 782 based on the number of contacts that are concurrently detected on the touch-sensitive surface. In some implementations, the device determines the contact intensity level value in proportion to the number of contacts that are concurrently detected on the touch-sensitive surface. For example, the contact intensity level value can be x when a single contact is detected, 2x when two concurrent contacts are detected, and 4x when four concurrent contacts are detected.

In some embodiments, determining the contact intensity level value for the contact is based on (832) a size of one of the sequence of one or more inputs. In some embodiments, for example, determining the contact intensity level value for the contact is based on (834) a distance between contacts that are concurrently detected on the touch-sensitive surface. For example, in FIG. 7Z, the device determines the contact intensity level value for the contact 790 based on the distance 794-A-794-B between the contact 790 and a concurrently detected contact 792. In some embodiments, as another example, determining the contact intensity level value for the contact is based on (836) a distance moved by the contact on the touch-sensitive surface. For example, in FIG. 7Y, the device determines the contact intensity level value for the contact 786 based on a distance 788-A-788-C moved by the contact 782 on the touch-sensitive surface, e.g., a distance between a start of a contact 786 on the touch-sensitive surface and an end of the contact 786 on the touch-sensitive surface or a current position of the contact 786.

In some embodiments, determining the contact intensity level value for the contact is based on (838) a direction of one of the sequence of one or more inputs. For example, as described above with respect to FIG. 7Y, the device can determine the contact intensity level value for the contact 786 based on the direction of the contact. For example, the contact intensity level value can be a first contact intensity level value if a contact dragging to the left is detected and a second contact intensity level value if a contact dragging to the right is detected. As another example, the contact intensity level value can be proportional to the angle made between the interface object 701-B and the location of the touch (after dragging). Thus, a device simulates increasing or decreasing the contact intensity level in response to detecting a contact at a location that corresponds to the interface object 701-B, detecting movement of the contact a distance from interface object 701-B, and detecting movement of the contact clockwise or counter-clockwise around the interface object 701-B.

In some embodiments, determining the contact intensity level value for the contact is based on (840) one of the sequence of one or more inputs received from an input device separate from the touch-sensitive surface and the one or more sensors capable of detecting intensity of one or more contacts with the touch sensitive surface. For example, the separate device can be (842) a digital crown or volume control button. The device can determine the contact intensity level based solely on the input for the alternate device (e.g., a foot pedal, a lever, a slider, etc.). In some implementations, the device can determine the contact intensity level based on the alternate input and the inputs as described above. For example, with respect to FIG. 7Y, the simulated contact intensity level value can be kt+c, where k is a multiplier, t is the distance of the contact, and c is a minimum value or 0. Further, the multiplier k can be set using a digital crown or a volume control button.

As noted above (with respect to block 810), in some embodiments, the sequence of one or more inputs includes first contact on the touch-sensitive surface at a location of an interaction menu activation interface object, a second contact on the touch-sensitive surface at a location of a force touch gesture selection interface object displayed in an interaction menu as a result of the first input, and third contact on the touch-sensitive surface at the location of the interface object associated with the plurality of contact-intensity-dependent interface responses. In some embodiments, the third contact is the detected contact on the touch-sensitive surface associated with the location of the interface object and determining the contact intensity level value is based on (848) the second contact at the location of the force touch gesture selection interface object.

For example, in FIG. 7E, a sequence of inputs includes a contact 716 (e.g., a first contact) at a location of an interaction menu activation interface object 712. In FIG. 7G, the sequence of inputs includes a contact 724 (e.g., a second contact) at a location of a force touch gesture selection interface object 723. In FIG. 7I, the sequence of inputs includes a contact 730 (e.g., a third contact) at the location of the interface object 701-B. The contact intensity level value of the contact 730 is determined based on the second contact 724 selecting a force touch gesture.

As also noted above (with respect to block 812), in some embodiments, the sequence of inputs further includes a fourth contact at the location of a force gesture activation interface object displayed over the interface object associated with the plurality of contact-intensity-dependent interface responses as a result of the third contact. In some embodiments, the fourth contact is the detected contact on the touch-sensitive surface associated with the location of the interface object and determining the contact intensity level value is based on (848) the contact at the location of the force touch gesture selection interface object.

For example, in FIG. 7E, a sequence of inputs includes a contact 716 (e.g., a first contact) at a location of an interaction menu activation interface object 712. In FIG. 7G, the sequence of inputs includes a contact 724 (e.g., a second contact) at a location of a force touch gesture selection interface object 723. In FIG. 7I, the sequence of inputs includes a contact 728 (e.g., a third contact) at a location of the interface object 701-B. Also, in FIG. 7J, the sequence of inputs includes a contact 730 (e.g., a forth contact) at the location of the force gesture activation interface object 726. The contact intensity level value of the contact 730 is determined based on the second contact 724 selecting a force touch gesture.

The device provides (850) the determined contact intensity level value together with information indicative of the detected contact on the touch-sensitive surface in order to enable generation of a respective contact-intensity-dependent interface response of the plurality of contact-intensity-dependent interface responses selected based on the determined contact intensity level value. For example, FIG. 7B shows generation a respective contact-intensity-dependent interface response (e.g., display of preview window 706) selected based on the contact intensity level value. As another example, FIG. 7W*a* shows generation of three respective contact-intensity-dependent interface responses (display of preview windows of different sizes 780-A-780-C).

In some implementations, an operating system, application programming interface (API), or accessibility module provides the determined contact intensity level value together with information indication of the detected contact to another module (e.g., a third-party module, an application module, or another operating system module) to enable generation of the interface response. In some implementations, the receiving module generates the interface response. In some implementations, the receiving module is agnostic as to the source of the determined contact intensity level (e.g., based on the contact intensity sensors in the first mode or independent of the contact intensity sensors in the second mode). Thus, the receiving module operates identically irrespective of whether the first mode or the second mode is enabled.

In some implementations, providing the determined contact intensity level value together with the information indicative of the detected contact on the touch-sensitive surface includes continuously providing (852) the determined contact intensity level value with the information indicative of the detected contact on the touch-sensitive surface for a predetermined duration on until a subsequent contact on the touch-sensitive surface is detected. For example, in FIG. 7J, display of the preview window 706 can be maintained by continuously providing the determined contact intensity level value with the information indicative of the detected contact on the touch-sensitive surface for a predetermined duration (e.g., 8 seconds) or until a subsequent contact on the touch-sensitive surface is detected, either away from the interface object 701-B resulting in ceasing providing the detected contact intensity level value or a contact 732 at the interface object 701-B resulting the providing of an adjusted contact intensity level value (as described below).

In some embodiments, the device determines (854) an adjusted contact intensity level value for the contact based on a subsequent sequence of one or more inputs and provides (860) the determined adjusted contact intensity level value together with information indicative of a the detected contact on the touch-sensitive surface in order to enable generation of a respective contact-intensity-dependent interface response of the plurality of contact-intensity-dependent interface responses selected based on the determined adjusted contact intensity level value.

For example, in FIG. 7X, the device determines a first contact intensity level for the contact 782 based on the previous contact 772 with the force touch accessibility interface object 770 (in FIG. 7V) and provides the determined contact intensity level to enable generation of a first interface response (e.g., display of a preview window of a first size 780-A). Upon detecting the second contact 782, the device determines a second contact intensity level for the contact (e.g., an adjusted contact intensity level value) and provides the determined adjusted contact intensity level to enable generation of a second interface response (e.g., display of a preview window of a second size 780-B).

As noted above (with respect to block 812), in some embodiments, the sequence of one or more inputs includes a first contact on the touch-sensitive surface at a location of an interaction menu activation interface object, a second contact on the touch-sensitive surface at a location of a force touch gesture selection interface object displayed in an interaction menu as a result of the first input, a third contact on the touch-sensitive surface at the location of the interface object associated with the plurality of contact-intensity-dependent interface response, and a fourth contact on the touch-sensitive surface at a location of an force gesture activation interface object displayed over the interface object associated with the plurality of contact-intensity-dependent interface responses as a result of the third contact. In some embodiments, determining the adjusted contact intensity level value for the contact is based on (850) a fifth contact on the touch-sensitive surface at a location of the force touch gesture activation interface object.

For example, in FIG. 7E, a sequence of inputs includes a contact 716 (e.g., a first contact) at a location of an interaction menu activation interface object 712. In FIG. 7G, the sequence of inputs includes a contact 724 (e.g., a second contact) at a location of a force touch gesture selection interface object 723. In FIG. 7H, the sequence of inputs includes a contact 728 (e.g., a third contact) at a location of the interface object 701-B. In FIG. 7I, the sequence of inputs includes a contact 730 (e.g., a forth contact) at the location of the force gesture activation interface object 726. In FIG. 7J, a subsequent sequence of one or more inputs includes a contact 732 (e.g., a fifth contact) at the location of the force touch activation interface object. An adjusted contact intensity level value for the contact 730 is based on the fifth contact 732 and provided to enable generation of the interface response (e.g., display of the different user interface 710).

As noted above (with respect to block 814), in some embodiments, the sequence of one or more inputs includes a first contact on the touch-sensitive surface while a selection indicator indicates the location of the interface object associated with the plurality of contact-intensity-dependent interface responses and a second contact on the touch-sensitive surface while the selection indicator is at a location of a force touch gesture activation interface object displayed as a result of the first contact. In some embodiments, determining the adjusted contact intensity level value for the contact is based on (858) a third contact on the touch-sensitive surface while the selection indicator is at a location of a force touch increase interface object.

For example, in FIG. 7O, the device determines an adjusted contact intensity level of the contact (indicated by selected object indicator 740) and provides the determined adjusted contact intensity level to enable generation of the interface response (e.g., display of the different user interface 710).

It should be understood that the particular order in which the operations in FIGS. 8A-8E have been described is merely exemplary and is not intended to indicate that the described order is the only order in which the operations could be performed. One of ordinary skill in the art would recognize various ways to reorder the operations described herein.

Figure 9:
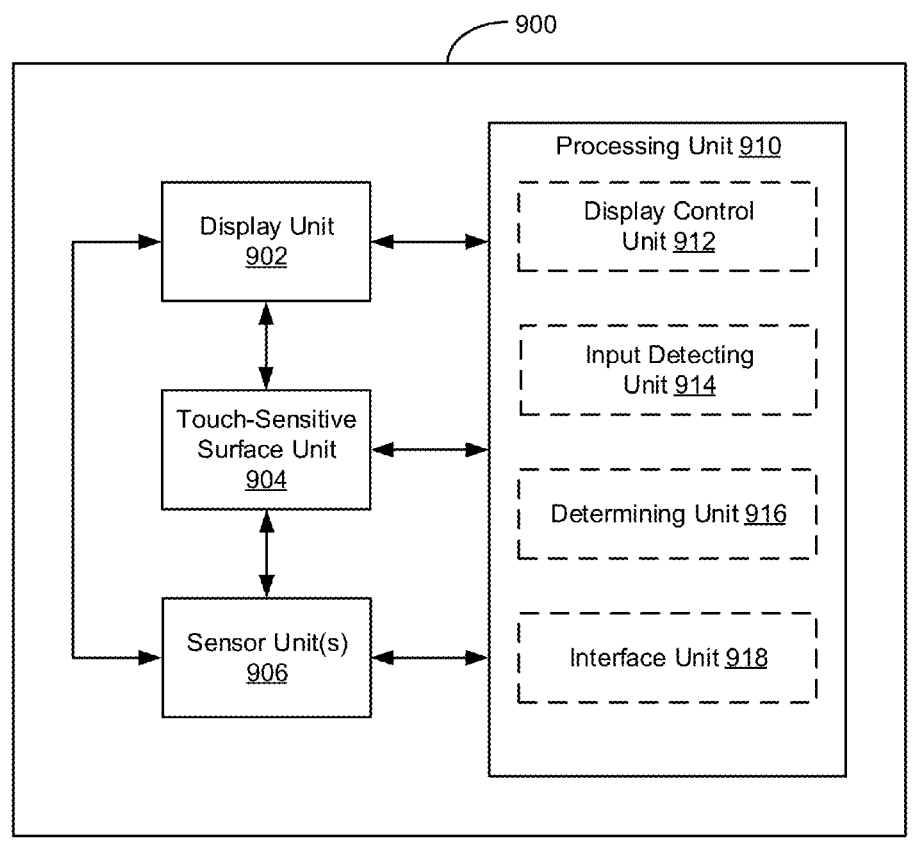
FIG. 9 is a functional block diagrams of an electronic device in accordance with some embodiments.

In accordance with some embodiments, FIG. 9 shows a functional block diagram of an electronic device 900 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, an electronic device 900 includes a display unit 902 configured to display a user interface, a touch-sensitive surface unit 904 configured to receive contacts, one or more sensor units 906 configured to detect intensity of contacts with the touch-sensitive surface unit 904; and a processing unit 910 coupled with the display unit 902, the touch-sensitive surface unit 904 and the one or more sensor units 906. In some embodiments, the processing unit 910 includes: a display control unit 912, an input detecting unit 914, a determining unit 916, and an interface unit 918.

In some embodiments, the processing unit 910 is configured to display (e.g., with the display control unit 912) an interface object associated with a plurality of contact-intensity-dependent interface responses corresponding to a plurality of contact intensity level values and receive (e.g., with the input detecting unit 914) a sequence of one or more inputs that includes detecting a contact (e.g., with the touch-sensitive surface unit 904) associated with a location of the interface object and detecting an intensity of the contact (e.g., with the one or more sensor units 906). In response to receiving the sequence of one or more inputs, the processing unit 910 is configured to, in accordance with a determination that a first mode is enabled, determine (e.g., with the determining unit 916) a contact intensity level value for the contact based on the detected intensity of the contact and, in accordance with a determination that a second mode is enabled, determine (e.g., with the determining unit 916) a contact intensity level value for the contact that is independent of the detected intensity of the contact. After determining the contact intensity level value for the contact, the processing unit 910 is configured to provide (e.g., with the interface unit 918) the determined contact intensity level value together with information indicative of the detected contact on the touch-sensitive surface in order to enable generation of a respective contact-intensity-dependent interface response of the plurality of contact-intensity-dependent interface responses selected based on the determined contact intensity level value.

In some embodiments, in accordance with the determination that the second mode is enabled, the processing unit 910 is configured to determine (e.g., with the determining unit 916) the contact intensity level value based on a duration of the sequence of one or more inputs.

In some embodiments, in accordance with the determination that the second mode is enabled, the processing unit 910 is configured to determine (e.g., with the determining unit 916) the contact intensity level value based on a duration of the contact (e.g., on the touch-sensitive surface unit 904).

In some embodiments, in accordance with the determination that the second mode is enabled, the processing unit 910 is configured to determine (e.g., with the determining unit 916) the contact intensity level value based on a number of the sequence of one or more inputs.

In some embodiments, in accordance with the determination that the second mode is enabled, the processing unit 910 is configured to determine (e.g., with the determining unit 916) the contact intensity level value based on a number of contacts that are concurrently detected (e.g., by the touch-sensitive surface unit 904).

In some embodiments, in accordance with the determination that the second mode is enabled, the processing unit 910 is configured to determine (e.g., with the determining unit 916) the contact intensity level value based on a size of one of the sequence of one or more inputs.

In some embodiments, in accordance with the determination that the second mode is enabled, the processing unit 910 is configured to determine (e.g., with the determining unit 916) the contact intensity level value based on a distance between contacts that are concurrently detected (e.g., by the touch-sensitive surface unit 904).

In some embodiments, in accordance with the determination that the second mode is enabled, the processing unit 910 is configured to determine (e.g., with the determining unit 916) the contact intensity level value based on a distance moved by the contact (e.g., over the touch-sensitive surface unit 904).

In some embodiments, in accordance with the determination that the second mode is enabled, the processing unit 910 is configured to determine (e.g., with the determining unit 916) the contact intensity level value based on a direction of one of the sequence of one or more inputs.

In some embodiments, in accordance with the determination that the second mode is enabled, the processing unit 910 is configured to determine (e.g., with the determining unit 916) the contact intensity level value based on one of the sequence of one or more inputs received from an input device separate from the touch-sensitive surface unit 904 and the one or more sensor units 906. In some embodiments, the input device includes at least one or a digital crown or a volume control button.

In some embodiments, the processing unit 910 is configured to, in accordance with the determination that the second mode is enabled, determine (e.g., with the determining unit 916) an adjusted contact intensity level value for the contact based on a subsequent sequence of one or more inputs and provide (e.g., with the interface unit 918) the determined adjusted contact intensity level value together with information indicative of the detected contact on the touch-sensitive surface in order to enable generation of a respective contact-intensity-dependent interface response of the plurality of contact-intensity-dependent interface responses selected based on the determined adjusted contact intensity level value.

In some embodiments, the processing unit 910 is configured to detect the contact associated with a location of the interface object by detecting (e.g., with the input detecting unit 914) a contact (e.g., on the touch-sensitive surface unit 904) at the location of the interface object.

In some embodiments, the processing unit 910 is configured to detect the contact associated with a location of the interface object by detecting (e.g., with the input detecting unit 914) a contact (e.g., on the touch-sensitive surface unit 904) while a selection indicator indicates the location of the interface object.

In some embodiments, the sequence of one or more inputs includes: a first contact (e.g., on the touch-sensitive surface unit 904) at a location of an interaction menu activation interface object, a second contact (e.g., on the touch-sensitive surface unit 904) at a location of a force touch gesture selection interface object displayed in an interaction menu as a result of the first input, and a third contact (e.g., on the touch-sensitive surface unit 904) at the location of the interface object associated with the plurality of contact-intensity-dependent interface responses.

In some embodiments, in accordance with the determination that the second mode is enabled, the third contact is the detected contact associated with the location of the interface object and the processing unit 910 is configured to determine the contact intensity level value for the contact that is independent of the detected intensity of the contact based on the second contact at the location of the force touch gesture selection interface object.

In some embodiments, the sequence of one or more inputs further includes a fourth contact (e.g., on the touch-sensitive surface unit 904) at a location of a force touch gesture activation interface object displayed over the interface object associated with the plurality of contact-intensity-dependent interface responses as a result of the third contact.

In some embodiments, in accordance with the determination that the second mode is enabled, the fourth contact is the detected contact associated with the location of the interface object and the processing unit 910 is configured to determine the contact intensity level value for the contact that is independent of the detected intensity of the contact based on the second contact at the location of the force touch gesture selection interface object.

In some embodiments, the processing unit 910 is configured to provide the determined contact intensity level value together with information indicative of the detected contact on the touch-sensitive surface by continuously providing (e.g., with the interface unit 918) the determined contact intensity level value together with the information indicative of the detected contact for a predetermined duration or until a fifth contact (e.g., on the touch-sensitive surface unit 904) is detected.

In some embodiments, in accordance with the determination that the second mode is enabled, the processing unit 910 is configured to determine (e.g. with the determining unit 916) an adjusted contact intensity level value for the contact based on a fifth contact (e.g., on the touch-sensitive surface unit 904) at a location of the force touch gesture activation interface object and provide (e.g., with the interface unit 918) the determined adjusted contact intensity level value together with information indicative of the detected contact in order to enable generation of a respective contact-intensity-dependent interface response of the plurality of contact-intensity-dependent interface responses selected based on the determined adjusted contact intensity level value.

In some embodiments, the gesture activation menu includes a plurality of gesture activation interface objects including the force touch gesture selection interface object and a force recorded gesture selection interface object. In some embodiments, in response to selection of the force recorded gesture selection interface object, the processing unit 910 replays a recorded gesture at the location of the third contact, the recorded gesture including a contact intensity component. In some embodiments, replaying the recorded gesture includes displaying (e.g., with the display control unit 912) a graphical indication of changes in contact intensity as the gesture is replayed.

In some embodiments, the sequence of one or more inputs includes a first contact (e.g., on the touch-sensitive surface unit 904) a first contact on the touch-sensitive surface while a selection indicator indicates the location of the interface object associated with the plurality of contact-intensity-dependent interface responses and a second contact (e.g., on the touch-sensitive surface unit 904) while the selection indicator indicates a location of a force touch gesture activation interface object displayed as a result of the first contact.

In some embodiments, the processing unit 910 is configured to provide the determined contact intensity level value together with information indicative of the detected contact on the touch-sensitive surface by continuously providing (e.g., with the interface unit 918) the determined contact intensity level value together with the information indicative of the detect contact for a predetermined duration or until a third contact (e.g., on the touch-sensitive surface unit 904) is detected.

In some embodiments, in accordance with the determination that the second mode is enabled, the processing unit 910 is configured to determine (e.g., with the determining unit 916) an adjusted contact intensity level value for the contact based on a third contact (e.g., on the touch-sensitive surface) while the selection indicator is at a location of a force touch force increase interface object displayed as a result of the first input and provide (e.g., with the interface unit 918) the determined adjusted contact intensity level value together with information indicative of the detected contact in order to enable generation of a respective contact-intensity-dependent interface response of the plurality of contact-intensity-dependent interface responses selected based on the determined adjusted contact intensity level value.

In some embodiments, the force touch gesture activation interface object is displayed (e.g., by the display control unit 912) in a gesture activation menu that includes a plurality of gesture activation interface objects including the force touch gesture activation interface object and a force recorded gesture activation interface object. In some embodiments, in response to selection of the force recorded gesture activation interface object, the processing unit 910 replays a recorded gesture that includes a contact intensity component at the location of the first contact. In some embodiments, while replaying the recorded gesture, the processing unit 910 display (e.g., with the display control unit 902) a graphical indication of changes in contact intensity as the gesture is replayed.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8E are, optionally, implemented by components depicted in FIGS. 1A-1B or FIG. 9. For example, displaying operation 802, receiving operation 804, determining operations 820 and 822, and providing operation 850 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, at an electronic device with a display, a touch-sensitive surface, one or more sensors capable of detecting intensity of one or more contacts with the touch-sensitive surface, one or more processors, and a non-transitory memory, the method comprising:
    displaying, on the display, an interface object associated with a plurality of contact-intensity-dependent interface responses corresponding to a plurality of contact intensity level values;
    receiving a sequence of one or more inputs that includes detecting a contact on the touch-sensitive surface associated with a location of the interface object and detecting an intensity of the contact;
    in response to receiving the sequence of one or more inputs:
        in accordance with a determination that a first mode is enabled, determining a contact intensity level value for the contact based on the detected intensity of the contact; and
        in accordance with a determination that a second mode is enabled, determining the contact intensity level value for the contact that is independent of the detected intensity of the contact; and
    after determining the contact intensity level value for the contact, providing the determined contact intensity level value together with information indicative of the contact on the touch-sensitive surface in order to enable generation of a respective contact-intensity-dependent interface response of the plurality of contact-intensity-dependent interface responses based on the determined contact intensity level value.

2. The method of claim 1, wherein, in accordance with the determination that the second mode is enabled, determining the contact intensity level value is based on a duration of one of the sequence of one or more inputs.

3. The method of claim 2, wherein, in accordance with the determination that the second mode is enabled, determining the contact intensity level value is based on a duration of the contact on the touch-sensitive surface.

4. The method of claim 1, wherein, in accordance with the determination that the second mode is enabled, determining the contact intensity level value is based on a number of the sequence of one or more inputs.

5. The method of claim 4, wherein, in accordance with the determination that the second mode is enabled, determining the contact intensity level value is based on a number of contacts that are concurrently detected on the touch-sensitive surface.

6. The method of claim 1, wherein, in accordance with the determination that the second mode is enabled, determining the contact intensity level value is based on a size of one of the sequence of one or more inputs.

7. The method of claim 6, wherein, in accordance with the determination that the second mode is enabled, determining the contact intensity level value is based on a distance between contacts that are concurrently detected on the touch-sensitive surface.

8. The method of claim 6, wherein, in accordance with the determination that the second mode is enabled, determining the contact intensity level value is based on a distance moved by the contact on the touch-sensitive surface.

9. The method of claim 1, wherein, in accordance with the determination that the second mode is enabled, determining the contact intensity level value is based on a direction of one of the sequence of one or more inputs.

10. The method of claim 1, wherein, in accordance with the determination that the second mode is enabled, determining the contact intensity level value is based on one of the sequence of one or more inputs received from an input device separate from the touch-sensitive surface and the one or more sensors capable of detecting intensity of one or more contacts with the touch-sensitive surface.

11. The method of claim 10, wherein the input device includes at least one of a digital crown or a volume control button.

12. The method of claim 1, further comprising, in accordance with the determination that the second mode is enabled:
determining an adjusted contact intensity level value for the contact based on a subsequent sequence of one or more inputs; and
providing the determined adjusted contact intensity level value together with information indicative of the contact on the touch-sensitive surface in order to enable generation of a respective contact-intensity-dependent interface response of the plurality of contact-intensity-dependent interface responses based on the determined adjusted contact intensity level value.

13. The method of claim 1, wherein detecting a contact on the touch-sensitive surface associated with a location of the interface object includes detecting a contact on the touch-sensitive surface at the location of the interface object.

14. The method of claim 1, wherein detecting a contact on the touch-sensitive surface associated with a location of the interface object includes detecting a contact on the touch-sensitive surface while a selection indicator indicates the location of the interface object.

15. The method of claim 1, wherein the sequence of one or more inputs includes:
a first contact on the touch-sensitive surface at a location of an interaction menu activation interface object;
a second contact on the touch-sensitive surface at a location of a force touch gesture selection interface object displayed in an interaction menu as a result of the first input; and
a third contact on the touch-sensitive surface at the location of the interface object associated with the plurality of contact-intensity-dependent interface responses.

16. The method of claim 15, wherein, in accordance with the determination that the second mode is enabled, the third contact is the contact on the touch-sensitive surface associated with the location of the interface object and determining the contact intensity level value for the contact that is independent of the detected intensity of the contact is based on the second contact at the location of the force touch gesture selection interface object.

17. The method of claim 1, wherein the sequence of one or more inputs further includes:
a fourth contact on the touch-sensitive surface at a location of a force touch gesture activation interface object displayed over the interface object associated with the plurality of contact-intensity-dependent interface responses as a result of the third contact.

18. The method of claim 17, wherein, in accordance with the determination that the second mode is enabled, the fourth contact is the contact on the touch-sensitive surface associated with the location of the interface object and determining the contact intensity level value for the contact that is independent of the detected intensity of the contact is based on the second contact at the location of the force touch gesture selection interface object.

19. The method of claim 17, wherein providing the determined contact intensity level value together with information indicative of the contact on the touch-sensitive surface include continuously providing the determined contact intensity level value together with the information indicative of the contact on the touch-sensitive surface for a predetermined duration or until a fifth contact on the touch-sensitive surface is detected.

20. The method of claim 19, further comprising, in accordance with the determination that the second mode is enabled:
determining an adjusted contact intensity level value for the contact based on a fifth contact on the touch-sensitive surface at a location of the force touch gesture activation interface object; and
providing the determined adjusted contact intensity level value together with information indicative of the contact on the touch-sensitive surface in order to enable generation of a respective contact-intensity-dependent interface response of the plurality of contact-intensity-dependent interface responses selected based on the determined adjusted contact intensity level value.

21. The method of claim 15, wherein the gesture activation menu includes a plurality of gesture activation interface objects including the force touch gesture selection interface object and a force recorded gesture selection interface object, wherein selection of the force recorded gesture selection interface object replays a recorded gesture at the location of the third contact, the recorded gesture including a contact intensity component.

22. The method of claim 21, wherein replaying the recorded gesture includes displaying a graphical indication of changes in contact intensity as the gesture is replayed.

23. The method of claim 1, wherein the sequence of one or more inputs includes:

a first contact on the touch-sensitive surface while a selection indicator indicates the location of the interface object associated with the plurality of contact-intensity-dependent interface responses; and a second contact on the touch-sensitive surface while the selection indicator indicates a location of a force touch gesture activation interface object displayed as a result of the first contact.

24. The method of claim 23, wherein providing the determined contact intensity level value together with information indicative of the contact on the touch-sensitive surface include continuously providing the determined contact intensity level value together with the information indicative of the detect contact on the touch-sensitive surface for a predetermined duration or until a third contact on the touch-sensitive surface is detected.

25. The method of claim 24, further comprising, in accordance with the determination that the second mode is enabled:

determining an adjusted contact intensity level value for the contact based on a third contact on the touch-sensitive surface while the selection indicator is at a location of a force touch force increase interface object displayed as a result of the first input; and providing the determined adjusted contact intensity level value together with information indicative of the contact on the touch-sensitive surface in order to enable generation of a respective contact-intensity-dependent interface response of the plurality of contact-intensity-dependent interface responses based on the determined adjusted contact intensity level value.

26. The method of claim 23, wherein the force touch gesture activation interface object is displayed in a gesture activation menu that includes a plurality of gesture activation interface objects including the force touch gesture activation interface object and a force recorded gesture activation interface object, wherein selection of the force recorded gesture activation interface object replays a recorded gesture that includes a contact intensity component at the location of the first contact.

27. The method of claim 26, including, while replaying the recorded gesture, displaying a graphical indication of changes in contact intensity as the gesture is replayed.

28. An electronic device, comprising:
a display;
a touch-sensitive surface;
one or more sensors capable of detecting intensity of one or more contacts with the touch-sensitive surface;
one or more processors;
a non-transitory memory; and
one or more programs, wherein the one or more programs are stored in the non-transitory memory and configured to be executed by the one or more processors, the one or more programs including instructions for:
displaying, on the display, an interface object associated with a plurality of contact-intensity-dependent interface responses corresponding to a plurality of contact intensity level values;
receiving a sequence of one or more inputs that includes detecting a contact on the touch-sensitive surface associated with a location of the interface object and detecting an intensity of the contact;
in response to receiving the sequence of one or more inputs:
in accordance with a determination that a first mode is enabled, determining a contact intensity level value for the contact based on the detected intensity of the contact; and
in accordance with a determination that a second mode is enabled, determining the contact intensity level value for the contact that is independent of the detected intensity of the contact; and
after determining the contact intensity level value for the contact, providing the determined contact intensity level value together with information indicative of the contact on the touch-sensitive surface in order to enable generation of a respective contact-intensity-dependent interface response of the plurality of contact-intensity-dependent interface responses based on the determined contact intensity level value.

29. A non-transitory computer readable storage medium storing one or more programs, the one or more programs comprising instructions, which when executed by an electronic device with a display, a touch-sensitive surface, and one or more sensors capable of detecting intensity of one or more contacts with the touch-sensitive surface, cause the device to:
display, on the display, an interface object associated with a plurality of contact-intensity-dependent interface responses corresponding to a plurality of contact intensity level values;
receive a sequence of one or more inputs that includes detecting a contact on the touch-sensitive surface associated with a location of the interface object and detecting an intensity of the contact;
in response to receiving the sequence of one or more inputs:
in accordance with a determination that a first mode is enabled, determine a contact intensity level value for the contact based on the detected intensity of the contact; and
in accordance with a determination that a second mode is enabled, determine the contact intensity level value for the contact that is independent of the detected intensity of the contact; and
after determining the contact intensity level value for the contact, provide the determined contact intensity level value together with information indicative of the contact on the touch-sensitive surface in order to enable generation of a respective contact-intensity-dependent interface response of the plurality of contact-intensity-dependent interface responses based on the determined contact intensity level value.

30. An electronic device, comprising:
a display unit configured to display an interface object associated with a plurality of contact-intensity-dependent interface responses corresponding to a plurality of contact intensity level values;
a touch-sensitive surface unit configured to detect contacts on the touch-sensitive surface unit;
one or more sensor units configured to detect intensity of one or more contacts with the touch-sensitive surface unit; and
a processing unit coupled with the display unit, the touch-sensitive surface unit, and the one or more sensor units, the processing unit configured to:
receive a sequence of one or more inputs that includes detecting a contact on the touch-sensitive surface unit associated with a location of the interface object and detecting an intensity of the contact;

in response to receiving the sequence of one or more inputs:

in accordance with a determination that a first mode is enabled, determine a contact intensity level value for the contact based on the detected intensity of the contact; and in accordance with a determination that a second mode is enabled, determine the contact intensity level value for the contact that is independent of the detected intensity of the contact; and after determining the contact intensity level value for the contact, provide the determined contact intensity level value together with information indicative of the contact on the touch-sensitive surface unit in order to enable generation of a respective contact-intensity-dependent interface response of the plurality of contact-intensity-dependent interface responses based on the determined contact intensity level value.

* * * * *